United States Patent [19]
Jandrell

[11] Patent Number: 5,526,357
[45] Date of Patent: Jun. 11, 1996

[54] COMMUNICATION SYSTEM AND METHOD FOR DETERMINING THE LOCATION OF A TRANSPONDER UNIT

[75] Inventor: Louis H. M. Jandrell, Dallas, Tex.

[73] Assignee: Pinpoint Communications, Inc., Dallas, Tex.

[21] Appl. No.: 276,480

[22] Filed: Jul. 18, 1994

Related U.S. Application Data

[63] Continuation of Ser. No. 746,954, Aug. 16, 1991, Pat. No. 5,365,516.

[51] Int. Cl.$^6$ .............................. G01S 3/02; H04B 7/17
[52] U.S. Cl. ...................... 370/95.2; 340/991; 342/457; 371/68.2
[58] Field of Search .................................. 340/988, 989, 340/991, 992, 993, 463, 825.47, 825.54; 371/67.1, 68.1, 68.2; 342/60, 88, 126, 139, 450, 451, 457; 455/51.1, 54.1, 54.2, 56.1; 370/18, 85.7, 95.1, 95.2, 100.1, 103; 375/356

[56] References Cited

U.S. PATENT DOCUMENTS

| | | | |
|---|---|---|---|
| 2,972,742 | 2/1961 | Ross | 342/457 |
| 3,646,580 | 2/1972 | Fuller et al. | 340/989 |
| 4,107,689 | 8/1978 | Jellinek | 340/991 |
| 4,665,552 | 5/1987 | Lala et al. | 371/68.2 |
| 4,673,921 | 6/1987 | Saito et al. | 340/991 |
| 4,774,709 | 9/1988 | Tulplue et al. | 371/68.2 |
| 5,126,941 | 6/1992 | Gurmu et al. | 340/989 |

*Primary Examiner*—Benedict V. Safourek
*Attorney, Agent, or Firm*—Arnold, White & Durkee

[57] ABSTRACT

A multilaterating two-way message delivery system for mobile resource management provides efficient two-way radio data communication for multitudes of portable transponders using a single frequency in half-duplex communication. The system includes at least one transponder device which transmits and receives data using a radio frequency communication link, and an array of at least three base stations which communicate with the transponder device using the radio frequency communication link. The radio frequency communication link employed by each base station and the transponder device is designed to provide muitilateration information and to deliver message data simultaneously. Further, a control arrangement is coupled to the array of base stations to coordinate the communication between the base stations and the transponder devices. Time-division multiplex and spread spectrum technology is employed by the system for communication efficiency and minimizing the effect of multipath interference.

49 Claims, 62 Drawing Sheets

Error Parallelogram & Equivalent Error-Circle for acutely intersecting Lines of Position

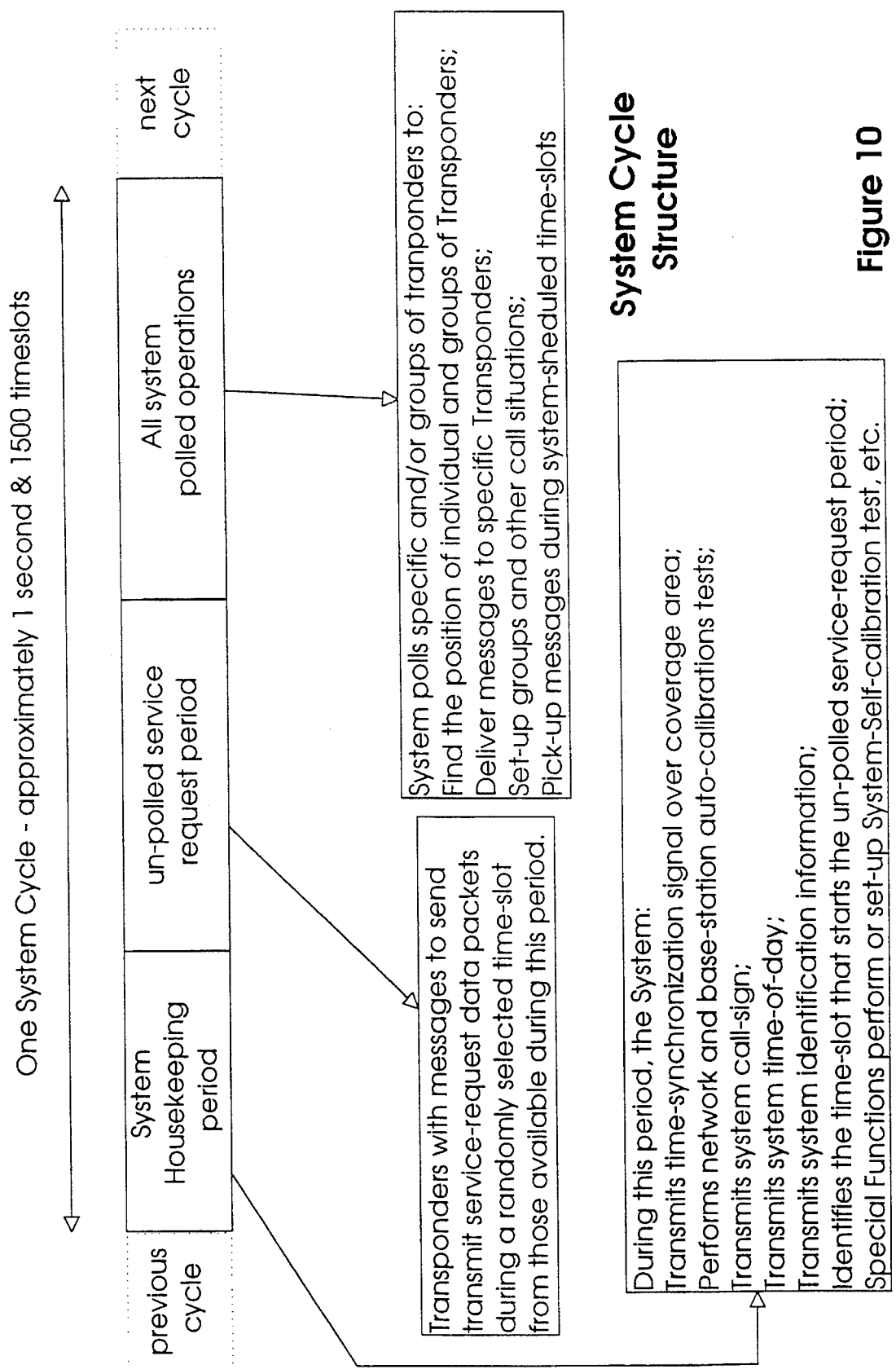

Figure 11a

An example of a 40 user-character message sent from the Network to a Transponder

| Previous message | Message Header Packet from Base Station | Message packet from Base Station eg. approximately 20•7-bit characters | Message packet from Base Station eg. approximately 20•7-bit characters | Response packet from TransModem | Next message |

Figure 11b

An example of a Transponder making a service request

| Previous message | one of the available service request time-slots | one of the available service request time-slots | Service request from Transmodem requesting message pickup | one of the available service request time-slots | Next system cycle starts |

Figure 11c

An example of a 40 user-character message Picked-up from the Transponder by the Network

| Previous message | Message Header Packet from Base Station triggers Transmodem to send message packets | Message packet from TransModem eg. approximately 20•7-bit characters | Message packet from Transmodem eg. approximately 20•7-bit characters | Response packet from TransModem | Next message |

Note: Duration of message packets are not necessarily shown to scale!

Examples of Message Delivery and Pickup

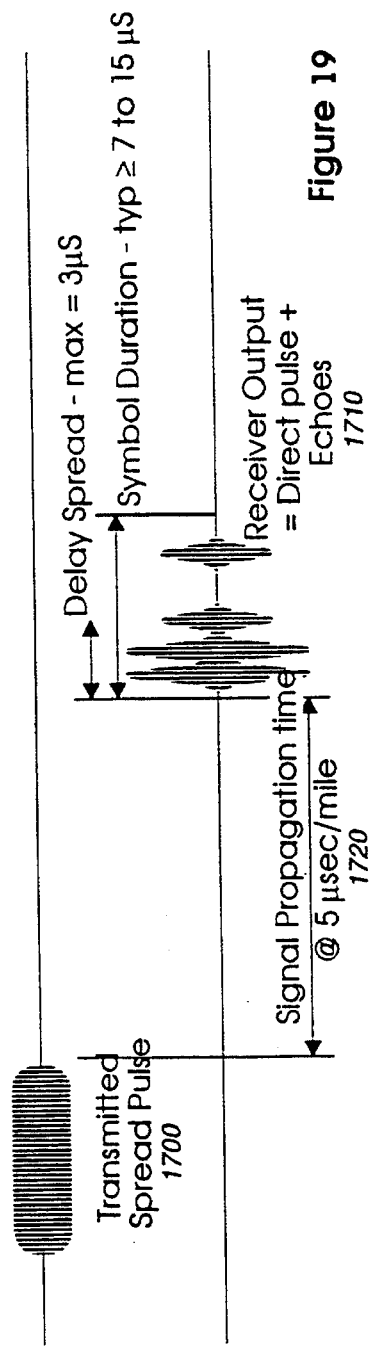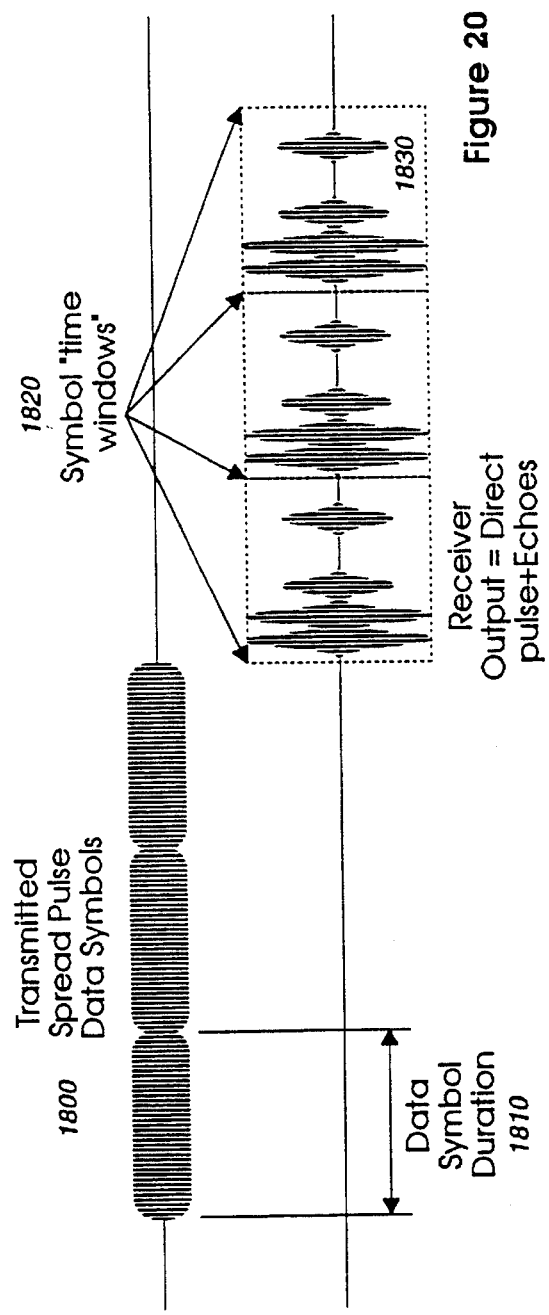

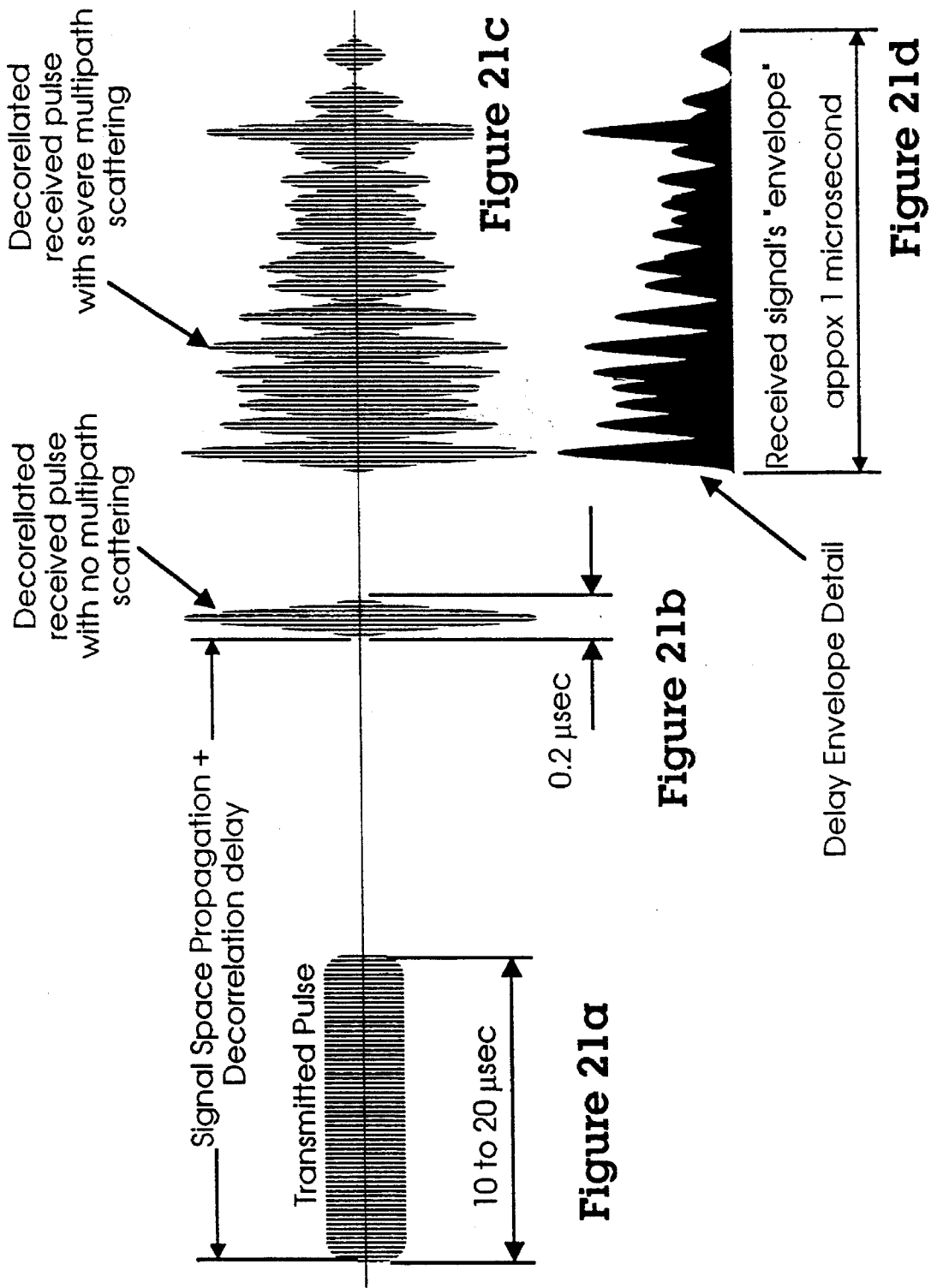

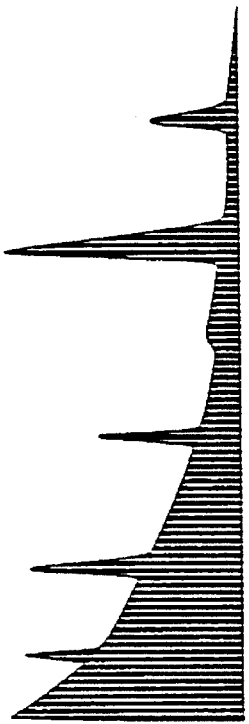
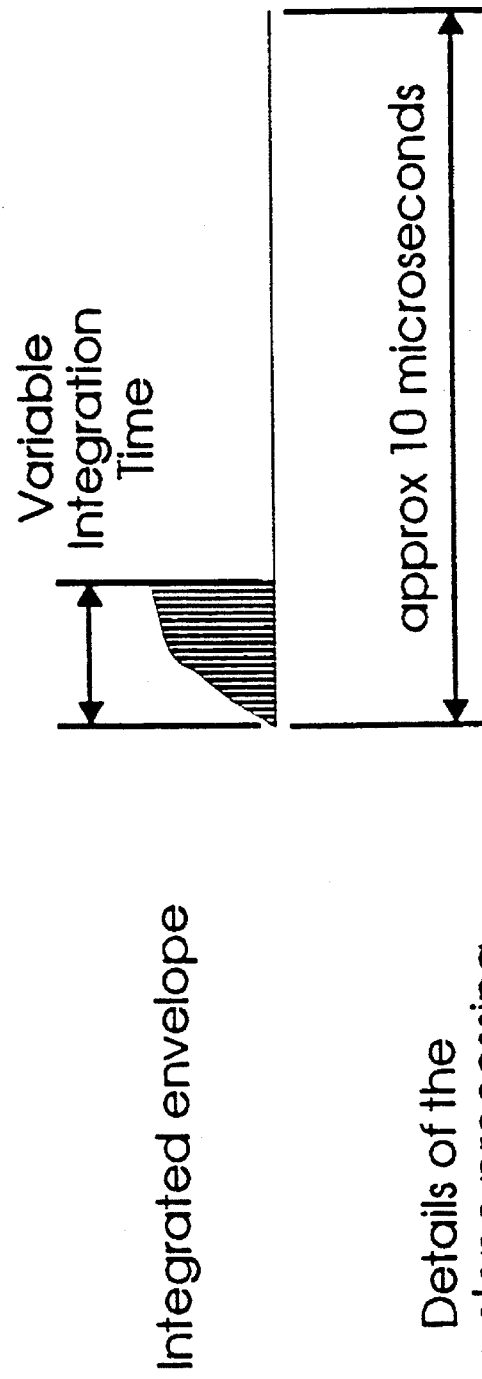
Figure 22a — Actual Delay Envelope
Figure 22b — Integrated envelope
Details of the envelope processing

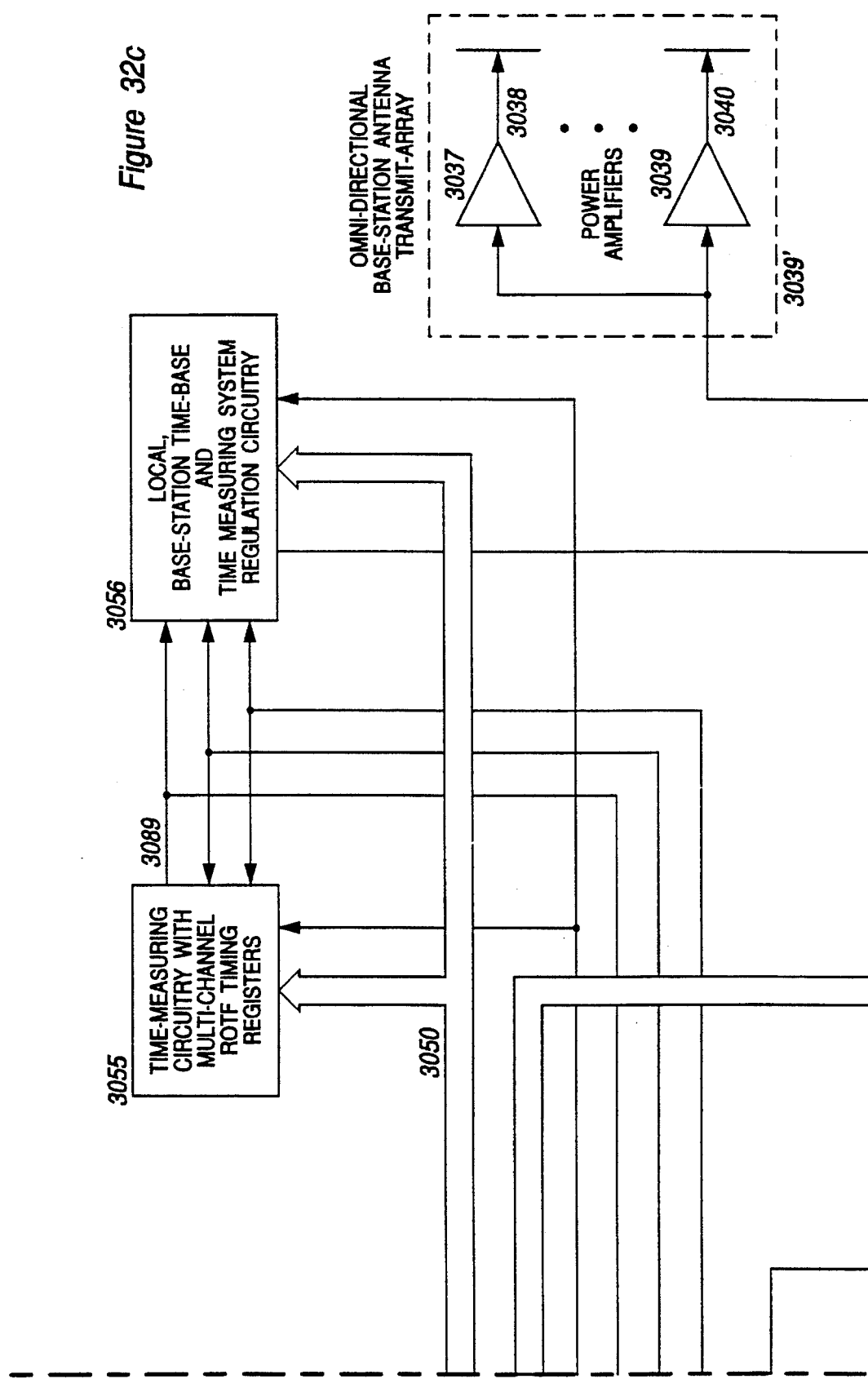

Envelope formation for ARRAY TransModem

Block Diagram of Personnel Monitoring System

Block Diagram of ARRAY's approach to In-band Signal Cancelling

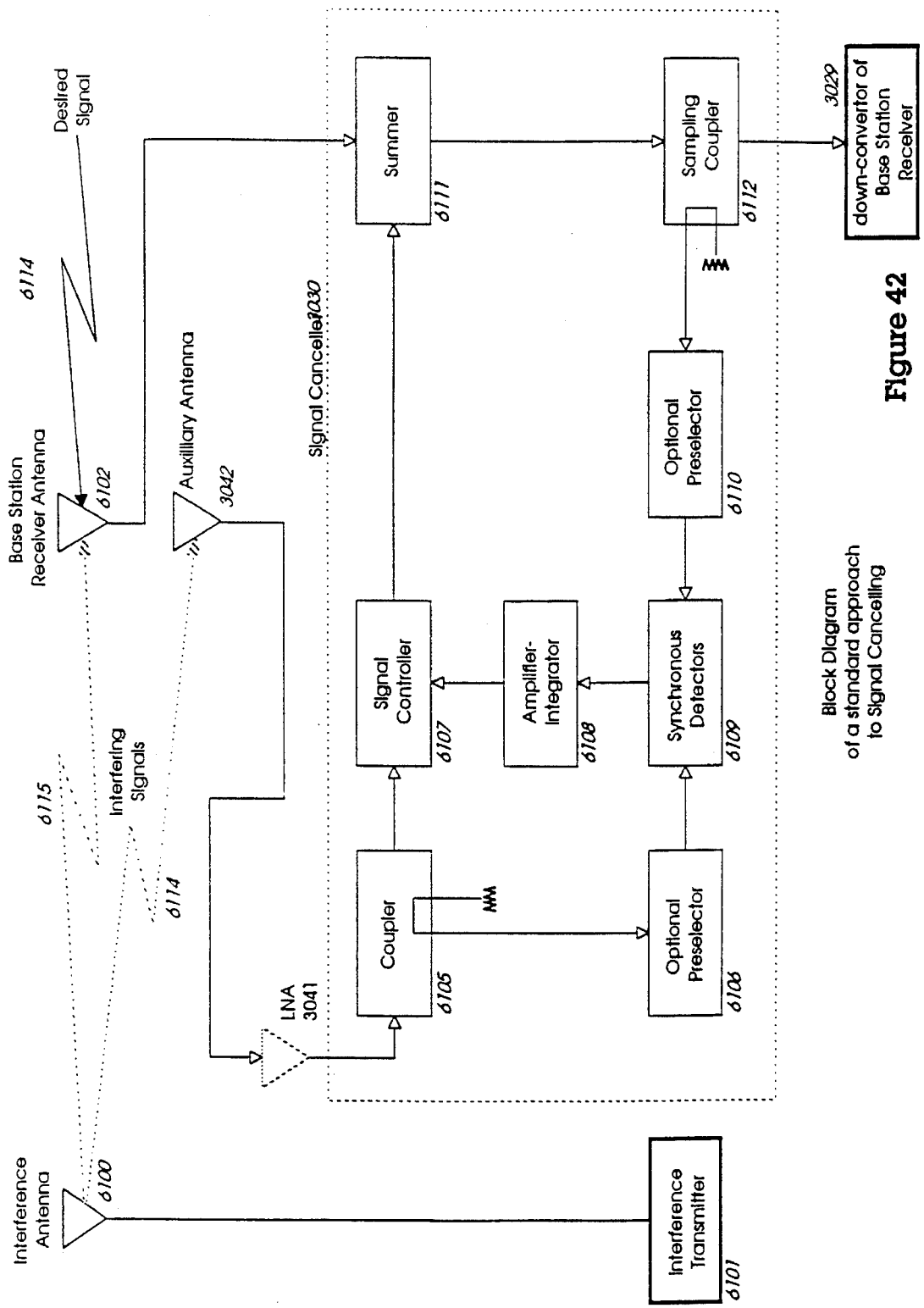

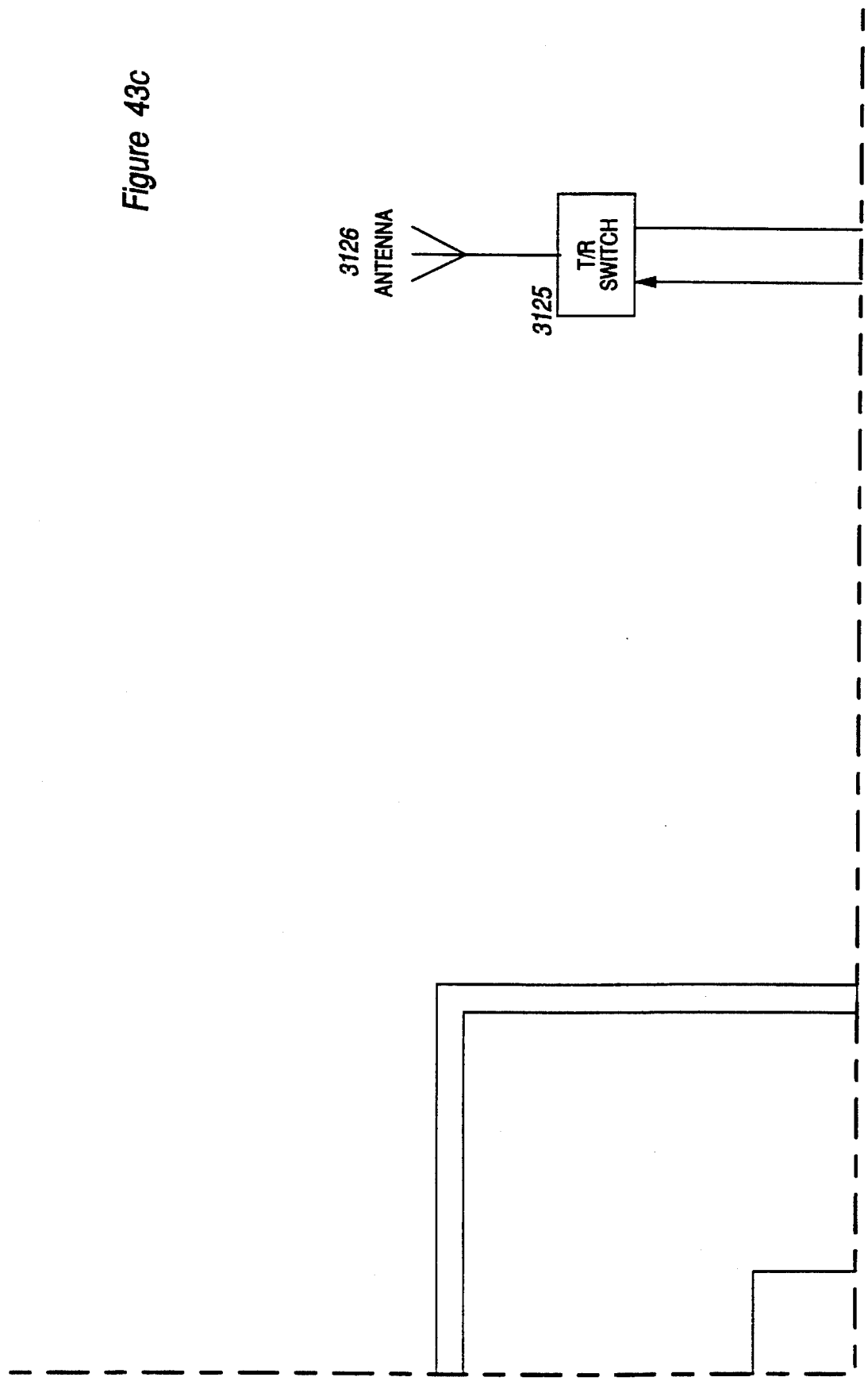

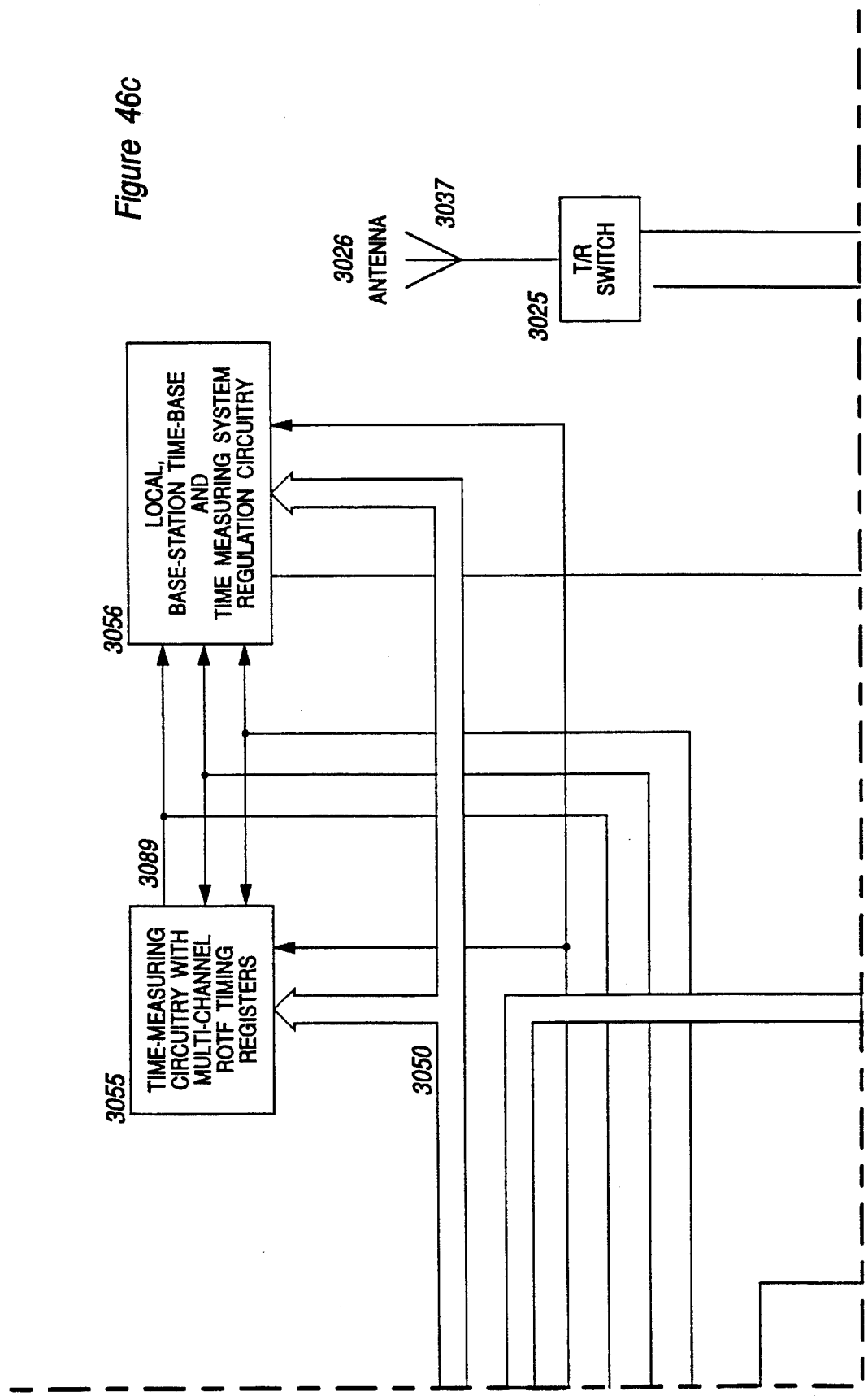

COMMUNICATION SYSTEM AND METHOD FOR DETERMINING THE LOCATION OF A TRANSPONDER UNIT

This application is a continuation of application Ser. No. 07/746,954, filed, Aug. 16, 1991, entitled: "Communication System And Method For Determining The Location Of A Transponder Unit now U.S. Pat. No. 5,365,516.

FIELD OF THE INVENTION

The present invention relates to radio data communication systems and systems which determine the location of devices relative to a coordinate system.

BACKGROUND OF THE INVENTION

Historically, communications systems have been implemented for the purpose of providing voice and/or data communication or vehicle location information. More recently developed systems have been extensions or evolution of existing communication models. Cellular radio telephone (CRT), specialized mobile radio and mobile data radio networks, like those of IBM-Motorola and Federal Express are examples. Unfortunately, only CRT has been able to reach a significant market penetration, and CRT is orientated towards the voice communication market-place and is unsuited to economical communication of the short data-messages that typify the majority of mobile data application. The prior art is virtually void of systems which have been originally designed to provide both radio data communication and vehicle location of devices relative to a coordinate system.

Generally, the art of radio data communication and radio location is extensive. The most widely used system for position determination is presently the Loran-C system, established by the U.S. Coast Guard more than 20 years ago, for navigation on inland and coastal waters of the U.S.A. A Loran-C receiver simultaneously processes the signals received from a number of Loran-C broadcast stations, and determines its local coordinates from phase comparisons between the various signals, and from (internal) tables of the known position of the signal sources. Loran-C offers a position uncertainty of about ⅙ mile in open areas and over water. However, since the system operates at very low frequencies, having correspondingly long wavelengths, the penetration of the signals into the concrete canyons of urban areas is quite poor, and leads to unacceptable position uncertainties in those situations. Furthermore, while the Loran-C system covers the coastal regions and inland waterways of the U.S., many of the inland areas do not receive signals strong enough to provide reliable operation.

Perhaps the most significant deficiency of the Loran system is that it provides no communication path for voice or data message information.

Satellite-based systems providing a service similar to Loran-C are now in operation, such as the military and commercial versions of Global Positioning Satellite system (GPS). It can provide accurate position determination(about 50 m rms error for the commercial version of GPS) from signal received simultaneously form at least three high-orbiting satellites. In many respects, the GPS system works like a "Loran-C-in-the-sky," and performs well in open areas, but is often defeated in many consumer applications and in urban areas. This is because the power levels from the satellites are very low and the mobile transponder requires a clear, direct view of the satellites for its operation. Such a clear view is often enough not the case in urban areas to limits its use to applications only requiring transient position locating or to preclude the use of GPS-positioning in many consumer applications. Moreover, the cost of commercial GPS and Loran-C receivers is excessive and there is no means by which the location can be communicated.

Another position determining system is the "Signpost" systems. The resolution of this system is the spacing between signposts, and the position is recorded as the vehicle passes the signpost. Unfortunately, the position of the vehicle between posts is unknown.

An interesting commercial version of a signpost system, developed by Amtech Corporation, uses passive, coded tags, capable of being "scanned" by a locally strong RF signal at the signpost. Commercial versions of this system are used to keep track of the passive-responding "Toll-Tags" attached to automobiles and railroad cars. Toll-Tags have also been used for automatic toll-road fee collection.

Detailed discussion on the characteristics and error analysis of the signpost and other navigational systems is provided in "AUTOMATIC VEHICLE LOCATING SYSTEMS" by Edward E. Skomal, Van Nostrand Reinhold Company, 1981, ISBN 0-442-24495-9, incorporated herein by reference.

Two other vehicle locating systems worth mentioning include the North American Teletrac and the Lo-jack vehicle recovery systems. The Teletrac system uses a high frequency paging channel to activate a homing transponder on the vehicle being tracked. The transponder transmits a repeated spread-spectrum sequence, which a network of base stations receive, and from the difference in the delay between the sequence received at pairs of base stations the system determine the differences in the signal propagation flight time. From these differences a position fix can be determined by hyperbolic multilateration.

The capacity of the Teletrac system is limited to approximately 35 position fixes per second, and the system has little or no capacity to convey user information to the mobile or back to the system.

The Lo-jack system also uses a paging channel to activate a homing device installed on the stolen vehicle. Once the vehicle operator informs the recovery service of the loss of the vehicle, the paging channel is used to activate the homing transmitter, which emits a user ID-code on its homing carrier. Police tracking vehicles, equipped with special Doppler direction finding receivers then locate the vehicle by monitoring a combination of signal-strength and direction readings of the identified carrier being received.

A number of private data-networks have recently been built to provide mobile radio data communications. Early systems have been extensions of prior voice radio systems with analog modems included in the link to provide data transmission and reception. With the advent of Specialized Mobile Radio (SMR) and the birth of Cellular Radio Telephones (which is a particular implementation of SMR), full duplex data connections became possible. These implementations, unfortunately, have been based on the current technology of voice-radio channels, which limit the capacity of the channel to practical data transmission rates in the range of 1,200 to 19,200 baud, with 2,400–4,800 baud being typical, depending on link budget and equipment cost. Several private and public radio data networks have been built along these lines by Ericsson, Motorola and others. Data-modems have recently become available from several manufacturers to operate with cellular radio telephone systems and provide typical data rates of 2,400 baud.

Some satellite-based mobile data communications have been established in the Mobile Satellite Service (MSS), and companies such a Geostar, Qualcomm and Hughes have offered the service to mainly long-distance trucking companies wishing to stay in contact with their cross-country fleets. A mobile data communication link is often combined with a Loran-C navigational system to report the approximate location of the vehicle.

The approaches used by the most recently developed location and radio data systems are mainly based on extensions of previous approaches, such as voice radio, satellite data communications and conventional navigation systems such as Loran-C or GPS. By combining these navigational systems with the radio-data systems, systems have been created that can functionally provide message delivery with radio-position determination. However, the installed cost of the equipment package for the vehicles and the on-going operating cost of message delivery have been so high that only the very largest organizations, with very high service overhead costs, have been able to economically justify the use of the available approaches. Furthermore, the maximum (saturated) message handling capacity of the systems are too low to handle many commercial or consumer applications, even if their operating cost could be lowered to the point economic feasibility. For example, a few moderate sized taxi cab fleets or a single large metropolitan police department would completely consume the vehicle-positioning capacity of a Teletrac system, and if a conventional mobile radio data system was being used to convey the message portion of the application task, less than 2,000 vehicles would saturate the system's capacity.

The problem of high-resolution position determination has been addressed in a number of different ways. Moreover, the prior art has been unable to attain a universally effective operation in an urban environment. Most mobile-radio data communication in urban environments is presently limited to moderate data rates (1200–4800 baud) by the narrow bandwidth assigned to each mobile communication channel; bandwidths typically designed for voice-grade communication. Attempts to raise the data rates above these levels have also been frustrated by the severe multipath distortion occurring in the urban mobile radio communication environment.

Accordingly, there is a need for a monolithic system for both radio-location and inexpensive message delivery capable of serving a very large subscriber base from a control center. Perhaps equally important, there is a need for such a system which provides the mobile community with an economically feasible means to implement new services and to inaugurate services that were only theoretically possible in the past.

OBJECTS AND SUMMARY OF THE INVENTION

It is an object of the present invention to provide a combined two-way radio data communication system which transfers messages and determines the location of transponder devices relative to a coordinate system.

More specifically, it is an object of the present invention to provide a multilaterating two-way message delivery system for mobile resource management, which locates transponder vehicles more precisely, and communicates more efficiently than known systems.

It is another object of the present invention to provide an improved mobile unit radio location system which is more cost-efficient to operate than known systems.

It is another object of the present invention to provide a communication arrangement for a mobile unit radio location system which is able to accommodate, using cost-effective technology, a greater number of mobile units than has been heretofore known.

It is another object of the present invention to provide a transponder-modem for a mobile unit which may be implemented in a cost-effective manner for the mobile unit radio location system set forth above.

It is another object of the present invention to provide a centrally controlled system, or utility-network, which operates in urban and suburban environments to simultaneously: (1) provide reliable, high-speed delivery of digital data-packet messages between the control network (and the user organizations connected to it's central control facility via wireline services) and a very large population of mobile and/or portable data-terminals using a single communication channel; and, (2) determine the position of the mobile terminal with only a small position uncertainty, directly from the reception of the digitally encoded message streams broadcast by the radio-transponder-modems contained in the mobile data-terminals.

The position of the mobile transponder may be determined either from estimates of the differences in the time-of-arrival of the signals transmitted by a transponder-modem arriving at a number of nearby base station transceivers, or from estimates of the round trip time of the signal from the polling base station transceiver to the transponder and back to a number of nearby base station transceivers.

An embodiment of the system of the present invention has been designed to deliver radio packet-data messages and determine the position of mobile users in a single, integrated service using inexpensive subscriber equipment. This system has been named "the ARRAY system" after the repeating triangular pattern of the geographical layout of the base station transceivers.

The base station transceivers are positioned in a pattern optimized for radio position determination. Because the operating conditions for high-resolution position determination are more stringent than those required for error-free data transmission, placing the base stations in positions to create optimum conditions for radio position determination more than satisfies the conditions needed for near error-free radio-data-transmission. Therefore, very reliable data-communication is an inherent system characteristic. To satisfy the requirements for efficient air-time usage, and to integrate the high-capacity radio position determination function with message-packet-delivery, the ARRAY system delivers messages between endpoints only while functioning as an integrated system. A central control system supervises all the communication operations required for message deliveries, by using the networked base station transceivers connected via high-speed landlines or microwave links.

The ARRAY system provides high-speed packet-data message delivery between both mobile and fixed position users and is designed to minimize the use of air-time for the delivery of relatively short messages (tens to hundreds of characters), which are characteristic of the majority of the messages used in mobile applications requiring data-message delivery.

The ARRAY system delivers message packets between a mobile-terminal and other similar mobile-terminals, or between mobile data-terminals and fixed-location communication centers, such as may be used in any of a variety of mobile-services or portable terminal operations. Due to the collision avoiding organization of this system, all radio communication takes place only between an array of terrestrially-located base station transceivers networked to a central control facility, and a potentially very large population of mobile, portable transponder-modems or transponder-terminals that operate near the base station transceivers.

Spread spectrum techniques are used to spread the relatively large energy needed for high resolution (implying short duration, fast rise-time) ranging pulses in both time (pulse stretching or expansion) and frequency, and noncoherent correlation techniques are used in the receiver to contract the spread-pulse back into a near-impulse again (pulse compression). The wide-band correlation techniques applied to periodically-spaced pulses, in accordance with the present invention, allow many of the problems associated with multipath distortion to be overcome. Furthermore, by using multiple, unique, non-interfering spreading-codes to encode the position determining pulses, data symbols having multiple bits-per-symbol are transmitted with very high reliability, at data rates much higher than those commonly used by conventional land-mobile communication.

In a typical application of the present invention, the rate at which data is transmitted via a radio data channel is limited by the bandwidth and the amount of multipath distortion of the signal arriving at the receiver. The multipath distortion experienced in urban environments is normally severe. However, it has a specific character, in that for the transmission of an "impulse," a series of impulses will be received, which will decay in number and amplitude in time. This decay is characterized by the "delay spread," or the time it takes for the echoes to decay to less than 1/e times their initial value. In urban areas at frequencies in the area of 900 MHz, this spread has a maximum average value of about 3 microseconds. Impulses separated by more than twice the delay spread experience little interference from each other, resulting in a multipath limited impulse rate of about one pulse each 6 microseconds, or about 160,000 pulses per second.

As mentioned above, the ARRAY system ideally uses a band of frequencies set aside by the FCC for Automatic Vehicle Monitoring ("AVM"), whose uses include vehicle location and message exchange with the vehicle related to the "monitoring." By using all of the available bandwidth for the spread-spectrum technique described above, the ARRAY system reliably transmits data at a designed rate of 136,161 data symbols per second, while providing a ranging accuracy of between 20 and 50 feet in a signal transmission environment having severe multipath distortion characteristics.

According to one embodiment of the present invention, a multilaterating two-way message delivery system for mobile resource management includes at least one transponder device which transmits and receives data using a radio frequency communication link, and an array of at least three base stations which communicate with the transponder device using the radio frequency communication link. The radio frequency communication link employed by each base station and the transponder device is designed to provide multilateration information and to deliver message data simultaneously. Further, a control arrangement is coupled to the array of base stations to coordinate the communication between the base stations and the transponder devices.

Preferably the radio frequency communication link employs a single frequency, via half-duplex communication, for communication each of the two ways, and the transponders communicate with the base stations using the single frequency in a time-division multiplex (TDM) mode.

According to another preferred embodiment, a multilaterating two-way message delivery system for mobile resource management includes a multitude of transponder devices which transmit and receive data to/from an array of at least three base stations using a radio frequency communication link. The radio frequency communication link employed by each base station and each transponder device includes means for providing multilateration information and for delivering message data, and a control center, coupled to the array of base stations, coordinates the communication between the base stations and the transponder devices. Additionally, a plurality of application-specific computer terminals, each communicatively coupled to the control center and providing a customized multilateration-related function, are provided to communicate with the control center such that it selectively permits certain ones of the transponder devices to communicate with certain ones of the application-specific computer terminals.

In accordance with yet another embodiment of the present invention, a transceiver locating system operates in an environment which is susceptible to severe multipath interference. The system includes at least one transponder means, which is operable within a prescribed coverage area and which transmits a burst of data symbols, for example, in a coded carrier pulse. Further included is a controller arrangement having an array of base stations which are configured to define the prescribed coverage area, wherein each base station includes a receiver means for detecting and responding to the data symbol at a given time, interpreting the data symbol and rejecting echoes resulting from the multipath interference. A comparison circuit is included for responding to the receiver, for comparing the respectively identified given times for determining the position of the transponder means in the prescribed coverage area.

BRIEF DESCRIPTION OF THE DRAWINGS

Other objects and advantages of the invention will be apparent from the following detailed description and the accompanying drawings in which:

FIG. 1b is flow chart illustrating a preferred manner, according to the present invention, in which a vehicle dispatch application may be implemented in the system of FIG. 1a;

FIG. 1c is flow chart illustrating a preferred manner, according to the present invention, in which a subscriber in a vehicle sends a message to a subscription system operator using the system of FIG. 1a;

FIG. 3b is a cell reuse diagram, according to the present invention, which provides a basis for analyzing the co-channel interference levels of alternate configurations of base station polling groups of FIG. 1a;

FIG. 10 is a diagram of a system cycle, according to the present invention, which illustrates the sequence and structure of data transmitted and received on the system;

FIGS. 11a–11c comprises three examples of data sequences sent between the base station and the transponder, also in accordance with the present invention;

FIGS. 18–20 are timing diagrams illustrating a preferred manner of processing radio signals, according to the present invention, for the system illustrated in FIG. 1a;

FIGS. 21a–21d comprise a series of timing diagrams illustrating a preferred manner of processing radio signals, according to the present invention, for the system illustrated in FIG. 1a;

FIGS. 22a and 22b comprise another set of timing diagrams illustrating a preferred manner of processing radio signals, according to the present invention, for the system illustrated in FIG. 1a;

FIG. 23 is a timing diagram illustrating a manner in which data may be transmitted, according to the present invention, for the system shown in FIG. 1a;

FIGS. 24–27 comprise a series of timing diagrams illustrating a preferred manner in which data may be transmitted and received, according to the present invention, for the system shown in FIG. 1a;

FIGS. 32a, 32b, 32c and 32d is a block diagram of a base station transceiver, according to the present invention, which may be used to implement each of the base stations of FIG. 1a;

FIG. 42 is a block diagram of a standard approach to signal canceling, according to the present invention and as an alternative to the implementation shown in FIG. 41;

FIG. 43a–d is a block diagram of a mobile transponder, according to the present invention and consistent with the base station transceiver of FIG. 32;

FIG. 44a–d, FIG. 45a–d and FIG. 46a–d are enlarged sectional illustrations of block diagram shown at FIG. 43 and two variants thereof; and FIG. 47a–c is a block diagram of the control center of FIG. 1a.

DESCRIPTION OF THE PREFERRED EMBODIMENT

Figure 1A:
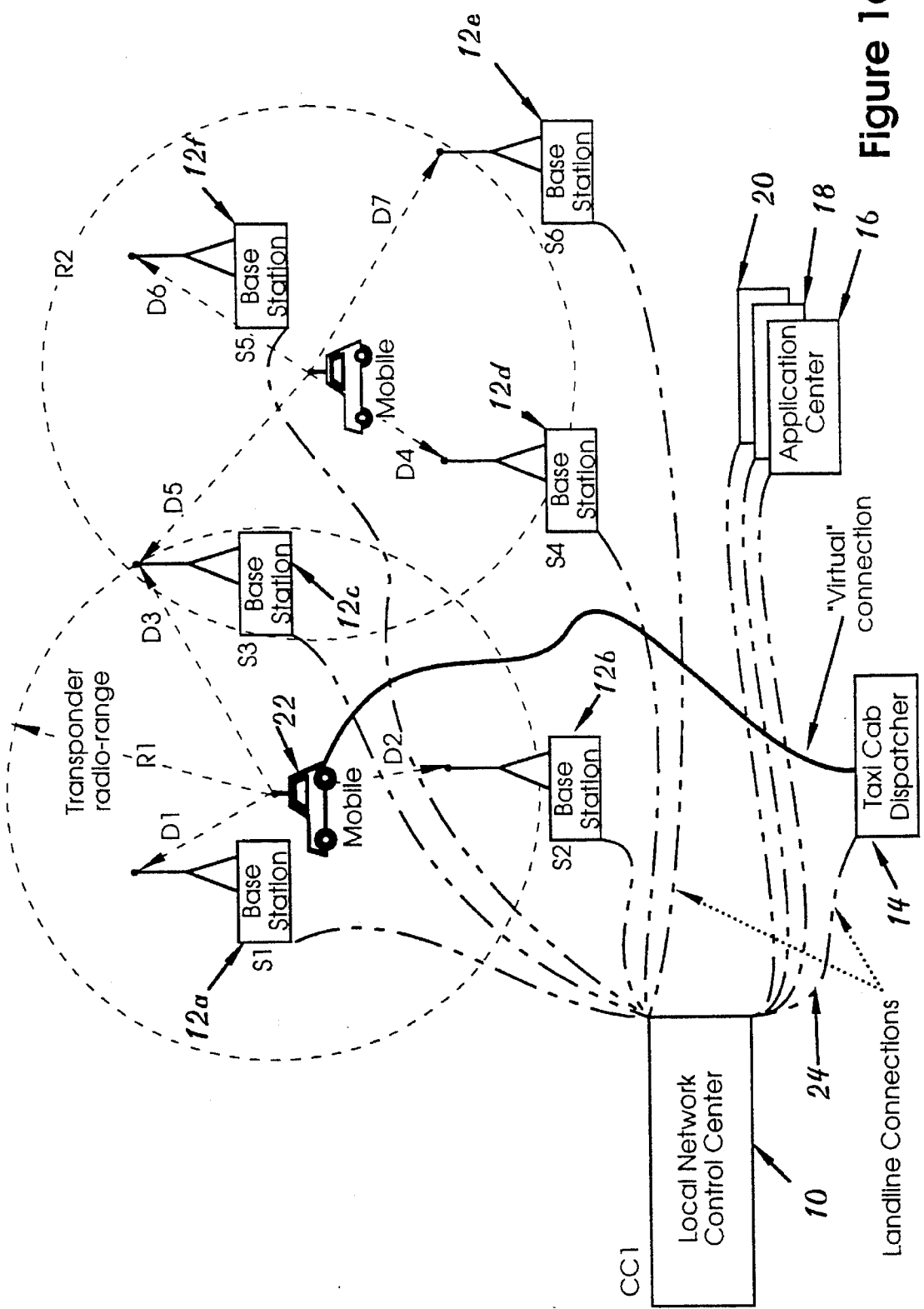
FIG. 1a is a system diagram illustrating the primary components of the present invention.

The present invention is applicable to a wide variety of transponder location/data-transfer communication schemes. A system embodied by the present invention ("the ARRAY system") has been particularly useful in applications having a "transponder" installed in a vehicle and having an array of base stations disposed in an urban area to provide communication between each vehicle and a control center for a prescribed coverage area. Communication between the transponders and the base stations is effected using short bursts of location-related informational data. The ARRAY system is able to provide efficient communication between a multitude of service-clients, who carry the mobile position transponder terminals, and the operator-client, who may want to know where the service-clients are located, and/or want to communicate with the service-clients.

Ideally, the ARRAY system operates with a control center, an array of networked base stations and at least one transponder-modem (hereinafter "transponder") typically installed in a vehicle. The control center coordinates the operations of the entire local system. The operation of the control center may be viewed as three distinct functional units: the ARRAY Base Station Controller, the Event Scheduler and the Application User Message Handler.

The ARRAY Base Station Controller performs several primary functions. It initiates the timing pulses for the synchronization of the timebases of the networked base stations; synchronizes the system time-slots; formats, buffers and routes all messages between the Event Scheduler and the base stations; and unpacks and buffers messages between the base stations and the Event Scheduler.

The Event Scheduler schedules operations between any particular transponder and the base stations; determines when a set of timing signals relate to a transponder that is within or outside its coverage area; coordinates communication between its own coverage area and the coverage areas adjacent to its own coverage area; supervises the operation of certain system diagnostic and maintenance programs and procedures; and interfaces with the Application User Message Handler system to provide two-way data communication between the operator-client and the associated (or subscribing) transponders.

The Application User Message Handler handles the message traffic between a user, (such as a fleet operator) and the Event Scheduler; handles the validation, authorization and accounting in the system; handles the client and account maintenance functions; and provides an operator interface to the position determination and data communication system.

The array of networked base stations is designed to accommodate power levels, antenna tower heights, system position-determination resolution, necessary signal-to-noise ratios, available allocated bandwidth and operating frequency. Each base station is communicatively coupled to a master base station, which provides system synchronization, and to the control center, which receives messages from and provides messages to the base stations.

The transponder is a small, mobile transceiver that can serve as a simple communication terminal, or as a modem to be connected to a terminal with more comprehensive functions. The transponder responds to the control signals, which are periodically transmitted by any one of the array of base station transceivers. Once synchronized with the base station network, the transponders may be polled for communications (message pickup or delivery) or for a position determination (fix), or may generate a request for service in response to a subscriber, or equipment initiated operation, such as a button or key depression, or an alarm contact closure, etc.

The ARRAY system preferably utilizes the spectrum set aside by the FCC for Automatic Vehicle Monitoring (AVM) in Section 90.236 of Federal Communication Rules and Regulations Part 90, which provides for the licensing of applications for Automatic Vehicle Monitoring (AVM) in the 902 to 928 MHz band. Generally, the regulation provides for the licensing of systems to use one of two 8-MHz bands located near 900 MHz for shaped, high-energy, wide-band pulsed operations, or two 1 MHz bands for narrow-band tone burst operations, or the whole of the 26 MHz allocated to the AVM band for spread-spectrum operations.

The AVM band is divided into two bands of 8 MHz each, one from 904 to 912 MHz, another from 918 to 926 MHz both for wide-band pulse operations and two 1 MHz bands for narrow band operations. The ARRAY system, using spread-spectrum techniques, may also be implemented in a single 26 MHz band from 902 to 928 MHz.

FIG. 1a exemplifies several applications for the by ARRAY system: for example, vehicle dispatch, vehicle recovery, emergency medical alert and intelligent vehicle routing. According to the present invention, each of these applications employs a control center 10, base stations 12 (12a–12c for region R1 and 12c–12f for region R2) and, for each application, a dedicated application-specific computer terminal 14, 16, 18 or 20. The control center 10 supervises all the communication operations required for message deliveries. This is done through a network of base stations 12 connected to the control center via high-speed landlines or microwave links. To maximize system efficiency and minimize the possibilities of message collisions, direct communications between any two users or subscribers is preferably not allowed by the ARRAY system. Vehicle transponders 22 may be programmed with either or both unique and multiple groups identification codes so that they may individually or programmatically respond to communications from the control center 10 via the base stations.

Figure 1B:
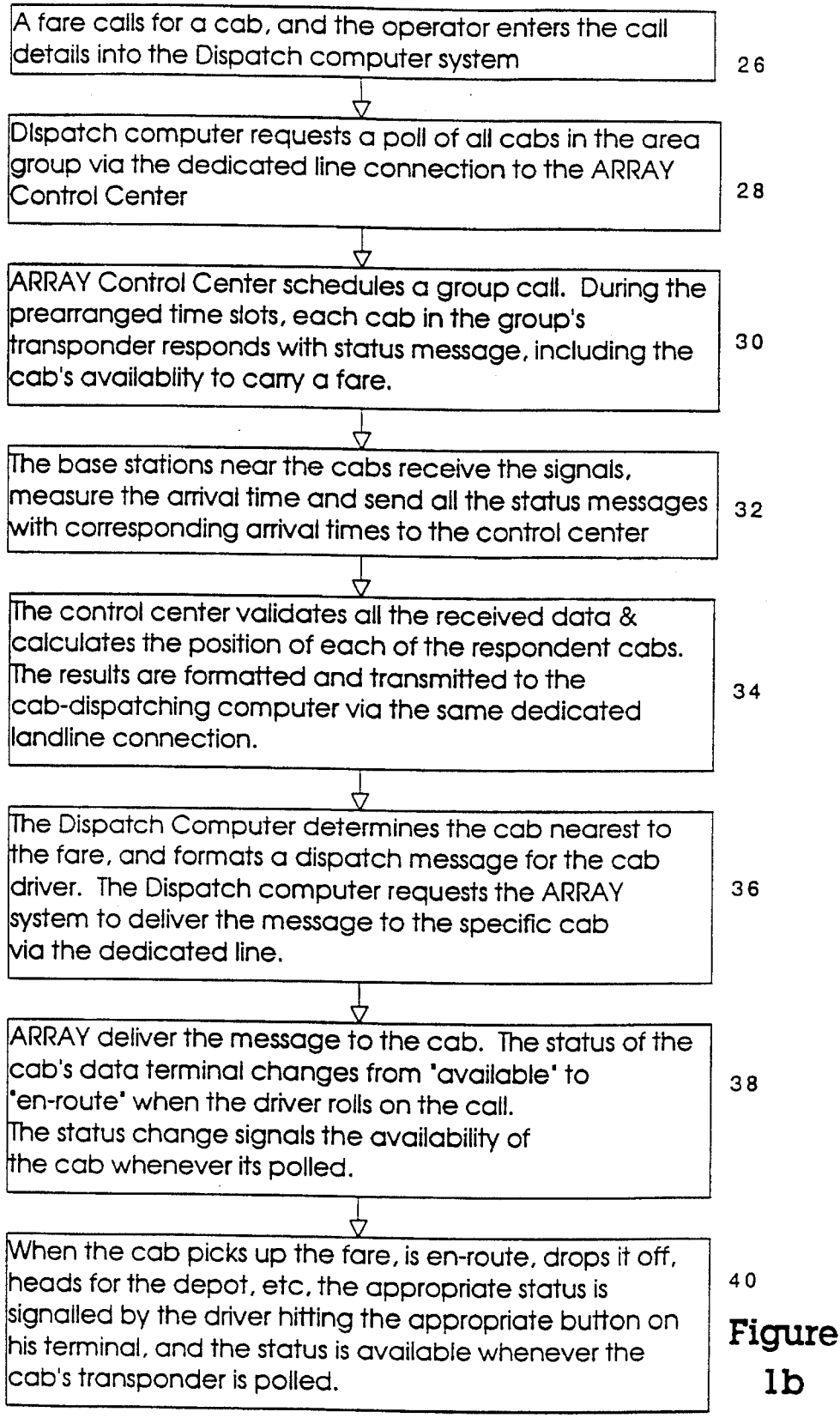

The vehicle dispatch application (corresponding to block 14 of FIG. 1a) may be best explained in terms of two sub-applications that significantly benefit from the present invention; cab dispatch and parcel pick-up. In each sub-application, an operator at the application-specific computer terminal 14 desires to dispatch a vehicle to a particular location. In the cab-dispatch application, as illustrated in FIG. 1b (block 26) for example, a cab may be instructed to a particular address in response to a fare call for a cab. In the parcel-pickup application, a parcel-pickup truck may be requested to pick up a package at a sender's home residence.

In each sub-application, the communication protocol is initiated by the operator at the application-specific computer terminal 14 requesting a report as to the location of all dispatchable vehicles within the coverage area. This may be accomplished using a dedicated line connection 24 to the control center 10 (FIG. 1a), depicted in block 28 of FIG. 1b. The control center 10 then sends a message to each vehicle 22 directing each transponder unit to respond (FIG. 1a). This may be handled using a group call to a group of vehicles currently servicing cab calls.

As depicted in block 30 of FIG. 1b, the control center preferably employs a time-division-multiplex(TDM), half-duplex communication scheme for polling responses from each cab in scheduled time-slots. Each cab in the group responds with a status message, which includes the cab's availability to carry a fare.

As depicted in blocks 32 and 34 of FIG. 1b, the response of each cab or vehicle is received by at least four of the base stations and, thereafter, communicated to the control center, which then uses a position-determining method, in accordance with the present invention, to identify and report the location of each responding vehicle to the appropriate application-specific computer terminal.

Upon reception of this report and as represented in blocks 36 and 38, the application-specific computer terminal executes a customized program that selects which of the responding vehicles should be instructed to the target location. A data message is then sent to the selected vehicle, via the control center and the base station which is closest to the vehicle. The data message commands the vehicle to the target location and provides any additional information which may be of help to the driver of the vehicle before arriving at the location. Depending on the requirements of the application, an acknowledgement or other type of communication between the computer terminal and the selected vehicle may follow. The status of the vehicle changes at this point from "available for fare call" to "enroute." This new status is reported to the control center in its response the next time the vehicle is polled.

In block 40 of FIG. 1b, the status of the cab or vehicle is shown changing from "enroute" in response to the driver hitting the appropriate button after the passenger is dropped off at the target location. Alternatively, the vehicle may be periodically polled to determine whether or not it has arrived at the target location. Periodic polling in this manner by the computer terminal, via the control center, allows the operator of the application-specific computer terminal to track the cab from its origin to the target location.

In each of the vehicle recovery, the emergency medical alert and the intelligent vehicle routing applications, the owner of the vehicle is a subscriber to a system in which an application-specific computer terminal monitors the status and/or location of the owner's vehicle. In the vehicle recovery application, for example, the owner of the vehicle subscribes to a system in which an application-specific computer terminal monitors the status and location of the vehicle at certain times when the owner is away from the vehicle so that it may be located when the vehicle is stolen. These communication protocols may be initiated by an action at the vehicle or by the control center, depending on the manner in which the customized design for the application-specific computer terminal is implemented.

In the latter situation, the application-specific computer terminal provides the control center with a list which indicates the identity of each vehicle that should be regularly polled and the interval between each poll for each vehicle. At each vehicle poll, the vehicle responds by sending back a status message indicating one or more of several statuses; for example: owner absent, vehicle situation unchanged, mechanical failure, flat tire, out of gas, etc. In response, the control center determines the location of each vehicle as described in the example immediately preceding. In this manner, the control center regularly reports to the computer terminal the location and status of each polled vehicle, and the computer terminal's customized program determines what action, if any, should be taken. Such actions may include: calling the police with location of the vehicle, because the owner is absent and the vehicle has changed position; sending a tow truck to vehicle because of a reported mechanical failure, etc.

A emergency medical alert or sensitive material movement application are almost identical to the vehicle recovery application described above. However, in this application the application specific computer terminal 18 (FIG. 1a) polls the vehicle to determine the status of the vehicle's owner or cargo, rather than the status of the vehicle alone. Thus, the messages reported to the application-specific computer terminal, via the control center, include such messages as:"vehicle stopped," and "ambulance needed;" "vehicle moving, and ambulance (or service vehicle) needed to meet vehicle in transit;" "fire-truck needed;" "trauma team needed;" etc.

The intelligent vehicle routing application represents, in a general sense, the transfer of vehicle travel data between the application-specific computer terminal 20 (FIG. 1a) and the vehicles in transit. By using the base stations and the control center to determine the location of each vehicle, a variety of advantages are available. For example, drivers may avoid traffic back-ups by accessing a route guidance application through an application-specific computer terminal to obtain the fastest travel path from the vehicle's present location to a target location.

These communication protocols are preferably initiated by an action at the vehicle, for example by the vehicle owner hitting a status button or the status of the vehicle changing. Two-way communication is initiated in this manner to cause the control center to schedule time-slots for the appropriate base station to poll the vehicle transponder and pickup the vehicle's message via an inward service-request channel. The message pickup is controlled by the same mechanism that delivered the outgoing message delivery, i.e., when a pickup is requested, the system schedules a pick-up "time-window" and initiates the inward transmission (terminal-to-system) via a special polling message.

Figure 1C:
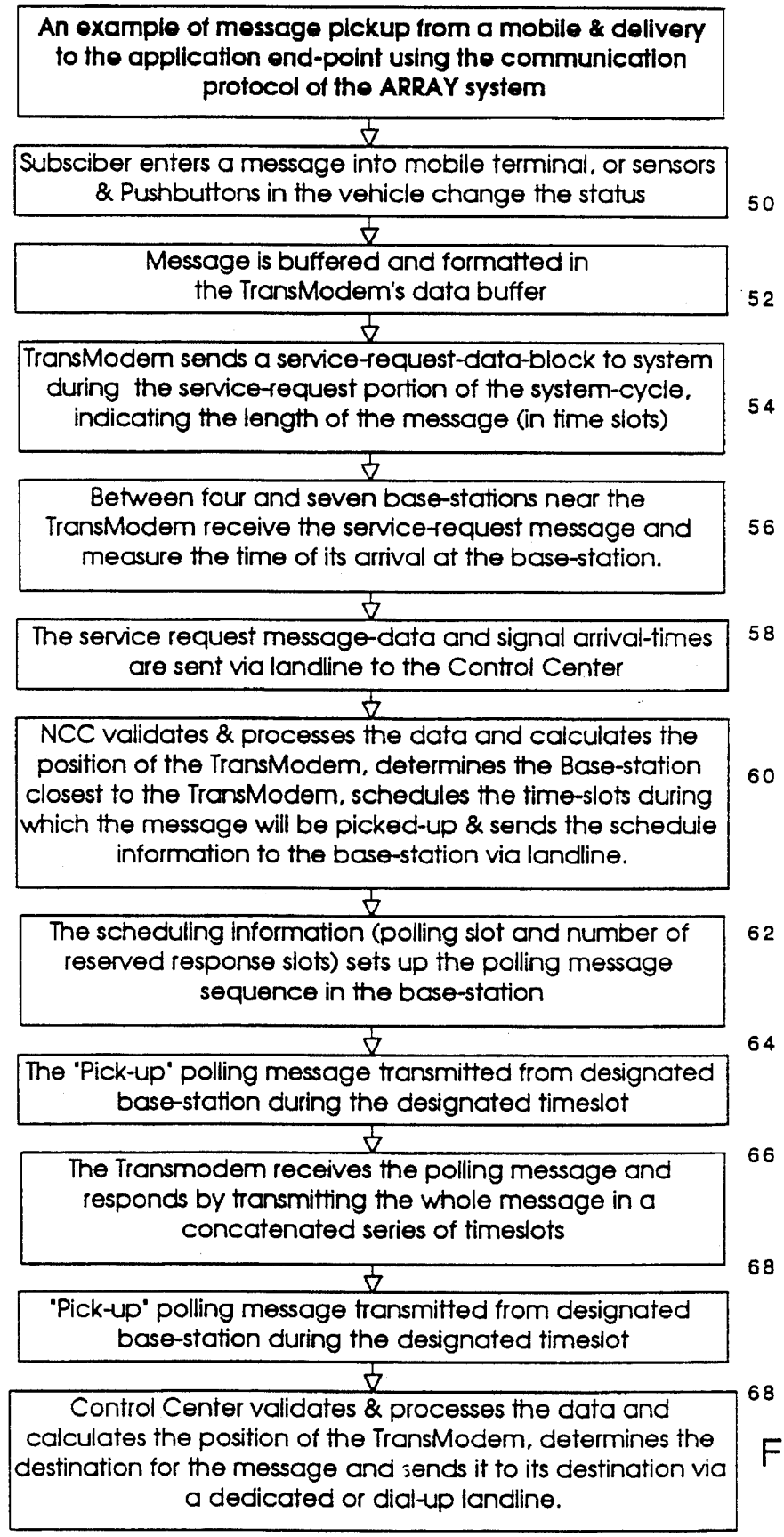

FIG. 1c is illustrative of this application. In block 50 of FIG. 1c and for each application, the subscriber enters a message into the mobile terminal or a message is entered as a result of the vehicle changing its status. The message is stored and formatted therein for subsequent transmission, as depicted in block 52.

In block 54, using the communication protocol of the present invention, the "message pending" status is sent in a service-request-data-block to the control center during the service-request portion of the system-cycle, with the length of the message indicated in time-slot units. Between four and seven base-stations near the transmitting vehicle receive the service-request message and measure the time of its arrival at the base-station, as depicted in block 56. Once the service request message-data and signal arrival-times are received at the control center (block 58), the control center: validates and processes the data, calculates the position of the vehicle, determines the base station that is closest to the vehicle, schedules the time-slots during which the message will be picked-up by the selected base station, and sends the scheduling information to the base-station (block 60). The scheduling information (polling slot and number of reserved response slots) is used to set up the polling message sequence by the base-station (block 62). Accordingly, the selected base station sends a "pick-up" polling message to the vehicle in the designated time-slot, as depicted in block 64.

In block 66, the vehicle receives the polling message and responds by transmitting the whole message in a concatenated series of time-slots.

After receipt from the vehicle, the base station transmits the polling message to the control center (block 68). The control center then validates and processes the data and calculates the position of the vehicle, determines the destination for the message and sends it to the application-specific computer terminal 16, 18 or 20 via a dedicated or dial-up landline, as illustrated in block 70.

Figure 2:
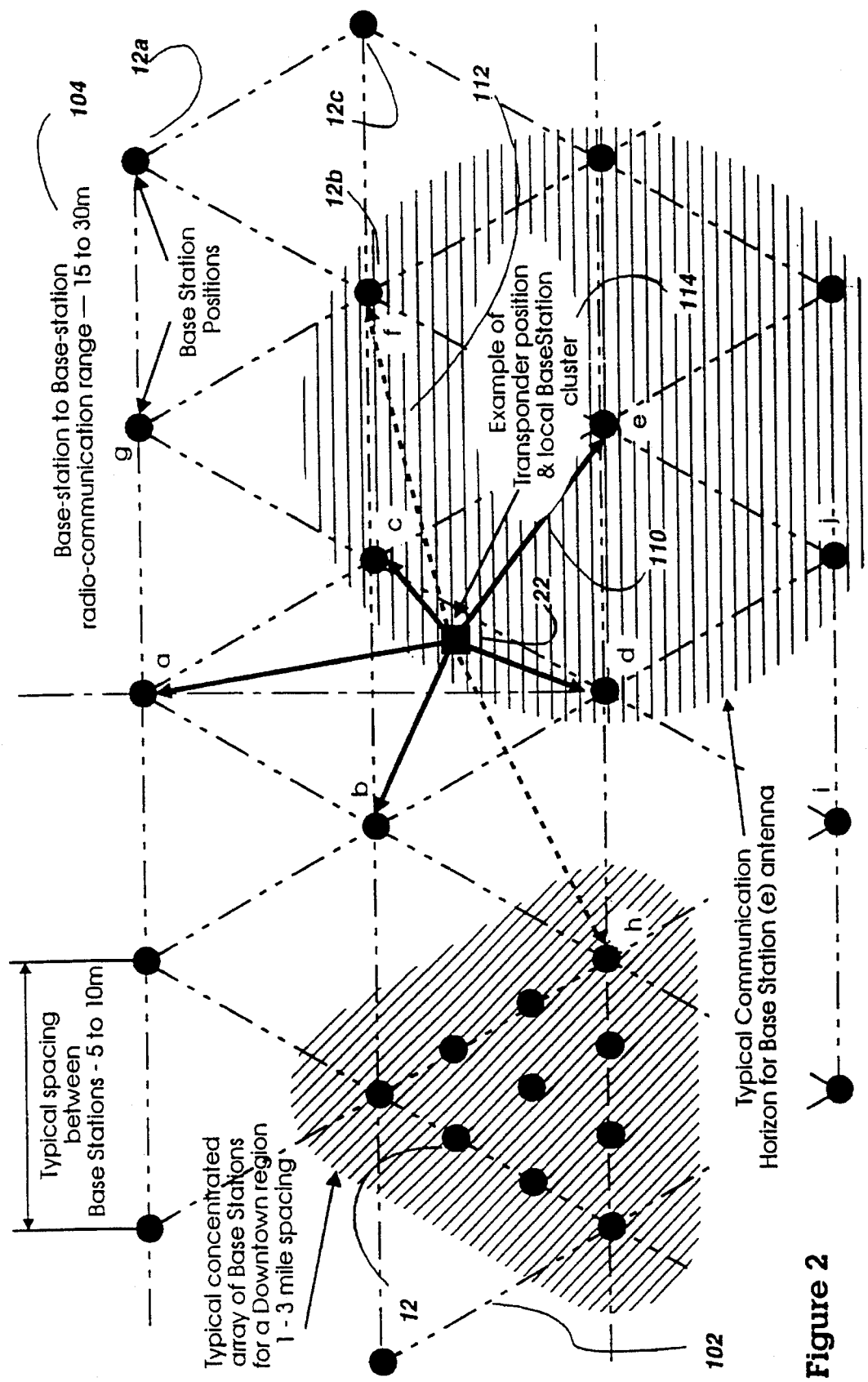
FIG. 2 is another system diagram of the present invention illustrating a preferred manner in which the base stations of FIG. 1a may be arranged in urban and nonurban areas.

FIG. 2 illustrates the vehicle 22 and the base stations 12 of FIG. 1a in a preferred arrangement for reliable vehicle location determination. This arrangement of FIG. 2 may be used to service a typical urban area in which vehicles communicate with their respective application-specific computer terminals (not shown in FIG. 2) in a downtown area 102 and in a less dense surrounding area 104.

The ARRAY system uses an array of base station transceivers with a communication range of between 1 and 15 miles. For the purposes of estimating the array coverage, each base station transceiver can normally provide multilateration-coverage for between 10 and 100 square miles, but additional signal strength requirements in downtown urban areas may reduce that to less than 3 square miles. The data-communication coverage range can be up to about 900 square miles per base station. The size of the coverage area sewed by a single control center is dependent upon economics and message traffic patterns.

Initially, shortly after a system is installed, the total traffic volume is likely to be small, and a single control center can practically support a region of up to about 100 miles in diameter (about 7,000 to 10,000 square miles. In this case, the probable size limit is set by the consideration of network communication costs between the control center and all base stations in the network. However, as the message traffic grows, and in large metropolitan areas it is expected to grow quite rapidly, the limiting factor can become the transaction handling capability of the control center's computer system. A simple method for off-loading the message traffic is to distribute the traffic-processing load across more than one computer. At such a point (of traffic loading) the coverage area can be divided into separate areas, each served by its own control center.

Normally all the base station transceivers in a coverage area operate as a single integrated unit, coordinated by the control center. When the message traffic level in a service area becomes too high (through subscriber or application growth) for one control center to handle the coordination load, the control center's software allows the same coverage area to be served by multiple control centers. After dividing the base stations of the large, high traffic area into smaller, separate, adjacent coverage areas, each base station in the new smaller area is connected to its respective control center. To maintain continuous coverage, the control centers share the information gathered by the base station transceivers in operation along the common boundaries between two adjacent areas, with a prearranged priority for handling the respective mobile transponders.

The solid lines 110 in FIG. 2 represent the ideal range of a vehicle 22, with the base stations (designated a, b, c, d and e) within that range falling within the coverage area defined by the circle 114. The base stations slightly outside that encircled range, designated f and h, provide only marginal communication with the vehicle 22.

Most of the operations between the control center and the vehicle transponders occur in response to polling signals transmitted from the control center to specific transponders. The present invention employs a message-collision avoiding polling scheme to quickly locate a randomly positioned transponder within the array. Base stations that simultaneously transmit the polling signal are chosen in such a way that their communication coverage areas do not overlap in order to avoid message-signal collisions from occurring at the vehicle transponders. Such collisions occur, of course, when the signals from two base stations having similar amplitudes are received by the vehicle transponder at slightly different times.

Since a polling signal may not reach the intended transponder from any given selected base station and adjacent base stations do not transmit simultaneously to avoid the aforesaid collision, the polling signal must be transmitted from the different sets of base stations sequentially until the vehicle transponder is found. Rather than sequencing the signal through each base station, one base station at a time, the present invention divides the base stations into a plurality of groups, preferably three, with each group comprised of non-adjacent base stations.

Figure 3A:
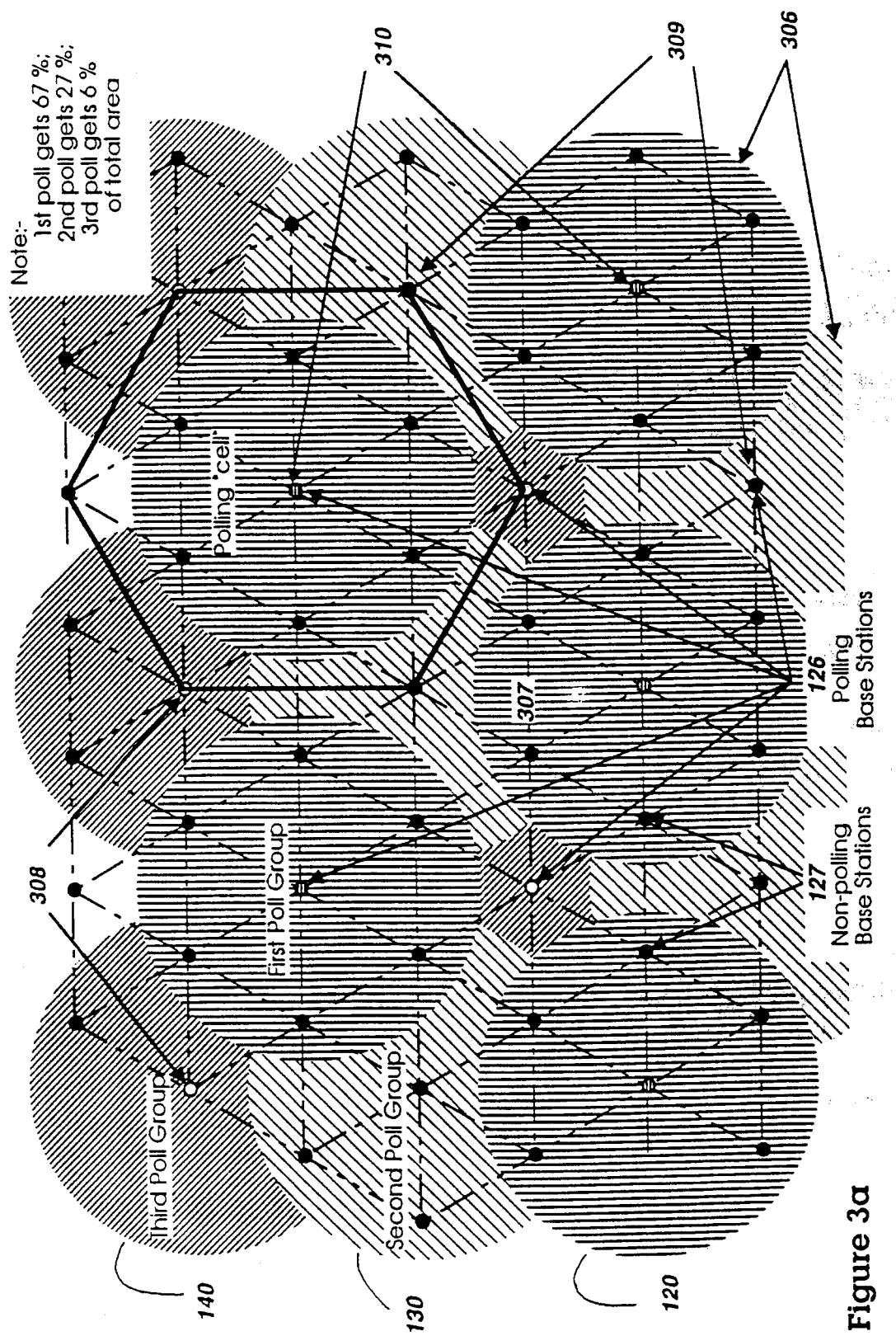
FIG. 3a is another system diagram of the present invention illustrating a preferred manner in which the base stations of FIG. 1a may be arranged to sequentially poll all vehicles throughout a relatively large coverage area.

FIG. 3a illustrates a preferred manner in which the control center locates a vehicle that may be located anywhere within the coverage area using three base station groups 120, 130 and 140 to transmit the polling signal. First, the base stations of the first group 120 transmit the polling signal simultaneously, and, if a response is not detected by one of the base stations in the array, the base stations of the second group 130 transmit the polling signal simultaneously. If a response is still not detected by one of the base stations in the array, the base stations of the third group 140 transmit the polling signal simultaneously. After each group of base stations transmits the polling signal, the control center waits for one or more of the base stations in the system to report that the targeted vehicle responded and, in the absence of any such response, the next group of base stations is instructed to transmit the polling signal.

The polling base stations in FIG. 3a are depicted as points 126 in the center of each poll group, while the non-polling base stations are depicted as points 127.

The statistics for reaching a randomly positioned transponder (capable of responding) by using this non-overlapping polling scheme is 67% on the first poll, 27% on the second and 6% on the third, thereby providing a highly efficient vehicle locating scheme. Thus, only three tries are required to reach 100% of the coverage area.

This scheme is usable only if the communication range of each base station is effectively limited by the horizon that it "sees." (i.e., communication via diffraction and other edge effects is minimal over the horizon.)

When horizon delimiting is not possible, such as in a high-density downtown array, or when other requirements force tower heights greater than those needed for limiting the horizon, then the number of polls required will depend on the requisite co-channel interference margin between base stations.

Figure 3B:
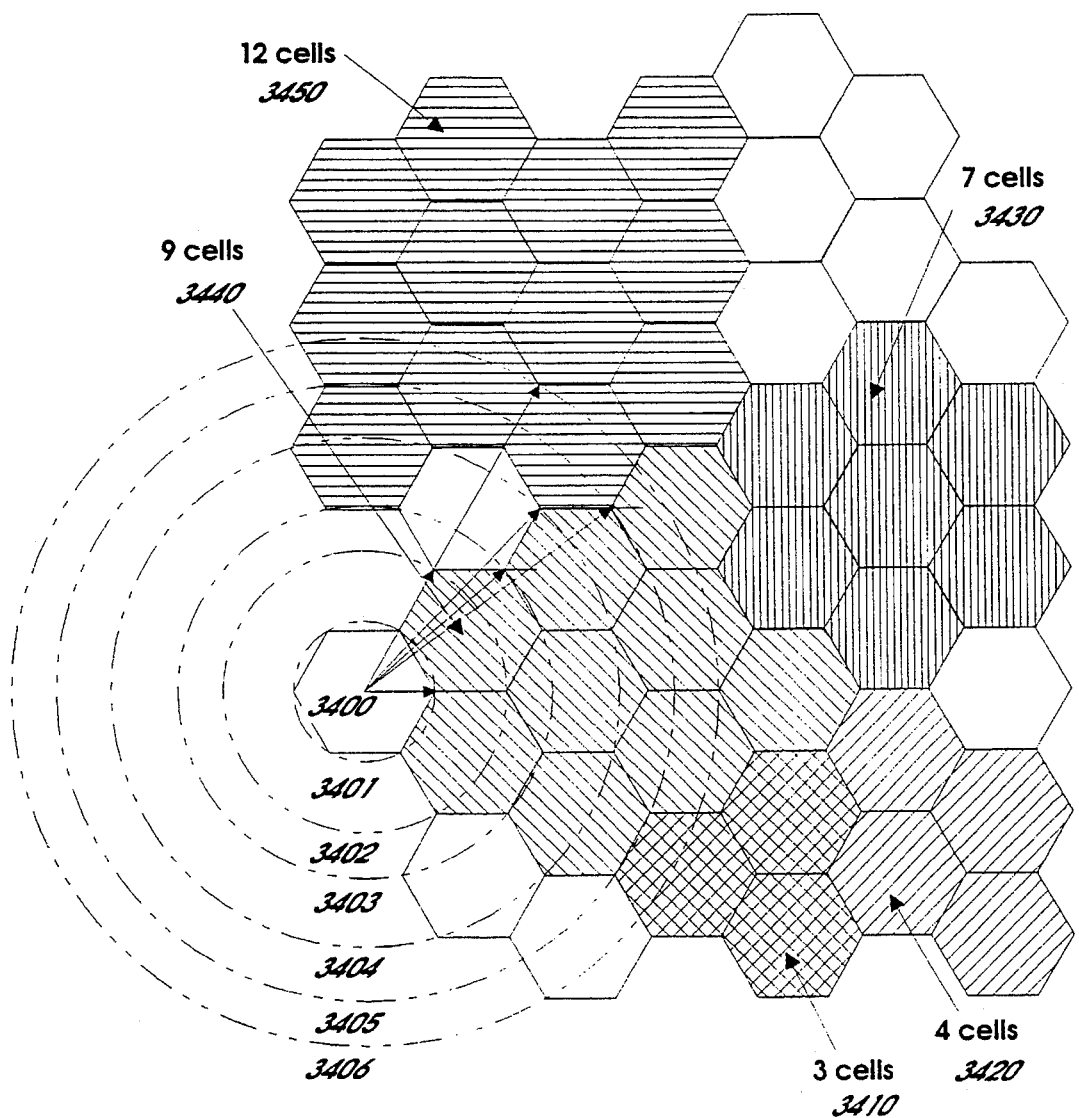

FIG. 3b illustrates the preferred distance between the base stations in a cell reuse scheme for the system of FIG. 1a, in the form of examples of alternative polling patterns and their respective margins. The table shows the co-channel interference levels provided for each cell polling-pattern. The left-hand column shows the ratio of the distance between the current cell center and the nearest edge of another cell transmitting simultaneously. The center column shows the relative co-channel interference levels experienced by a unit on the edge of the current cell, and the third column shows the number of polling groups required to reach 100% of the coverage area, while providing those minimum co-channel interference margins. For example, if the 3 poll-coverage case describe above for horizon limiting did not have horizon limiting, the distance ratio would be 2.002, and the co-channel interference margin at the cell edge would be 12 dB. A pattern requiring 4 polls yields a minimum margin of 19 dB and a pattern requiring 7 polls yields a minimum margin of 26 dB.

Calculating the average-success-rate statistics in the co-channel margin limited cases is more complex. Under the very worst case (interference margins equal to the greatest available from a particular polling pattern), the chances of reaching a target with an unknown-position are the same for each transmission, i.e., 1 in X where X is the number of polls. However, when margin requirements are less than those available from a particular polling pattern, then the statistics improve in the same direction as the horizon limited case above.

The availability of such co-channel margins also makes possible spatially diverse operations, similar in concept to "cellular channel reuse." When the position of particular transponders interacting with the system are known to be in non-interfering "cells," it becomes possible for the ARRAY system to communicate with more than one transponder simultaneously, increasing the overall message-traffic handling capacity of the system. This type of simultaneous "cellular reuse" can be extended to many of the ARRAY system operations, especially to the monitoring of large numbers of stationary vehicle for security purposes. In this case the combination of cellular reuse and dynamic group assignment becomes a very powerful feature.

For example, stationary, or parked, vehicles within the same cell can be dynamically assigned to sets of monitoring groups, and similarly in other non-interfering cells. A single, simultaneous polling "trigger signal" from the nearest base station in each such cell may cause all the vehicle transponders in a group in all the cells to transmit their status messages in the order previously set up. These status messages are preferably sent by the control center to the vehicle transponders during the polling portion of the system cycle.

In the event of a service-request initiated polling transaction, the base station transceiver nearest the requesting transponder is the only control-transceiver transmitting the polling signal, and the chances of reaching the transponder in a single poll reaches nearly 100%. In order to allow for transponders to initiate service requests, a small portion of the system cycle is set aside to allow for this random initiation of requests, as previously described in connection with FIG. 1c.

The ARRAY system can accommodate a large population of transponders, one for each vehicle and each with an individual "address," wherein each transponder continuously listens for a possible message from the control center which contains that address. Each broadcast message is received by all receivers, but the only receiver that responds is the one whose internal address matches the address broadcast in the message. This is unlike most conventional bidirectional radio-data communication systems, in which the implementation paradigm has been the telephone. For example, to send data between two points, a "connection" or "channel" is typically established between the points, the data is transferred or interchanged and the connection is released, (to allow the equipment or channel to be used by others).

The ARRAY system's communication protocol has been optimized to efficiently use air-time while delivering relatively short messages (e.g., tens to hundreds of characters), which are characteristic of most of the messages used in mobile data-message delivery applications.

In comparison to the "telephone" model, in which a significant portion of the total message delivery time for short messages is consumed just in establishing the "connection channel," the ARRAY paradigm has no "connection" set-up, and there is no airtime lost other than the small address information overhead carried in the header or "address label" of each message. To satisfy the requirements for efficient air-time usage, and to integrate the high-capacity radio position determination function with message-packet-delivery, the ARRAY system delivers messages between endpoints only while functioning as an integrated system.

While the operation of message delivery in the manner of the common digital-radio-pager is well known, the airtime-efficient, reverse messaging process requires more discussion. In order to minimize collisions, the majority of the system's message delivery operations are controlled activities, scheduled by the control center. The ARRAY system accomplishes two-way message delivery in an airtime efficient manner by using a hybrid access method for the return message path. A variable portion of the airtime is set aside by the control center to allow the mobile units to request service. These service requests are allowed to occupy only one time-slot and transmission by the mobile transponder is synchronized to the numbered time-slot operation of the system.

The mobile gains access to the system by transmitting a one-time-slot duration service-request message during the service-request period of the system cycle, requesting, for example, that a inbound message be "picked-up." The message pickup is controlled by the same mechanism that delivered the outgoing message delivery, i.e., when a pickup is requested, the system schedules a "time-window" for pick-up, and initiates the inward transmission (terminal to system) via a special polling message.

Figure 4:
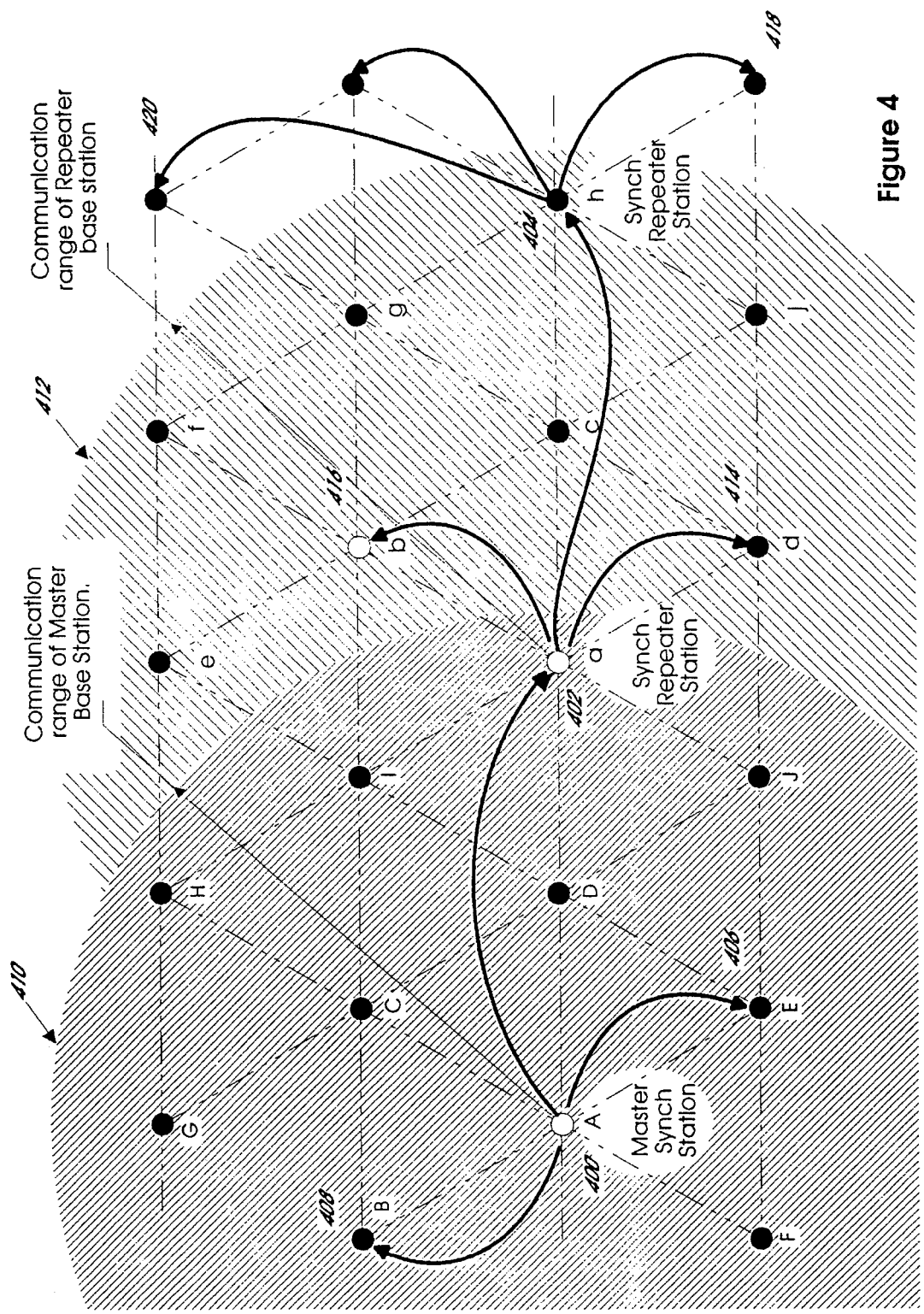
FIG. 4 is yet another system diagram of the present invention illustrating a preferred manner in which the base stations of FIG. 1a may be synchronized to a common clock.

As shown in FIG. 4, the ARRAY system includes the base stations being linked together according to a clock signal generated from a master synchronization station 160. The clock signal is important because, inter alia, it ensures that the time measurements made at each base station are accurate so that the location of the vehicles pin-pointed with precision.

A number of system operations are required to ensure proper operation of the position determining array. Some of these functions are handled via conventional landline or microwave links between control centers, but those to be considered here are handled with or through the base station array. They include network-wide time-base synchronization, through-put optimization, system calibration operations, adjacent region time-base synchronization, base station identification and timecode identification. Calibration operations may include specific timing exercises to correct for variations in propagation times due to atmospheric variations like humidity, temperature and pressure, or to recalibrate delays through equipment due to equipment aging or temperature variations.

High-resolution radio multilateration involves precise measurement of the differential arrival time of ranging signals at pairs of base stations that form a measurement baseline. Since radio signals travel at the speed of light, approximately 0.98357 ft. per nanosecond through air, each nanosecond in timing error introduces a ranging error for that measurement of approximately one foot. Further, since clock-errors are only one element in the total error budget, their error contribution must preferably be minimized.

One method for minimizing the drift between clocks is to use very stable clocks, such as cesium beam or rubidium beam atomic-resonance clocks. However, they are very costly, and function mainly to provide very exact standards of time interval, rather than mere constancy of rate. Even the very smallest error in rate between two clocks will accumulate into a significant error if given enough time.

Rather, what is needed is the ability to keep the clocks at the various base stations accurately in synchronism, even if the exact frequency is not known to the degree that is required to keep independent clocks running in synchronism. The exact "ticking" frequency of the station clocks (for example 381.5 MHz) is not very important in the present invention because the ultimate measure is physical position, and respectively, distance, such as the position of and distance between two base stations forming a measuring base-line. These physical positions are determined independently by such means as geographical survey with theodolites and tape measures or laser distance ranging equipment and, as such, form the primary base-line for location determination. Since the distances between base stations are accurately known, signals transmitted between base stations are used to calibrate the clock's tick-rate constants in ft/tick. In this way all time measurements are reduced to equivalent distance measurements.

As discussed in greater detail later, the system's radio protocol operation is organized around a constantly repeating cycle. The cycle is divided into three different modes, during which the system accomplishes different tasks. During the system housekeeping mode, the system accomplishes functions that relate to the maintenance of specific system related functions, including overall system time synchronization.

At precisely spaced intervals, (approximately one second apart in the preferred embodiment) one of the base stations, chosen to function as the "mastertiming" base station, transmits a timing message to all the nearby base stations within communication range. While the exact interval is unimportant, it is important that it be stable, since the whole system will periodically be calibrated to that interval.

According to the signal modulation/demodulation scheme described in greater detail later, the timing message also consists of a burst of data symbols, where each data symbol is capable of serving as a high-resolution ranging pulse. Again, according to the procedure for resolution improvement by multi-measurement averaging described later, the resolution arrival time of the message is increased. From this single message, the local arrival time of the synchronizing signal is determined, and it is used as the baseline for all other timing measurements for this base station during the rest of the current system cycle.

Figure 32A:
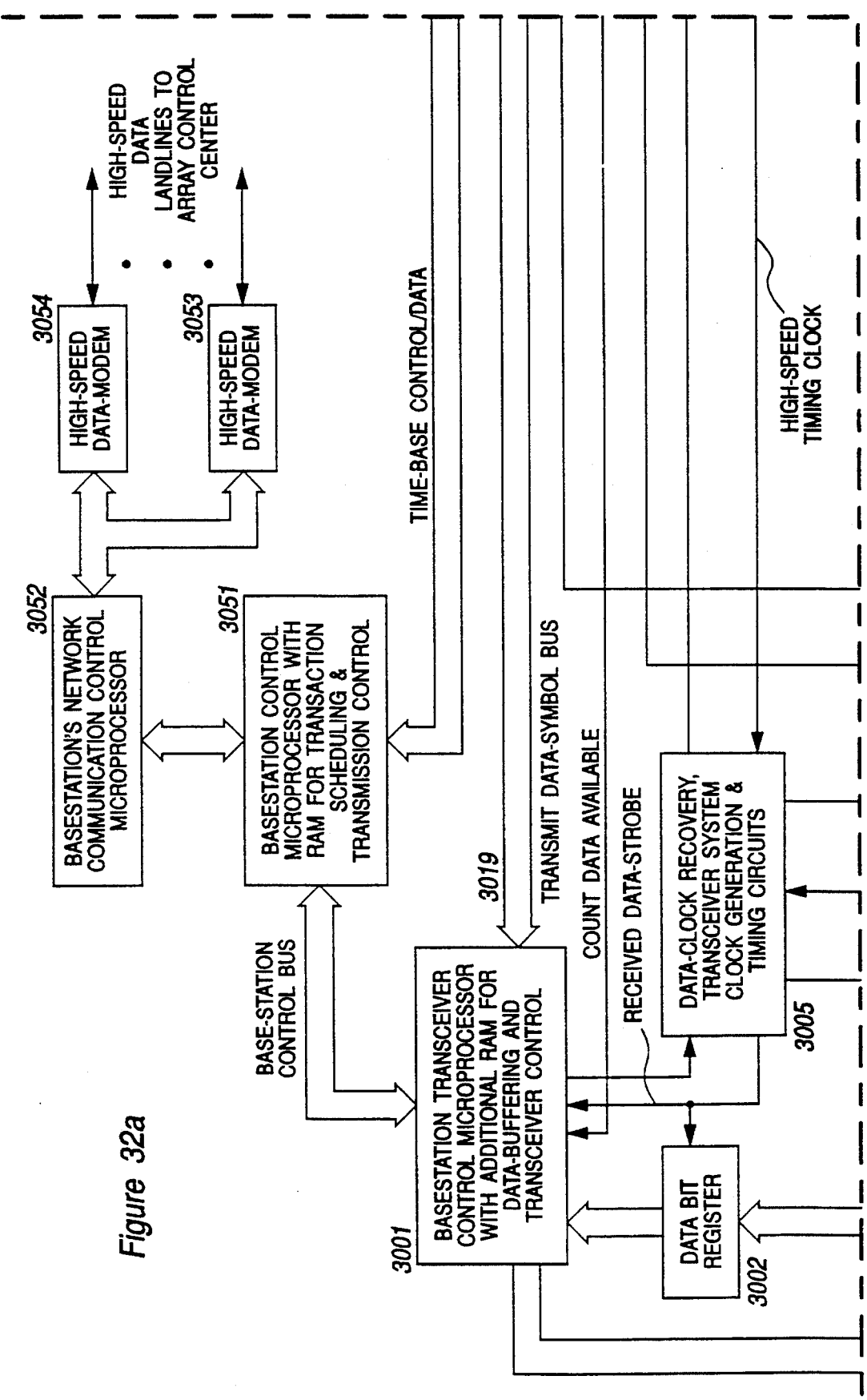

At the beginning of the next system cycle the process repeats. However, at this time, both the previous arrival time and the current arrival time are known. The time difference between the two events is calculated and compared to the number of ticks representing the interval for the remote time-base clock in the master base station, which number is a system-wide timing constant. If the local calculation shows the local clock is running "fast", i.e.,the number is too large, then the local clock controller (microprocessor 6019 in FIG. 39 and in block 3056 in FIG. 32*c*) will appropriately slow the clock down, if too small, then speed it up.

At the time of each additional synchronization message is received, the measuring interval, and correspondingly, the measurement resolution, increases, so that within a few dozen system cycles, the effective average rate is measurable to a resolution that reaches the sub-nanosecond per second range, and the synchronization control algorithm fine-tunes the clock rate to have negligible rate errors.

Thus, after this operation has been performed at every base station, each measurement of signal arrival time from a mobile transponder is preferrably related back to the arrival time of the synchronizing signal from the "master" base station. the exact radio signal propagation velocity was known, then combining this knowledge with the accurately known base station geographic location data, the position of each mobile transponder is preferably computed from its received message.

However, the propagation velocity of radio signals in the atmosphere is not constant. Typically it can vary in air by up to 100's of PPM depending on temperature, humidity and barometric pressure. A 100 PPM difference in velocity will make a 1 foot difference in a two mile ranging measurement. Also in signal cables and equipment, the velocity of signal in cable can vary, as can delays through equipment due to equipment aging, etc. Each additional nanosecond of delay being approximately equal to a foot. To compensate for this variability, the system is capable of self calibration, by utilizing other system base stations as known test locations.

Once the nearby base stations are synchronized to the "master" base station, other base stations can transmit test and calibration messages. These calibration messages are transmitted (still during the housekeeping period of the system's cycle) at accurately known times (according to their now synchronized clocks), and the arrival of those calibration signals are measured by the other nearby base stations, including the "master" base station.

The instant of transmission of the test and calibration signals, along with their estimated arrival times at the nearby base stations are all sent to the control center. The control center computes the apparent locations of the test base stations, and corrects the apparent atmospheric propagation velocity and equipment delays (primarily the delay between the antenna-array on the tower and the measuring equipment in the equipment-room), so that the corrected positions agree with the actual positions.

Note that while the exact time of transmission is not theoretically necessary for an accurate position fix, having that information simplifies the extraction of the equipment delays from the overall propagation delays.

The communications between base stations are always line-of-sight with both transmitter and receiver enjoying a great height advantage compared to the mobile transceivers. Inter-base station communications also take place at much higher power levels and with high-gain antenna systems at both ends of the link. Therefore the base station's transceivers typically measure the arrival times of any test and calibration message with a resolution and accuracy of less than a nanosecond.

In this way the objective of providing very accurate timebase synchronization is achieved without requiring ultra stable clocks. Further, the system of base stations is capable of continuous recalibration to compensate for variations in propagation velocity and equipment delays due to temperature and other environmental factors.

As illustrated in FIG. 4, the master timing signal transmitted from 400 normally reaches all the base stations within range of the master base station, such as 402, 406 and 408. However, base stations below the communication horizon, such as 404, do not receive the signal, and in this case the signal is repeated by a time-base repeater base station such as 402.

Each such repeater base station retransmits the synchronization signal with its own unique identification code, along with the repeat delay (i.e. the sum of the delay between timing signal's reception and retransmission for each repeater in the link) for that station so that any base station transceiver receiving it can identify the signal's origin and know its time-offset from the source synchronization signal. This signal then serves as the source timing signal for the next annular part of the local coverage area.

Each base station reports the total offset of the timing signals it receives (since the route via which it receives the timing signal may change due to repeater station failure and reassignment) along with other housekeeping information it reports to the control center every cycle. The base station also reports all signal arrival time measurements in relation to the arrival time of the master-time-synchronisation signal for the current cycle. In this way, the master timing synchronization is propagated throughout the local coverage area and all timing measurements are related back to the master-timing signal or its repeated versions.

Under certain application conditions it may be possible to make use of the spatial diversity of the base station array to allow the simultaneous reuse of the communication channel elsewhere in the coverage area, somewhat like the reuse of cellular frequencies in the cellular radio telephone implementation. In this case, transponders could simultaneously be polled in diverse parts of the coverage area, without causing interference to each other by virtue of their separation from each other. This is one potential method for increasing the message throughput capacity of a particular control center whose message traffic volume is such that it is limited by available airtime, rather than processing capacity, (such as may occur when large volumes of longer messages are being exchanged).

When a particular coverage region is sewed by more than one control center, typically because the message-traffic volume has become too high for one center to handle it economically, there will be a common boundary between the areas connected to each of the control centers, and mobile transponders operating in that boundary-zone would simultaneously be communicating with both centers. To provide unambiguous service operation in this zone, control centers share the information gathered by the base station transceiver stations in the zone, and the timebase synchronization, as outlined the section above, is propagated throughout the adjacent coverage regions. Should the chosen "master" base station fail for any reason, the system will detect the loss of available synchronization signals within one system cycle, an alternate base station will become designated as the master base station, and the array will resynchronize to that newly designated base station.

Under normal circumstances, coverage regions that are not adjacent to each other will not require co-synchronization as described above. However, should it become necessary, e.g., in the case that a coverage area is expanded along a "traffic-corridor," so that continuous coverage is required between two otherwise separate coverage regions, then co-synchronization would be accomplished as detailed above, by propagating the timing signal along the corridor from one master base station to the other, during the housekeeping part of the system cycle.

While the transponders do not normally have time-of-flight measuring facilities, a number of operations require that the transponder operate in synchronism with the system cycle. Examples are: system housekeeping functions, random service requests, group-polled responses and battery-saving operations. These function are maintained in synchronism with the system's timing by local quartz controlled timing circuitry. The timing circuitry is reset to the system time whenever the time-identification data in the housekeeping data is received and the local-time error is found to exceed an acceptable amount. This error will continuously occur due to variations in propagation delay as the mobile transponder is moved. However, the local timebase rate will be accurate enough so that it will not need readjustment.

Figure 6:
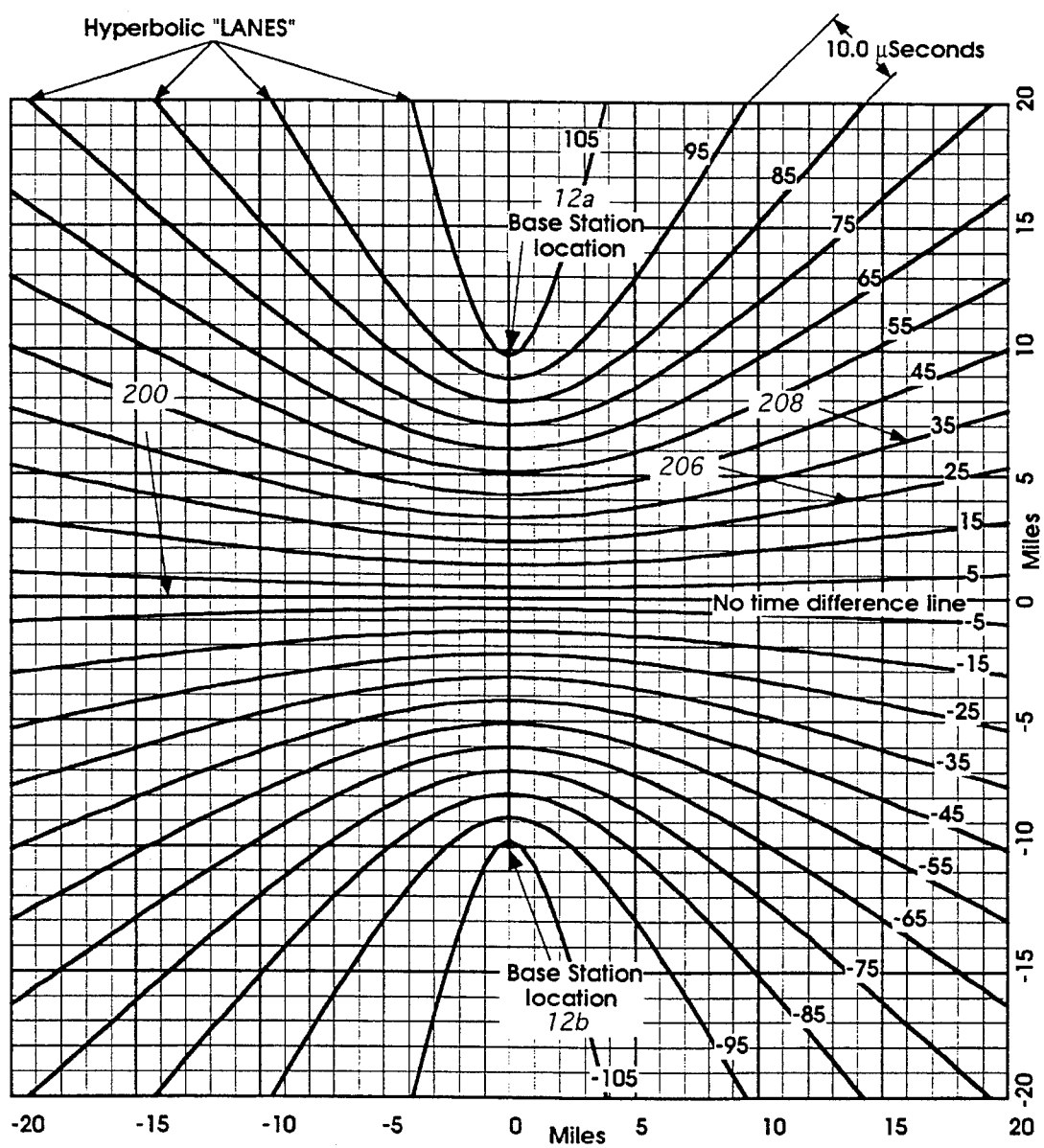
FIG. 6 is a hyperbolic graph illustrating a manner in which hyperbolic lines of position may be used for geographic location.
Figure 7:
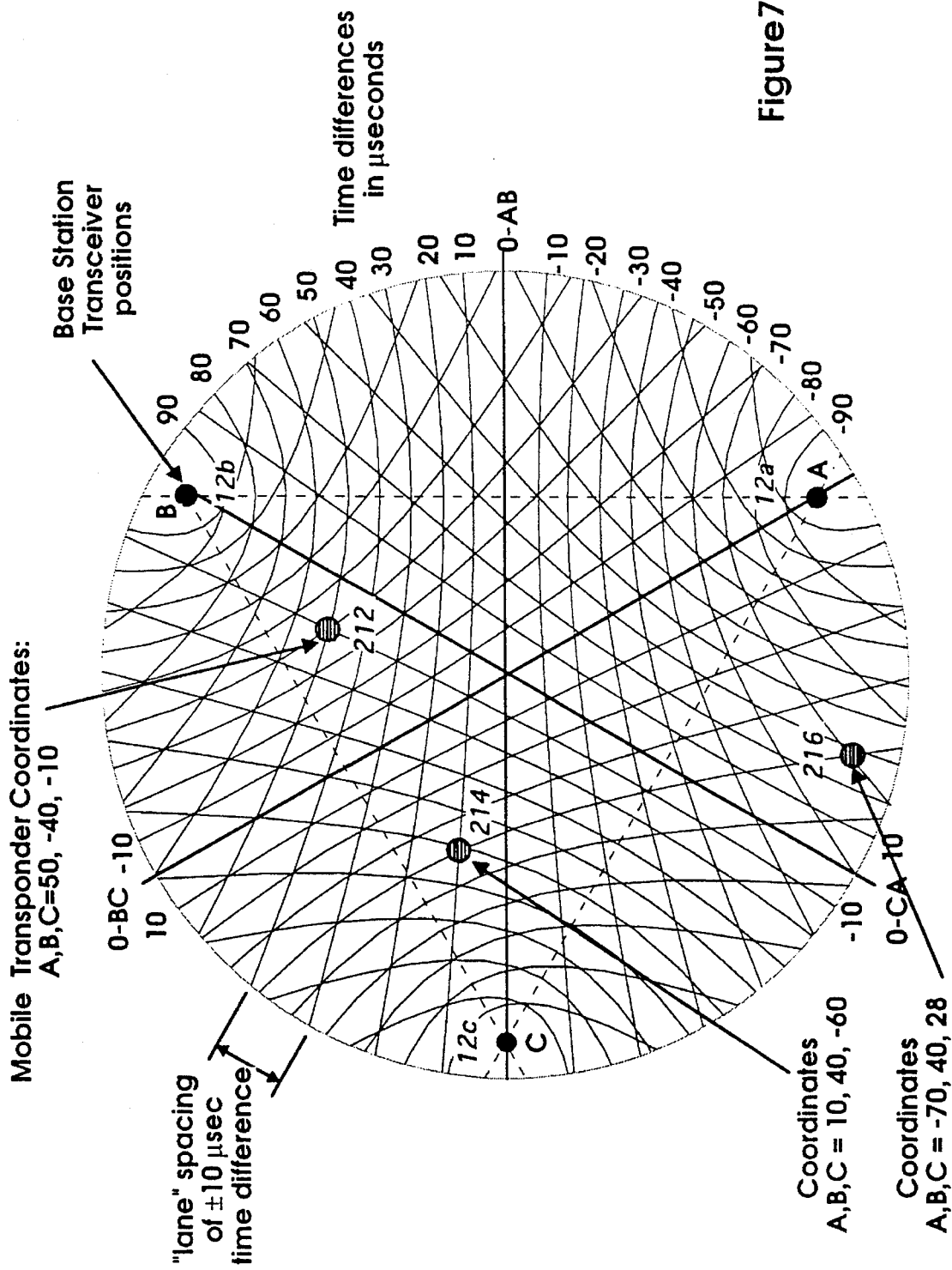
FIG. 7 is a set of hyperbolic graphs illustrating a preferred manner in which the position of transponder units may be located using intersecting hyperbolic lines of position.
Figure 8:
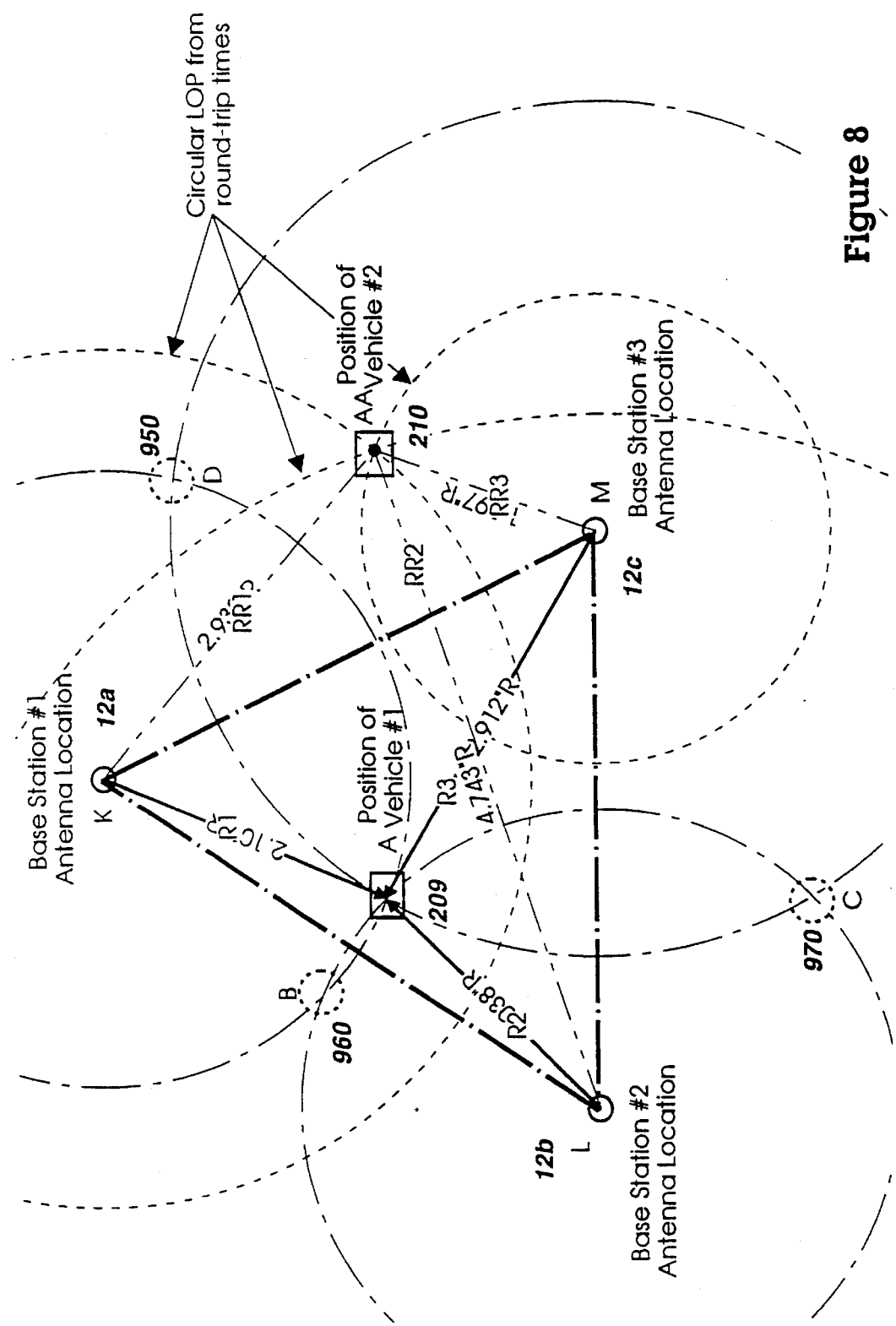
FIG. 8 is a diagram illustrating a radius-radius type multilateration technique which may be used to identify the location of a transponder unit transmitting in the system coverage area.

Referring now to FIGS. 5–8, one of two preferred methods is used for vehicle (or transponder) location. The method illustrated in FIG. 8 is a radius-radius type multilateration technique, and it uses the round-trip flight time of the pulse signal, from which a radial distance from the base station to the transponder can be implied. This method identifies the location of the vehicles 209, 210 by the intersection of three respective circles (circular lines-of-position in two dimensions, or spheres of position in three dimensions) for each base station with the radius of each circle being equal to the calculated value "R" for the respective base station. Details for the implementation of this method are discussed further in relation to FIG. 32, below.

Figure 5:
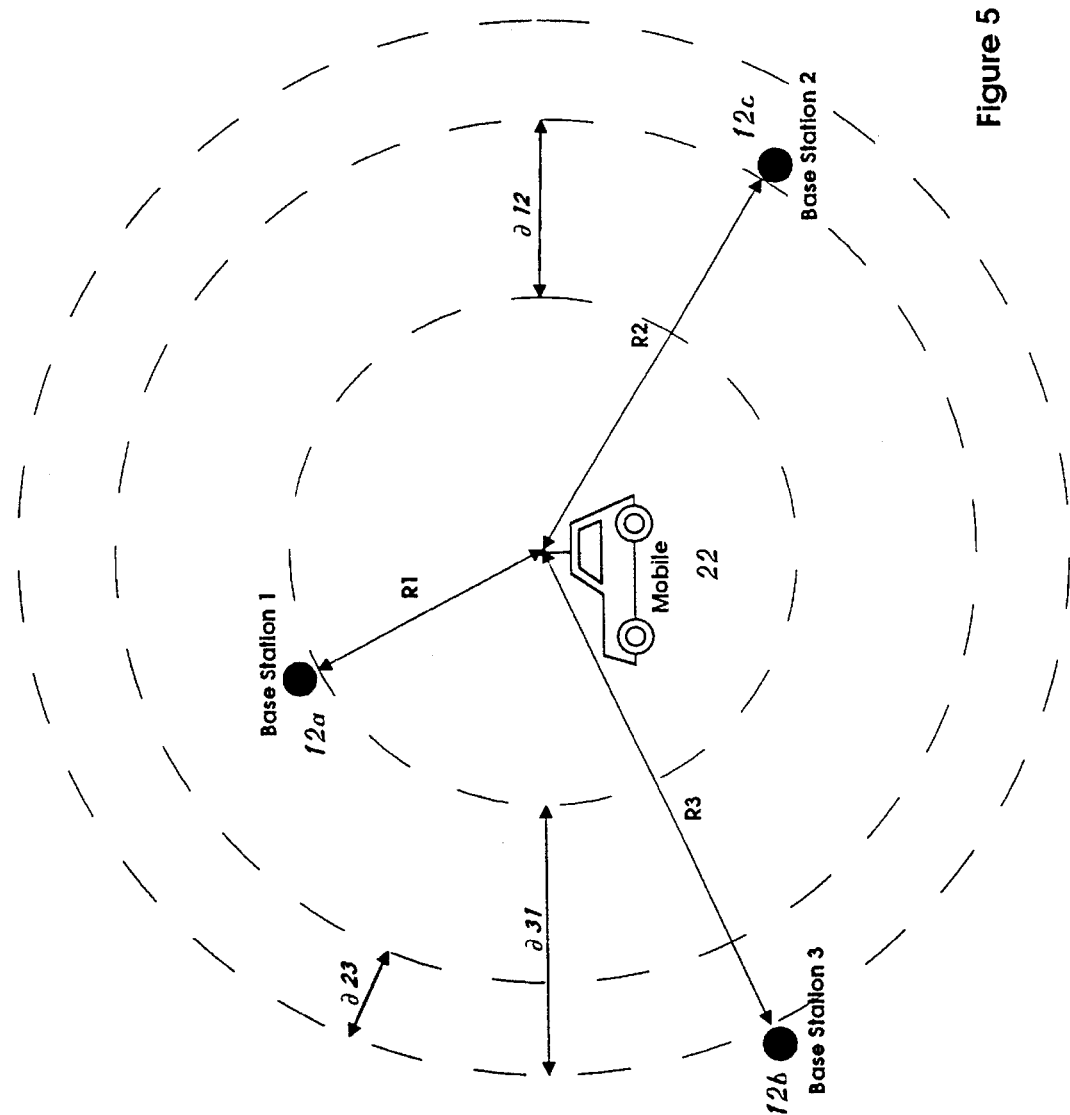
FIG. 5 is a diagram illustrating a preferred manner in which a vehicle in the system of FIG. 1a may be located using time-of-arrival measurements.

For example, FIG. 5 illustrates a preferred manner in which a vehicle 22 in the system may be located using time-of-arrival measurements. A transmission from the transponder in the vehicle 22 may transmit a communication within the system coverage area at a radio-signal velocity of "c" (the propagation velocity of light and radio waves). Assuming that base stations 12a, 12b and 12c receive the transmission without error, each base station computes the travel time of the communication by measuring the distance in time between the beginning of the slot (when the communication commenced) and the time at which the beginning of the communication was received.

This information is sent from all base stations to the control center for further computation and vehicle location identification. For example, multiplying "c" by the travel time at each base station yields the distance from the vehicle to the base station, "R". Geographically, the location of each mobile can then be precisely identified using a conventional multilateration technique.

The second, and preferred, method uses the difference in the time of arrival of the pulse signal at pairs of ARRAY base station transceivers, from which time difference a constant path-difference relative to the two base stations can be implied. These constant path differences are used to compute a fix from hyperbolic lines-of-position between each pair of base stations in two dimensions, or hyperbolic surfaces of revolution in three dimensions. It only requires the transponder to have timing accuracy in the range of microseconds, to ensure that the transponder responds within the appropriate time-slot.

This hyperbolic multilateration technique employs hyperbolic arcs two base line base stations, as shown in FIG. 6, which are generated from the corresponding time-difference of signal arriving at a pair of base stations. Rather than computing "R", the control center uses the differences in the travel time between each of three pairs of base stations to identify three of the hyperbolic arcs shown in FIG. 6. The location of the vehicle is then determined to be the intersection of the arcs.

For example, if the respective time differences between the vehicle and each of the base stations 12a and 12b in FIG. 6 is zero, the vehicle is located somewhere along the hyperbolic line 200. If the respective time differences between the vehicle and each of the base stations 12a and 12b is 31 microseconds, the vehicle is located approximately midway between the hyperbolic lines 206 and 208. In order to more precisely identify the position of the vehicle, at least one additional intersecting hyperbolic line must be identified.

FIG. 7 shows three vehicles in the coverage area of base stations 12a, 12b and 12c, with each vehicle 212, 214 and 216 being position-identified using a set of three intersecting hyperbolic lines. For example, the location of the vehicle 212 is 50 microseconds closer to base station 12b than 12a, −40 microseconds closer to base station 12c than 12b, and −10 microseconds closer to base station 12a than 12c. Hence, the position of the vehicle 212 is (50, −40, −10). The positions of the vehicle 214 and 216 may be calculated in the same manner as (10, 40, −60) and (−70, 40, 28), respectively.

Figure 9:
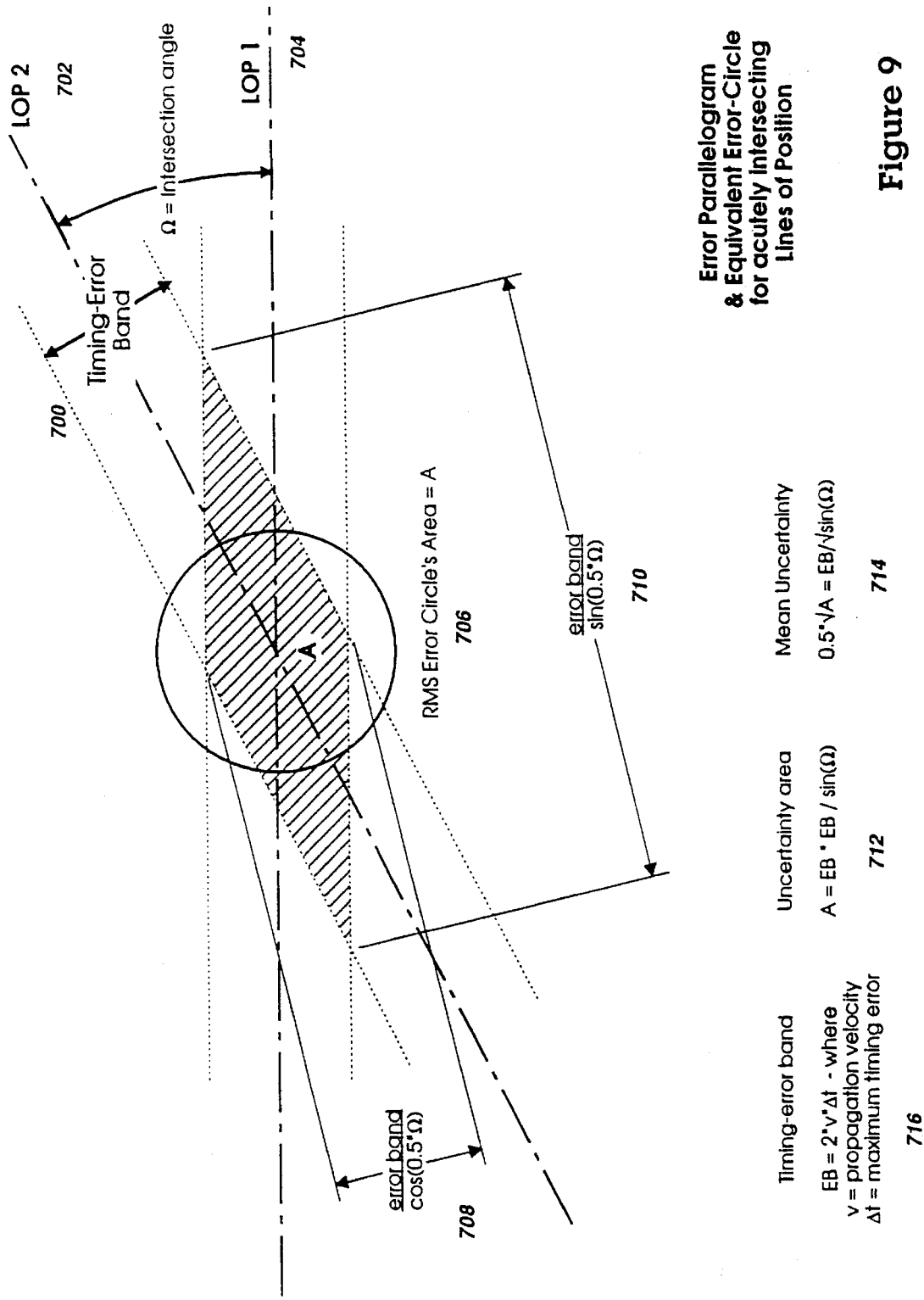
FIG. 9 is an error parallelogram illustrating the error factor in using the hyperbolic graph of FIGS. 7 and 8 for identifying the position of transponder units.

The estimation of the position of the vehicle at certain points in the graphs of FIG. 7 and FIG. 8 will result in greater degrees of error than at other points, given a constant time estimation error. This error is illustrated in FIG. 9. Because each hyperbolic line provides only a linear position along which the vehicle is located, a pair of perpendicularly running lines provides a precise location of the vehicle. However, the more parallel a pair of lines run, the greater the error will be. This follows since the degree of error is commensurate with the area of line intersection.

In FIG. 7, for example, compare the point (0, 0, 0) and the position of vehicle 216. At point (0, 0, 0), the three lines intersect to form five equal angles at 72 degrees each, and the area of intersection between the lines is minimal. At point (−70, 40, 28), however, the three lines intersect at angles much less than 72 degrees, resulting in a much greater area of intersection between the lines.

It should be noted that any timing rate difference (drift) or unknown time-offset (static error) or uncertainties in the time-of-arrival (jitter) will cause corresponding errors in the computation of the lines-of-position, and therefore, errors in the estimated position.

For additional information on radius-radius positioning and hyperbolic positioning, and the related error components, reference may be made to Skomal, supra.

System Organization

FIG. 10 illustrates a system cycle of data transmitted over the ARRAY system. The system cycle is preferably one second in duration (between about 1500–2000 time-slots), but this duration may be varied in each particular system's implementation.

The system cycle includes a housekeeping period, a polled operations period and a service request period. The system cycle's duration has been chosen to satisfy the system's periodic housekeeping requirements to ensure its continued operation within required parameters.

Furthermore, every slot in the cycle and each specific cycle are identifiable. Unique identifiability of each cycle and timeslot are an important part of the operating and communications protocols that make the energy-consumption-reducing features possible, simplify the operation of adjacent regional systems, and provide for the schedulability of all system operations.

Two kinds of time identification are used in the system. First, once every system cycle, the base stations will broadcast the system-time as a part of the housekeeping information. Secondly, there is the time-slot number, (which is also used as the transaction-number for multi-timeslot messages), broadcast by the base stations with every polling transaction. This secondary timing signal can be used by battery-operated portable equipment to quickly enter synchronism with the system cycle.

The duration of a time-slot has been made just long enough to complete one position fix, i.e., to transmit a transponder polling message and receive a transponder response message. The time-slot's duration is the sum of the duration of network polling message plus transponder response message plus the two-way signal propagation delay for the furthest traveling signal (typically equal to base station spacing). During such a position-fix transaction only specific house-keeping information is transferred, along with minimal status information. All other message delivery operations are fit into either a single time-slot(for determining the status of a transponder) or a set of multiple, contiguous time-slots (for message delivery or pickup).

The operation of the network is organized as a TDM system, where the basic building-block element of the protocol is the single time-slot. At the data transmission rates selected for the preferred embodiment, there are between 1,400 and 1,800 such time-slots per second, with the actual number depending on the maximum spacing between base stations. However, the exact duration of each slot and the number in a cycle will depend on the specific geographic and technical factors relating to the particular implementation, most important of which are the maximum design spacing between the specific ARRAY base stations, the available bandwidth and the delay spread in the worst-case radio-communication environment.

During every message transaction, the system transmits cycle identification information, so that any transponder receiving the transmission can become synchronized to the system cycle within only a few transactions. Such synchronization allows mobile equipment, e.g., battery operated, to spend a significant proportion of its operational time in a (low-power consumption) standby mode, using only circuits with very low power consumption to keep track of time. The equipment switches, to fully operational status (normal power consumption), on a "wake-up" schedule previously set up by the system, only to listen to those few time-slots during which the system schedules any messages to be sent to it.

The proportion of polled (transactions scheduled by the central control center) versus non-polled (service requests initiated by random transponders) activity on the ARRAY data channel will continually vary, depending on the mix of various applications activity. Thus, the optimum ratio of scheduled to unscheduled transactions will continually change over time, and the total throughput of the system may be adversely affected by setting a fixed ratio of service-request time-slots to scheduled time-slots. By making this ratio a dynamic system variable that depends on the respective proportions of the traffic types, the total throughput of the system can be continuously optimized.

In this configuration, the system scheduler continually monitors the message collision rate of the incoming message traffic, and sets the proportion of out-going to in-coming messages to occur during the next system cycle by specifying the slot-number of the first time-slot of the service request period, as a part of the system housekeeping information contained in the synchronization signal at the beginning of each cycle. This makes it possible for the system to vary the transmit/receive duty cycle of the system depending on the volume of the "in-bound" versus "out-bound" traffic. For example, when a backlog of polled transactions accumulates, the random-station access-time can be appropriately reduced until the backlog is cleared, or when a large number of random-service request collision occur, it can be extended etc.

Every transmission from a mobile transponder (called an "event" here) reaches at least four base stations, and may reach as many as seven. The information received by the nearby group base station always has the transponder address or the transaction number in common, and the transaction manager in the control center collates all the messages associated with a particular transmission from a transponder into an "event ensemble."

The transaction manager delegates the processing of the ensemble to a slave processor, which validates the data but first performs CRC checking, then multi-message cross-checking, and finally error correction, based on the redundancies found in the multiple-message files. Such multiple message-file comparison/corrections are possible since corruption of each data file is likely to occur at different time instants within the versions of the message received by each base station, so that none of the data is likely to be identically corrupted. The comparison/correction process provides significant improvement over single-path message delivery in the accuracy of the data delivered from the transponder to the application.

When the message traffic processing load for a particular region approaches the capacity of the central control facility, the throughput of the region can be increased by installing another control facility to share a portion of the region's message deliver and position fixing processing load. A portion of the total number of the base stations can be connected to the new control center. This division of the region results in the possibility however, that a mobile can be in certain positions where its signals will reach some base stations connected to the first control center and some connected to the second control center. For these transmissions, the control centers will coordinate their sharing of the information received and the action to be taken by the nearest base station in response to the message received.

A good design of the region split will put the common boundary in areas where the message traffic is expected to be small, such as a suburban area, rather than a major downtown area.

The ARRAY system calculates the position of mobile signal source whenever a transponder sends a message successfully to the system. Therefore a position fix occurs with every polled operation or successful random transponder service request.

The control center will maintain certain information about every transponder that is operational on the system. This will be done for both billing reasons and for purely operational reasons. Every time an application requests a position fix, delivers a message, or the data from a service request or position fix has been processed, the user data will be accessed to confirm valid use of the system, and obtain certain operational characteristics, such as group call addressing, battery-saving schedule, last known position fix, and application dependent statistics, such as number of messages processed, total number of packets exchanged, etc will be updated.

Referring once again to FIG. 10, during the housekeeping period, the control center causes each polling base station to transmit the time synchronization signal over the coverage area, performs network and base station auto-calibration tests, transmits a station identification code (or call-sign) and system time of day, transmits system identification information, and identifies the time-slot that commences the unpolled service request period. Additionally, essential system maintenance functions are performed during the first, housekeeping period. These functions typically include regional base-station timebase synchronization, system, local region, time and cycle identification, traffic throughput optimization, system calibration functions, etc.

During the polled operations, the control center causes each polling base station to transmit a polling message to one or a group of transponders.

The polling message (depicted as block 230 of FIG. 12) includes a data header portion (data sent to the vehicle) and a response packet portion (data sent from the vehicle). The data header packet 230 includes the system identification and operation code, the transaction number of the multi-packeted message (zero, unless there is a message being transmitted which is not yet complete), the transponder address or identification, a control status word (e.g., "turn off ignition"), error check bits and a block preamble which is used to set the gain and indicate that the data is being sent to the transponder, rather than to the base stations.

Figure 12:
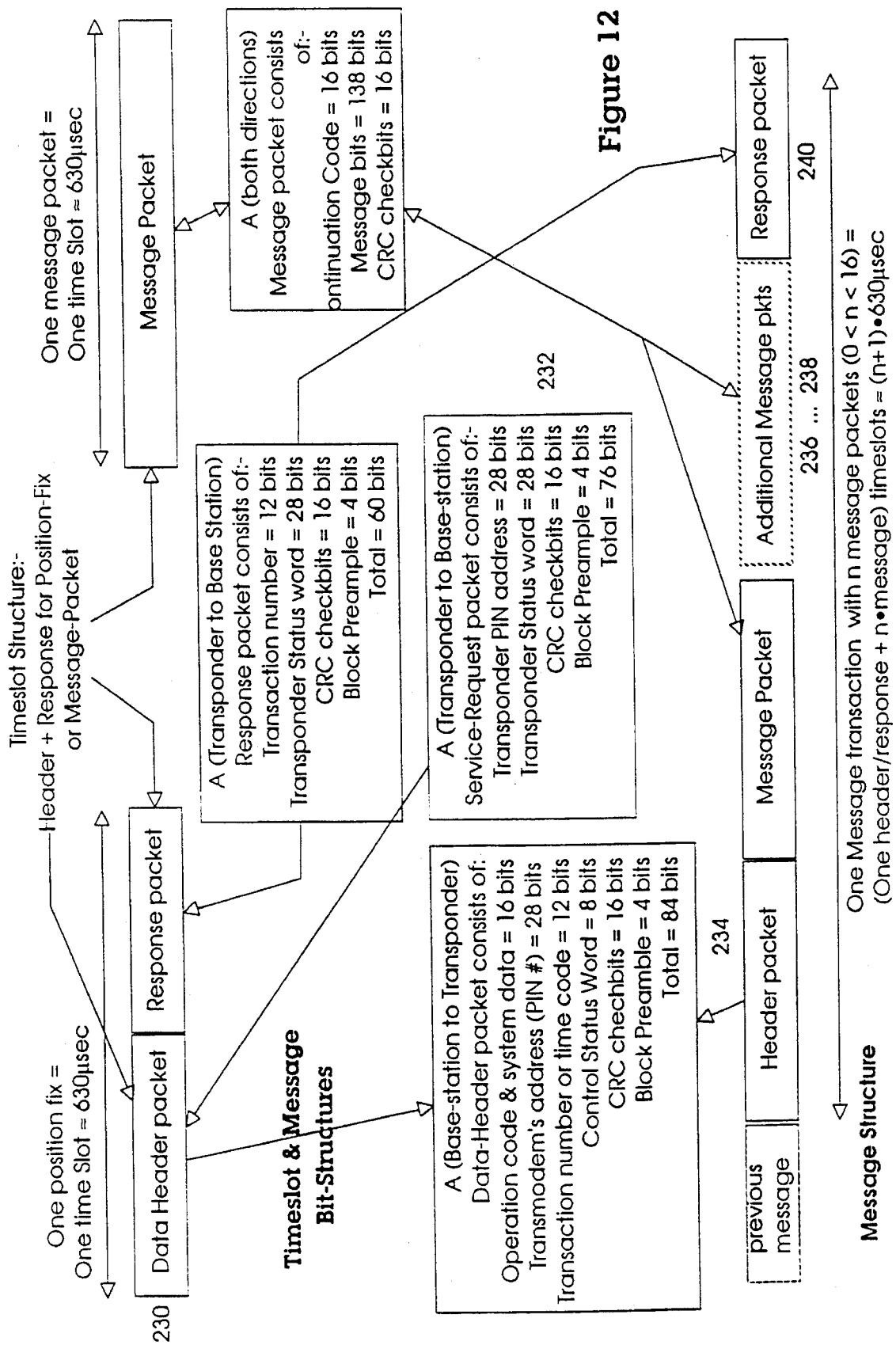
FIG. 12 is a diagram of a preferred bit breakdown of the data sequences illustrated in FIGS. 10 through 11c.

Similarly, as indicated in FIG. 12, the response packet portion includes the transaction number of the multipacketed message (zero, unless there is a message being transmitted which is not yet complete), the transponder address or identification, the status of the transponder, error check bits and a block preamble which is used by the base station receiver to set the IF gain.

The bit breakdown of the message packets is also shown in FIG. 12. It includes the multi-message continuation number, the message bits and the check bits. At the bottom of FIG. 12 is an exemplary message structure, which includes the data header packet 234, a series of message packets 236–238 and the response packet 240 from the transponder in the vehicle.

This portion of the system cycle may include anywhere between zero and the full remaining number of time-slots left in the predetermined cycle length.

The system polls the transponders in the polling portion of the cycle to: locate their position, send messages to the transponders, set-up groups or call situations, and pick up messages during system scheduled time-slots. Polled operations are divided into two classes, based on the number of recipients or respondents to the polling message. Individual polls are used to reach a specific transponder, and group polls are used to elicit responses from variable size or functional groups of transponders. The ability to create groups flexibly through the mechanism of unlimited secondary addressing schemes, creates very power means for applications to access the transponders responding to the applications.

Most of the operations between the base station transceiver array and the transponders occur in response to polling signals transmitted from the base station transceivers to specific transponders. The base station transceivers that transmit the polling signal simultaneously are chosen in such a way that their communication coverage areas do not overlap. This inherently prevents message-signal collisions from occurring at the transponders.

Since the layout of the array of base station transceivers makes it possible that a polling signal may not reach the intended transponder from the selected base station transceivers, a no-response result will cause a different set of base stations to be selected for the next polling attempt.

In the event of a service-request initiated transaction, the base station transceiver nearest the requesting transponder would be the only base station transceiver transmitting the polling signal, and the chances of reaching the transponder in a single poll reaches nearly 100%. In order to allow for transponders to initiate service requests, a small portion of the system cycle is set aside to allow for this random initiation of requests.

The ARRAY transponders operate in synchronism with the network of base stations. At the beginning of each system-cycle, the network broadcasts a group of "housekeeping" messages, including the system's "present time" and start of "service request period." The house-keeping messages are used to perform functions such as base station time-base-synchronization, auto-calibration, ranging-self-diagnostics and synchronization signal propagation. The transponder uses the "present-time" to synchronize it internal timekeeper, so that it can initiate service requests at the appropriate time, and can respond to group-calling polling signals in the manner previously set-up in a group-function set-up message.

Whenever a transponder transmits a message within the coverage area of the system, the system can compute a position fix for that transmission. The radio signal transmitted by the transponder will typically reach from three to seven of the systems base station transceivers. The arrival time of each data-pulse in the message is estimated and locally converted into an enhanced-arrival-time estimate. The data is also extracted from the signal and a "received message ensemble" is sent to the control center. At the control center, the message ensembles are combined into an "event-file," or a file containing each enhanced-arrival-time estimate, and the associated message is transmitted by a particular transponder during a particular time-slot. The control center then sends this event-file to a slave processor to determine the position from the time estimates and to extract and correct the message-data from the multiple message-data samples. The resulting computed position fix and the error-corrected message are then sent to the message handler for communication to the users system.

The shortest message-transactions that the system handles are the service requests or system polls for a position fix. During these operations, the only user information transmitted are either the transponder status or the poll operation code and the transponder address. The sum of polling and response message durations plus the maximum round-trip signal propagation delay plus the transponder's polled-response time sets the minimum total duration for a timeslot. Delay-spread and other guard-band factors are allowed for in the signaling and demodulation design which affect the message duration.

If more information than can be contained in the status block must be sent, then the message will be transmitted in a contiguous group of data packets that follow the system's polling "header packet." A data packet has been chosen to have a minimum duration of one timeslot. A message would then consist of the first slot containing the header information, and the second and later slots containing the users-message. The header contains a count for the number of additional timeslots needed to transmit the message, up to a maximum of 15 additional timeslots. This yields a user-message length-range for a single transmission of between 16 status bits for a position-fix-only message (0 additional message packets) and 140 bits and 2100 bits, or, if interpreted as 7-bit ASCII characters, about 20 to 300 characters (for 1 to 15 additional message packets). Longer messages can be accommodated by sending additional transmissions with an "append" status.

It is very likely that there will be an interest in using the ARRAY system for coastal navigation and messaging. Under these circumstances, the ARRAY base stations are likely to be operated with much greater antenna elevation in order to reach further horizons. For example, a 1000 ft. tower would reach a 38.7 mile horizon, or a vessel with a 50 ft. antenna height at 47.4 miles. Since these horizons are much further than the typical spacing between base stations, it takes the radio signal longer to travel there and back. If the land coverage system is constructed on a 15 mile base station-spacing, then it will require three timeslots to perform one position fix on the coastal-navigation system. The system accommodates this operational factor quite easily by scheduling the extra timeslots for the signal to complete traversing the extra distance. The need for extra time in message delivery of position fixing would be identified from the customer's equipment-and-service-profile information in the network's operational data-base.

The same long distance communication facility described above for coastal navigation and message delivery may be used to provide long-distance coverage on land, where feasible, (for example, from mountain-tops to provide coverage over sparsely populated areas between cities, or along open-highway transportation corridors.)

Under certain conditions it will be desirable to provide message delivery and restricted position information in areas where coverage would not otherwise be economically provided, such as along the trucking corridors or major interstate highways between cities with normal communications coverage. In this case, a "depleted array" may be installed along the highway, where each base station is operated in the long-distance mode indicated above, and the base stations array configuration would be a triangular zigzag, with base stations positioned alternately on each side of the highway.

If the base stations are so spread out that sometimes only two base stations receive the signals from the transponder, then there is insufficient information to produce an unambiguous fix (that is, the fix calculations will put one position on the highway and another far off it), and the restricted (but likely) fix will be the one on the highway.

The ARRAY system's communication protocol readily allows the implementation of very effective energy conservation schemes in battery operated mobile equipment. Such conservation schemes all make use of the possibility of synchronizing the operation of the mobile equipment with the operation of the ARRAY system. The ARRAY system can be informed that a particular mobile transponder is functioning with a battery-conservation program, with a particular timing schedule which would then become a part of the data-base information on that particular transponder. To become synchronized to the system, the mobile unit "listens" to the timing signal broadcast by the system at the beginning of every system-cycle, and sets its own local time-keeping mechanism to be synchronized with the systems timing. To conserve energy, the mobile unit will spend most of its time in a power-stand-by mode, during which it only keeps track of the passage of real-time.

When this timekeeper detects that the time has arrived to "check for messages," it "wakes-up" the receiver and listens during the next (n) predefined timeslots for a possible message from the ARRAY system. Such messages would only be transmitted during those prearranged timeslots defined by the energy-saving status and listening-schedule defined above and contained in the control center's data base.

If a message is actually addressed to the unit, it will stay-awake until the transaction is completed, or else it will enter the low-power consumption stand-by mode again until the next scheduled wake-up period. Since the interval between, and duration of, wake-up periods are defined by operating software in the ARRAY system and in the transponder-terminal, the trade-off between energy conservation and response time can be dynamically varied (by informing the system of schedule changes) to suit the service being performed by the transponder-terminal.

Also the degree of conservation can be varied over very wide limits, from no-conservation to 99.90% conservation or greater, depending on equipment design, compared to equipment operating without a conservation strategy.

A major objective of the ARRAY system is to provide the communication services needed by mobile users in the most efficient, and hence cost effective means possible. This objective recognizes that there are a number of operations that typically occur in the mobile application area that can benefit significantly from features that would not normally be a part of a conventional voice or voice+data communication systems feature-repertoire. These can roughly be characterized as group-functions, i.e., function that affect variously organized groups of mobile users.

The hardware of the transponders allow it to respond to more than one PIN address. Every transponder has a primary PIN address, being identical to its serial number, and is unique to every transponder. In a preferred embodiment, the addressing range allows for the possibility of a 28 bit binary address range, equivalent to 268,435,456 unique addresses. However, each transponder can also have many more secondary PIN addresses, which would allow it to respond in a particular way, depending on the application and the instructions relating to a message addressed to that particular secondary address. Since identical secondary addresses can be assigned to more than one transponder, every transponder receiving the message addressed to that secondary address would be capable of responding. An added feature of the communication protocol allows each one of the transponders responding to a particular secondary address message to respond in a unique way, as described below.

A transponder may be set up to respond to various secondary addresses, which are unique to that transponder. The transponder then performs different responses depending on which address it received the message. This approach provides a very airtime efficient means of carrying out a small number of alternatives actions in the transponder.

Multipoint operations are those operations that involve more than one transponder device (in a particular coverage region) having the same secondary address. This feature permits the flexible formation of groups for various functions, features or purposes. An example, applicable to a traffic management application, would be to dynamically group all cars heading toward the same general destination, along the same general route, into a traffic information group. All traffic reports affecting only those vehicles would be broadcast to those vehicles by addressing the message to the group's common secondary address. Another example concerns a vehicle security monitoring application which could dynamically group all vehicles parked in the same general area, (i.e., near a common base station), so that a single polling message would obtain the status of all the vehicle in that group.

Another intended use of the group-function is information "broadcasting." In this case large numbers of transponders are assigned the same secondary address, and receive information broadcast to that address when the system has low-priority time available. Typical information would be weather reports, general traffic updates, sports information and other "news" services.

Under certain conditions it is desirable for a single "trigger" command from the application to cause a prearranged response from a group of transponders. An example might be to determine the locations of a particular group of taxi-cabs or squad of police cruisers.

To simplify the dynamic response of groups of transponders, the communication protocol provides a feature for forming groups that respond with particular information as a group. The group is assigned the same secondary address, and associated with that address would be the number of the timeslot in the next system cycle during which it would respond, if a message was addressed to the said secondary address. Each transponder in the group is assigned a unique timeslot so that when they responded, no data collisions occur. The transponder status-code or message data returned in the response message depends on the specific application the transponder.

The last portion of the system cycle is provided to allow transponders with pending messages to initiate communication by sending service request data packets during a randomly selected time-slot from those available during this period. This information is used by the control center to schedule time-slots during which time the messages could be picked up.

Like the previous portion, this portion of the system cycle may include anywhere between zero and the full remaining number of time-slots left in the predetermined cycle length. Illustrative of the type of packet sent during this period is depicted as block 232 of FIG. 12. It includes data header information representative of the transponder identification, the status of the transponder (or vehicle), error check bits and a block preamble which is used to set the gain and indicate that the data is being sent from the transponder, rather than the base stations.

In order to minimize the possibility of data collisions, all message delivery transactions, except transponder service-requests, are controlled by the control center's transaction scheduler. The ARRAY message delivery protocol thereby forces all polled transactions to be controlled by the scheduler, which completely eliminates the possibility of data transmission collisions for polled transactions. However, by using only polled operations, the total message throughput of the system would be severely limited for messages to be delivered from the mobile units to the system, since the system would have to poll all possible transponders, to determine whether it had a message to send, and since the majority would not have a message pending, a significant portion of the system's available air-time would be "wasted."

A more efficient procedure allows the transponder to request service only when it needs it. To prevent these service requests from disrupting the flow of normal polled operations, the system identifies a portion of the system's cycle as being available for making service requests by random transponders. To minimize the "damage" caused by the small number of collisions that must inevitably occur, the service requests are made only one timeslot in duration, and by ensuring that they are transmitted in synchronism with the timeslots, when a collision occurs, it spans only one timeslot.

Transponders requiring service (for example, having messages to be picked up), or needing to send their status, randomly select one of the available random-access timeslots, during which it transmits a service request or status message to the system. If the message is received correctly by the system, the system will send an acknowledgment within the next two system cycles. If an acknowledgment is not received, the transponder will try again, until it receives a successful acknowledgment, in another randomly selected timeslot from the available random-access timeslots, but with an increasing delay between attempts, to prevent overload of the system. The "random retry with increasing delays between retries" technique has been successfully used in the design and implementation of Local-Area-Networks for computer systems for some time, and the performance characteristics of the technique are well understood.

The control center program adjusts the proportion of the system cycle devoted to random access service requests based on its assessment of the inbound requests versus the outbound traffic priorities, in such a way as to optimize the total traffic throughput. A preferred embodiment of the adjustment program's strategy relies on the increasing the inbound proportion when the rate of inbound request collisions increases above some predetermined threshold, and decreasing it when it falls below the threshold.

The ARRAY system uses a mixture, or hybrid, of two different access protocols, one being controlled by system initiated polling, and the other being initiated by any random transponder. A (usually) small portion of the total system cycle is allocated for the initiation of service requests by the transponders. These requests are initiated either automatically or manually by the transponder operator. Automatic initiations relate to status changes in the equipment, such as sensors or timers in the vehicle in which the transponder is operating, and manual operation includes pushing a button to request medical or break-down assistance.

During the housekeeping broadcast by the system at the beginning of each cycle, the system identifies the timeslot number that will begin the access-period for random-transponder service-requests. This period lasts from the identified timeslot till the end of the cycle. By being able to vary this number, the ratio of inbound versus outbound message traffic is dynamically optimized to suit varying traffic conditions.

During this "random-access" period, transponders wishing to communicate with the system transmit one-packet long service request message-packets. They are transmitted during a randomly selected time-slot from the available random-access time-slots, in a manner already well known in local-area-network protocols. Once the request is successfully received by the system, the requested service is scheduled by the system, and the service is performed by a system initiated polling message.

If the request should fail for any reason, such as collision with another message, a random retry will occur, again in a different randomly selected time-slot, with a random and increasing delay between attempts until successful. A communication-failure is detected by the transponder by a time-out of the allowable interval between initiating a request and the system responding with a matching polling message. The timeout period is controlled by software response, and is typically a maximum of 3–4 system cycles.

Messages are delivered in a number of different ways, depending on the traffic direction, the service category of the transponder and the prior message transfer history for the transponder. For a "normal" transponder, i.e., one that listens continuously for a possible message or poll, an outbound message is sent during any available contiguous group of outbound timeslots. If such a transponder has a message to be picked-up, it initiates a service request as outlined above, and the system's control center schedules the necessary contiguous number of timeslots to receive the message, whose transmission is triggered by a related polling command from the system. For a transponder operating on a battery saving schedule, the same techniques as described above are used, with the additional limitations that the system is constrained to send acknowledgment and polling messages only during those timeslots defined for the battery saving schedule for that transponder.

For a set of transponders, set up to be a particular group, the message handling is somewhat different. Typically a number of transponders, for example, in a group of taxicabs, will be set up for (near) simultaneous position determination. In this case, an identical secondary address is assigned to the group, and a particular response-timeslot is assigned to each transponder in the group, usually, but not necessarily, a contiguous group of timeslots. When a polling message is transmitted with the secondary address of the group, the transponders in that group will respond (near) simultaneously and transmit their response in the timeslots assigned to them. In this way a single polling message can cause the location of a large group of vehicles to be determined with a minimum of system polling overhead. This can save a significant amount of polling time, especially when considering the system polling required to find a vehicle at an unknown location, which may require between 3 and 6 non-overlapping polls to reach all the vehicles addressed.

FIGS. 11a–11c respectively illustrate examples of a message from the user of the network to a transponder, of a transponder making a service request, and of a message picked up from the transponder by the network. FIG. 11a exemplifies a forty user-character message transmitted to a transponder. The methods include two blocks of 20, 7-bit characters. Preceding those blocks, however, is a message header packet, and following the message blocks is a response packet from the transponder.

FIG. 11b exemplifies a transponder making a service request randomly during one of the service request time-slots. As illustrated in FIG. 11b, the transponder transmits its request in a third available service request time-slot.

FIG. 11c represents the system picking up the message from the from the transponder is in response to the service request in FIG. 11b. The pick-up is triggered by a message header packet, causing the transponder to send the pending message packets in a contiguous group (preferably, up to 15 packets maximum). The next two blocks in FIG. 11c represent message packets from the transponder, each packet including twenty, seven-bit characters. The last block of the packet is a response packet from the transponder, explained in connection with FIG. 12.

Figure 13A:
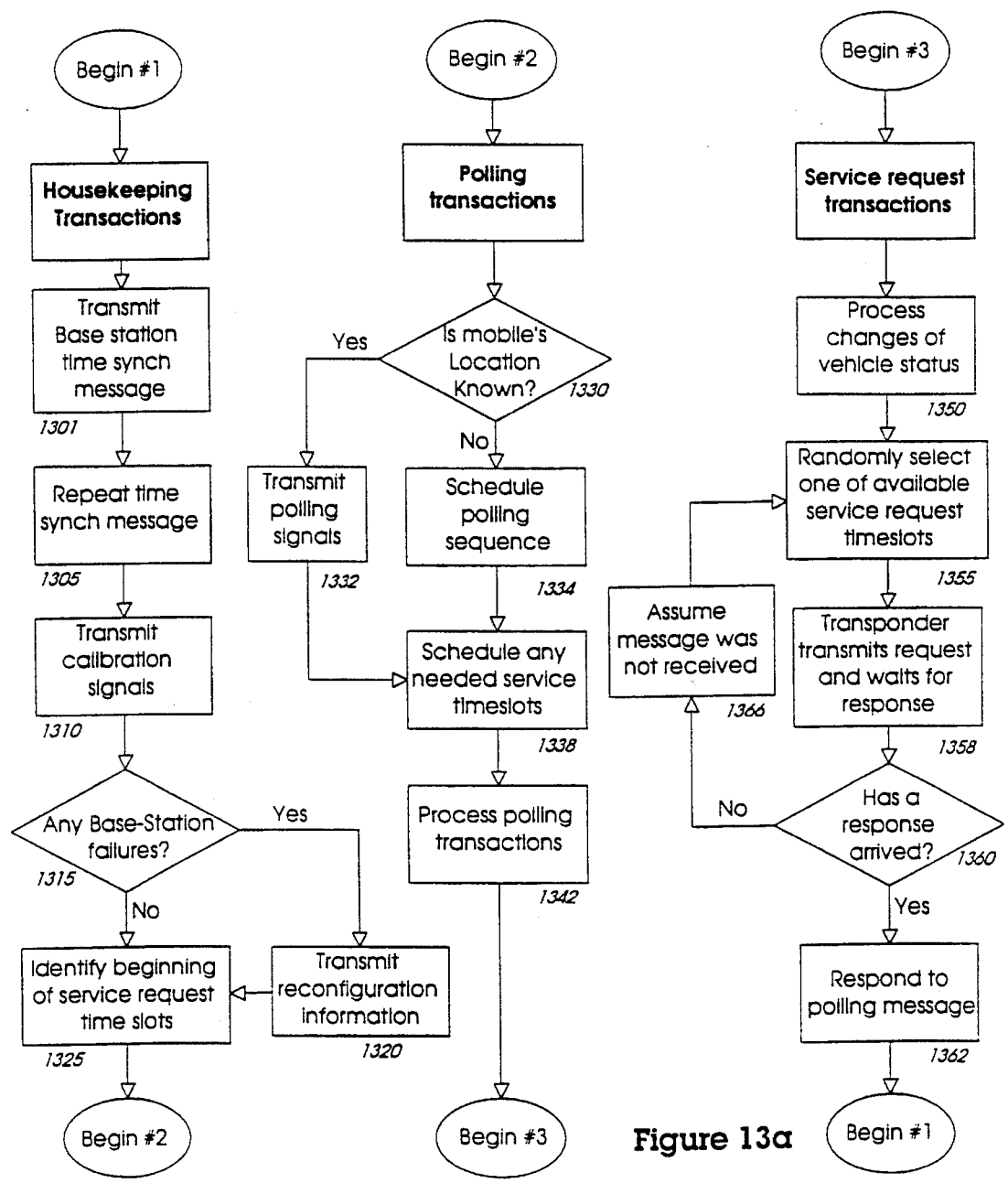
FIG. 13a and 13b are a flowchart illustrating a preferred manner in which three major modes of the system cycle may be used to regulate the operation of the ARRAY system.
Figure 13B:
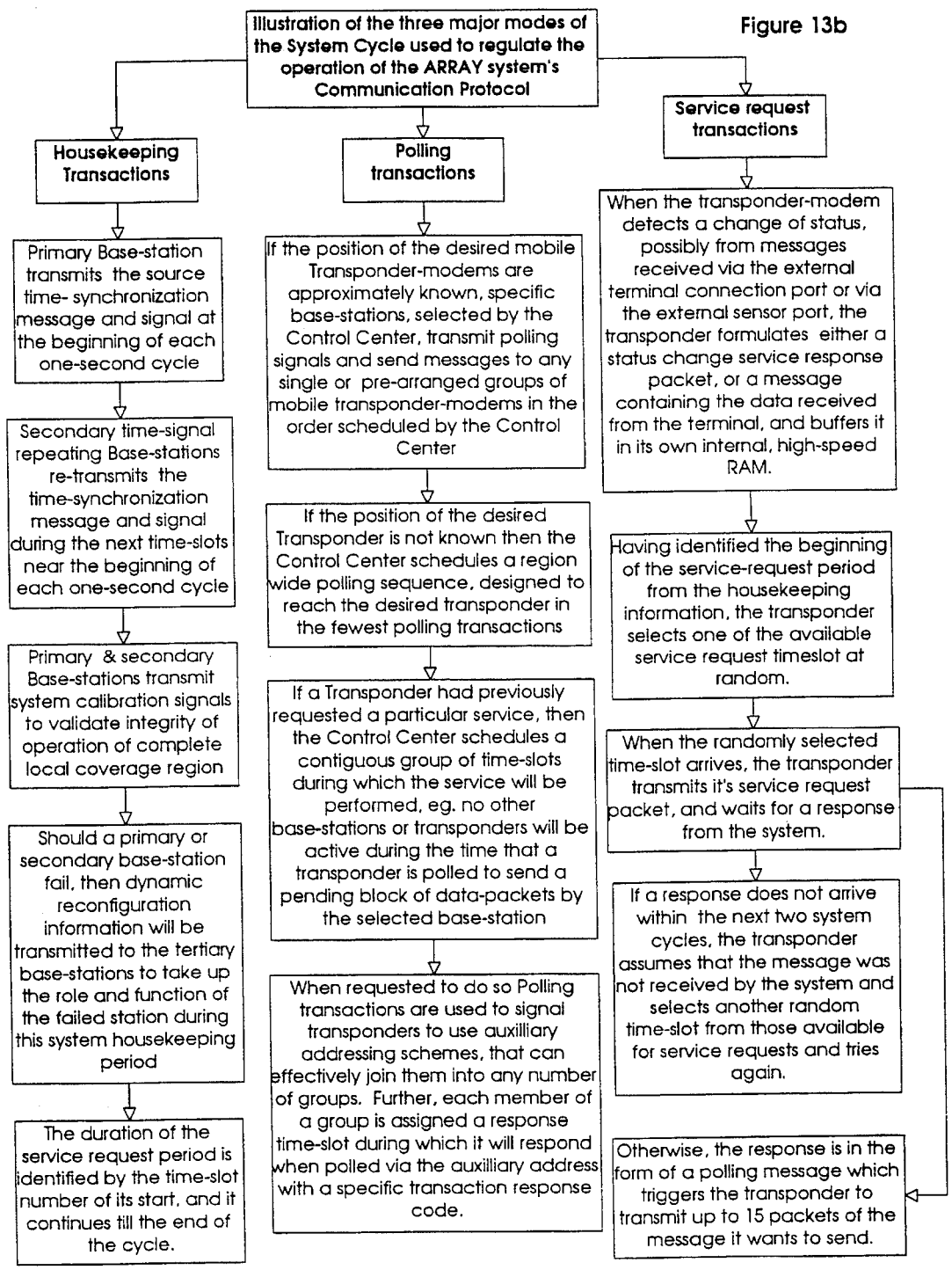

Referring now to FIG. 13, a flowchart illustrates the scheduling of the three major modes of the system cycle used to regulate the operation of the ARRAY system's communication protocol. The three modes include housekeeping, polling and service request transactions. It is noted that this flowchart of FIG. 13 does not represent the actual structure of the actual system periods; but, rather, illustrates the kind of activities involved in scheduling the content of the three modes.

The housekeeping transactions begin at block 1301 where the primary base station transmits the source time-synchronization message and signal at the beginning of each one second cycle. From block 1301, flow proceeds to block 1305 where the secondary time-signal repeating base station (e.g., 402 of FIG. 4) retransmits the time-synchronization message and signal during the next time-slot near the beginning of each one second cycle. From block 1305, flow proceeds to block 1310 where the primary and secondary base stations transmit system calibration signals to validate the integrity of operation for the complete local coverage region. From block 1310, flow proceeds to block 1315 where the control center performs a test to determine if a primary or secondary base station has failed. If a base station has failed, flow proceeds from block 1315 to block 1320 where the dynamic reconfiguration information is transmitted to the tertiary base stations to take up the role and function of the failed station during this system housekeeping period.

From block 1320, or block 1315 if answered in the negative, flow proceeds to block 1325 where the duration of the service request period is identified by the timeslot number of its beginning, and it continues until the end of the cycle. From block 1325, flow proceeds to the second column of FIG. 13 where polling transactions are performed.

The polling transactions begin at block 1330 where a test is performed to determine if the location of the transponder is known. If the system is aware of the location of the desired transponder, flow proceeds to block 1332 where the control center, which selected the desired transponder, transmits polling signals and sends messages to any single or prearranged groups of mobile transponders in the order scheduled by the control center.

If the location of the desired transponders is not known, flow proceeds from block 1330 to block 1334 where the control center schedules a region-wide polling sequence, which is designed to reach the desired transponder in the fewest polling transactions. From either of block 1332 or block 1334 flow proceeds to block 1338 where the control center schedules any needed service slots. If a transponder had previously requested a particular service, then the control center schedules a contiguous group of time-slots of which the service will be performed; for example, no other base stations or transponders will be active during the time that a transponder is polled by the selected base station to send a pending block of data packets.

From block 1338, flow proceeds to block 1342 where any needed polling transactions are processed. When requested to do so, polling transactions are used to signal transponders to use auxiliary addressing schemes that can effectively join them into any number of groups. Further, each member of a group is assigned a response time-slot during which it will respond when polled via the auxiliary address with a specific transaction response code. From block 1342, flow proceeds to the third column of FIG. 13 where service request transactions are performed.

The service request transactions began at block 1350 where the transponder detects, and processes, a change of status. When the transponder detects a change of status, possibly from messages received via the transponder's external terminal connection port or via the transponder's external sensor port, the transponder formulates either a status change service response packet or a message containing the data received from the terminal and buffers it in its own internal high speed RAM.

From block 1350 flow proceeds to block 1355 where the transponder randomly selects one of the service requests time-slots. Having identified the beginning of the service request period from the housekeeping information, the transponder is able to readily select one of the available service requests time-slots at random.

From block 1355, flow proceeds to block 1358 where the transponder transmits its service request packet at the randomly selected time-slot arrival time, and then waits for a response from the system.

At block 1360, the transponder performs a test to determine if the system response has arrived. If the system response was sent and has been received by the transponder, flow proceeds to block 1362 where the transponder responds to the system response. The system response is in the form of a polling message which triggers the transponder to transmit a variable number of packets of the message it wants to send. Preferably, the number of packets has a maximum limit of 15 (equals the maximum indicated by four bits). If the transponder does not receive the system response within a predetermined period of time (e.g., two system cycles) after a service request packet is transmitted (block 1360), the transponder assumes that the message was not received by the system and selects another random time-slot from those available for service requests and tries again, depicted at block 1366 and block 1355. From block 1362, flow returns to the left column of FIG. 13 where the procedure repeats itself.

Radio-Communication Protocol—In The Mobile-application's Environment

The mobile user may or may not interact with the radio-communication protocol. Most users of the facilities available through or via the ARRAY communication network have access to them via an application service or service provider, who will have configured the mobile data terminal to suit the selection of services that they (the application provider) would like to offer. At the simplest level, the transponder may be connected to a set of automatic sensors installed in a vehicle, such that the vehicle operator may be otherwise unaware of the operation of the application, which, for example, may be vehicle safety and security, operational performance monitoring or traffic management sampling. At the more expanded level of service, the transponder may be connected to a comprehensive data terminal, capable of sophisticated database enquiries, such as may occur in a police cruiser checking on the license tags of a suspicious vehicle.

In designing the communication protocol, at least the following five ((1)–(5)) operational characteristics and functions may be optimized simultaneously:

(1) Optimization of airtime use for efficient and low-cost delivery of short messages, typically between tens and hundreds of characters per message, is important. This has been done by minimizing or eliminating the "call set-up" overhead inherent in all those systems that establish a "connection" between two communicating points. For the delivery of much longer messages (thousands of characters), without the need for position determination, other SMR-type systems would typically be more bandwidth efficient and cost effective.

(2) Operation of battery-operated equipment for efficient management of their power consumption may also be optimized since they are required to be in an "active-standby" condition during most of their operation, such as is typical of one-way and two-way pagers or pocket data-terminals.

(3) Dynamic optimization of the message throughput, over a wide range of outward bound (typically polling controlled) versus inward bound (typically "random request" controlled) message traffic. By incorporating a hybrid access method (combining polling and random-transponder service-requests) the trade-off between polling (which explicitly prevents data collisions and is efficient for delivering calls to a large population of listening Transponders, but is inefficient for picking up calls from the population) and random access, (which is efficient for initiating service requests for low to medium traffic levels, but becomes inefficient for high traffic levels due to the increase in message-collisions that occur with increasing traffic saturation) can be varied dynamically to suit current traffic patterns.

(4) Integration of radio location with message delivery in a single platform to provide radio-position determination directly from the message signals. The array of base station transceivers and the proprietary modulation/detection technology makes possible the efficient and accurate estimation of the physical position of the message source (typically a mobile or portable transponder-modem).

(5) Determination of the position of groups of transponders with a single polling message. Groups of various sizes can be dynamically configured, depending on customer requirements. This group location feature was created to minimize the cost, and system response in time-critical fleet management operations, such a taxi, ambulance or police-vehicle dispatching.

Due to the cost limitations inherent in a consumer products, only a single access channel is normally provided for the transponder. Therefore, normally all of the utility's communications take place on only one access channel (comprised of a unique set of symbol codes). In principle, multiple access channels can be operated, but only by (significantly) increasing the cost of the transponder section of the transponder-modems.

In most of the bidirectional radio-data communication systems completed to date, the implementation paradigm has been the telephone. For example, to send data between two points a "connection" is established between the points, the data is transferred, and the connection is released, (to allow the equipment or channel to be used by others). In the ARRAY system, the implementation paradigm is more like the pager, where a large population of receivers (the pagers) with individual addresses are continuously listening for a possible message addressed to them. As each message is broadcast it is received by all pagers, but only the pager addressed will respond. In this paradigm there is no "connection" set-up, and there is no airtime lost other than the small address information overhead carried in the message. The ARRAY system carries this paradigm through to bidirectional communication of short messages by using a hybrid-access technique.

The hybrid-access, bidirectional message protocol designed for the ARRAY system uses a synchronized time-slot, Time Division Multiplexing (TDM) structure to optimize air-time usage. The hybrid-access mixes both polled-response and "random transmission" message transfer techniques to maximize the benefit of each approach to access.

There is also a very great benefit to battery operated mobile equipment such as, for example, a pocket data-terminal, since, by having the transmitter and receiver "synchronized" so that the base station transmitter only transmits when it "knows" (by prearrangement between the base station network's control center and the mobile equipment's transponder) the data-terminal's receiver is listening, the battery-operated mobile can use a very small full-power duty-cycle, while still having good user-perceived system-response times.

The operation of the ARRAY system is organized around a repetitive cycle of nominally one second duration. At the beginning of the cycle, there is transmission of a number of current system parameters, such as: A number of base station time-synchronization code-pulses, used to synchronize all the base station transceivers in the local region; a number identifying the second of the day; a number identifying the beginning of the random-access portion of the current cycle; the system-regional identification code; etc. Each of the approximately 1,400 to 1,800 time-slots in the cycle are numbered, starting at 0 immediately after the housekeeping information. Furthermore, all poling transmissions from the base stations have a time-slot identification as part of their message format. This will allow any mobile-transponder listening to the system to get into synchronism with the ARRAY-time-slots by the next poling message, and with the overall system-timing within one second.

Mobile transponders synchronize their own internal time-keeping functions to either the timing of the housekeeping portion of the system's cycle, or by synchronizing to the time code "heard" in any base station's polling header.

Near the end of the one second ARRAY cycle, a number of time-slots are set aside to allow for "random-transponder" requests to be made by the mobile transponders. The starting-number of these slots is defined in the house-keeping preamble transmitted by the network at the beginning of each ARRAY cycle. This random request function is an important feature of the system, because it allows the Scheduler to: (i) optimize the throughput of the system, by allowing a variable mix of polled operations and random-access operations, with the proportion of the mix depending on the current information traffic requirements; (ii) enable requests for service to be made of the system by the mobile transponders, when needed by the transponder; and (iii) implement one form of a group-position-interrogation function, for air-time efficient fleet management.

The requests are regarded as "random" in that: (a) the transponder initiating the transmission is random, and (b) the system control does not expect the transmission at any particular time, other than that it will occur during the defined period of "random access time-slots." However, the transmissions are still made within, and time synchronized to, the allowed time-slots. The synchronization requirements ensure that the operation of the system is not disrupted by message collisions caused by completely random transmissions during any time-slot in the cycle.

Using the unique electronic-serial-number of the position transponder (transponder ID) as the root for random number generation, the transponder selects one of the random-access time-slots to make a service request. If the system responds with an acknowledgment within the next two one-second cycles, the rest of the communication is continued in a fashion orchestrated by the system. However, if there is no response from the system within that time, the transponder assumes that an unrecoverable message collision has occurred, and then tries again, on the basis of a second random selection of another random-access request time-slots, with an increasingly longer period between (failed) requests, until the request is acknowledged. Since the two (or more) transponders that have experienced the collision, have randomly related serial numbers, the next selection is unlikely to be the same, and so the chance of a second collision from the same source is low. This technique of "random-retries" is well known in Local Area Network (LAN) technology.

This mixed or hybrid access method has a marked effect on the throughput of the system when compared to systems utilizing either random access or polled access alone. The probability of unrecoverable collisions on the first try can be made very low, by making use of several forms of redundancy in the system, such as: (i) the multiple-register timing counter to decipher certain overlapping incoming data signals; or (ii) the multiple paths by which the transponder signals reach the control center, each experiencing different collision overlap conditions due to the physically different signal travel paths traveled to each of the base station transceivers.

All messages used in the ARRAY system occur in whole packets of data. However, not all transmissions are whole packets, only messages occur in whole packets. The duration of a message packet is determined by the design parameters of the system, such as the minimum number of bits to be transmitted to identify the destination device, and the kind of service to be performed by the message, and the maximum communication range that the system is designed for. With a typical base station spacing of 15 miles, the duration of a single, minimum duration position-fix transaction is about 160 bits in terms of its duration. A continuation or message-packet is chosen to have the same duration. At the burst data-rate of the system there is more than 1500 of these minimum-transaction time-slots per second.

Messages transferred through the system could be classified in terms of the signal origination and the length of the message in number of packets. There are basically only five kinds of messages, (i) the minimum polling call from the base station to trigger a position-fix-response from the transponder or to set-up a transaction with the mobile transponder, (ii) the minimum status, position-fix response or message-received response, (iii) service request from a random transponder, (iv) the message transmission to the transponder (a set-up header as (i) above with a number (n) of message packets attached), and (v) a message pick-up from the transponder (a message response header as in (ii) above, but without transponder address, with a number (m) of message packets attached). The smallest transaction is the position-fix transaction, in which the system polls a mobile transponder for its status information (minimum message size), and receives a response of just this information (usually an 8 bit hardware status and a 16 bit service request code). The service request status will convey the class and size parameters of the service request, which the system will then schedule for later execution. From the examination of the above transaction type it can be seen that (i)+(ii) take one time-slot to complete. And (iii) takes less than n+1 time-slots and (iv) takes nearly m+1 time-slots for its completion.

By using this hybrid method of random service requests and polled message transfer in both directions, it can be seen that very air-time efficient message transfers occur, without the need to establish a "connection" between two points for a message transaction to occur.

By providing complementary operations in the ARRAY Network Operations Scheduler and the Transponder-modems, it is possible for the portable, battery-operated transponder equipment to minimize their power consumption, while still providing the same level of service (quick response to messages). The operating protocol allows the transponder to be identified to the network as operating with an energy saving schedules. During this type of operation, the system scheduler is informed of the time-slots during which the mobile transponder will be able to be polled by the system. During all other time-slots, the system scheduler assumes that the transponder is in power-standby mode, i.e., unable to respond to a message. This additional factor in the scheduling algorithm adds to the task of communications scheduling and inherently adds some delay to message delivery, but allows the portable equipment to operate with significantly lower average energy drain than would be the case if the unit were to "listen" to all broadcasts. The effective energy duty-cycle (ratio of "on" to "on+off" times) can range from unity for no energy saving to a small fraction of a per-cent for low duty cycle equipment with moderate response times. For example, consider a "pager" which listens for a possible call once each minute. The total "on" time would typically be only about 5–100 time-slots during each minute (approximately 100,000 time-slots), and during that short period only the receiver portion of the transponder is powered, although the transmitter may in some instances be ready but not keyed. Under these conditions the typical energy saving ratio (the ratio of typical operating time with saving versus operating time without saving) could be as high as 1,000–10,000 times, depending on the equipment design.

The Application—Provider's Environment

There are basically two different kinds of users of the ARRAY system, the fixed user and the mobile user. The mobile user's world has been described above, under the Radio-Communication Protocol. The fixed user is usually engaged in the management or coordination or service of the mobile user, and so has been called the Application User or Provider.

The Application subscriber is connected to the ARRAY system's control center via conventional landline facilities, such as narrow or broadband leased lines, dialup line (rarely) or even fiber-optic (ISDN) facilities. He communicates with the control center as a means of communicating with the mobile user. His communications may be at a low-level or high level, depending on the kind of application that he is operating from his data terminal. At one level, he could be running diagnostics, in which case he sends commands, in the ARRAY protocol dialect, to the control center, and receives raw data with header identification blocks to distinguish between different response messages arising from different requests.

At another level he could interact with, for example, an ambulance dispatching program, where he enters a dispatch request, which his system's software interprets, sending the required polling request commands to the ARRAY system, receiving the availability-status and current-coordinate information replies obtained by the ARRAY system from the responding ambulances, determining the appropriate unit to dispatch, sending commands to the ARRAY system to deliver the dispatch information to the selected unit, receiving (automatic) confirmation of receipt of instructions from the unit, and displaying confirmation of a unit rolling on the operator's display console, where all the operation between the underlines are normally hidden from the operator.

The application communication control center preferably have a very flexible hardware structure that will accommodate rapid growth and reconfiguration. Such a system can be constructed using the non-stop computer technologies of companies such as Tandem and Stratos, who build computer system for the on-line handling of very large volumes of subscriber data, manipulation of large data-bases, and have very flexible, multiply redundant processor hardware configurations, as well as very efficient subscriber line multiplexer equipment.

Software in the data base and communication control computers in the ARRAY control center implement the desired features of the application provider's environment. Due to the potentially large number of mobile subscribers that can be served by a typical ARRAY network (up to about a million mobile subscribers can be supported by each control center), the connections between the control center and a large application subscriber, serving a large base of mobile subscribers, can require a wide bandwidth to handle the rate of commands and responses. Also the number of application providers can quickly become large, and a flexible structure on the control center computer system for adding application subscriber data ports will be needed.

It is anticipated that there will be a rapidly growing number of small, service specific, application providers who will be adequately served by conventional landline facilities for connection to the ARRAY control center's communication controller. Typical dedicated leased lines will normally suffice, and should the subscriber's traffic volume increase beyond the capability of a single line, more lines can be added in parallel, until the number of parallel line warrants the installation of a broad-band connection and multiplexer port on the communication controller.

Under certain circumstances it may be possible that service could be provided to a fixed, application subscriber, through a dial-up line, organized in much the same fashion as the dial-up line for a computer-data-base service, such as Compuserve or America-On-line. However, it is much more likely that such connections will be offered by the application or service providers, whose application-computer systems would be connected to the ARRAY system's control center via leased-line or broad-band services.

Multipath

The distortion caused by multipath echoes can be significant, especially in urban area where signals are commonly received after being reflected off the sides of buildings. FIGS. 14–17 show simplified examples of multipath distortion to illustrate the problems and principles involved. A signal emitted by a transmitter at location (a) reaches the receiver via a multitude of paths, typified by paths a-b, a-d-b and a-c-b.

Figure 14:
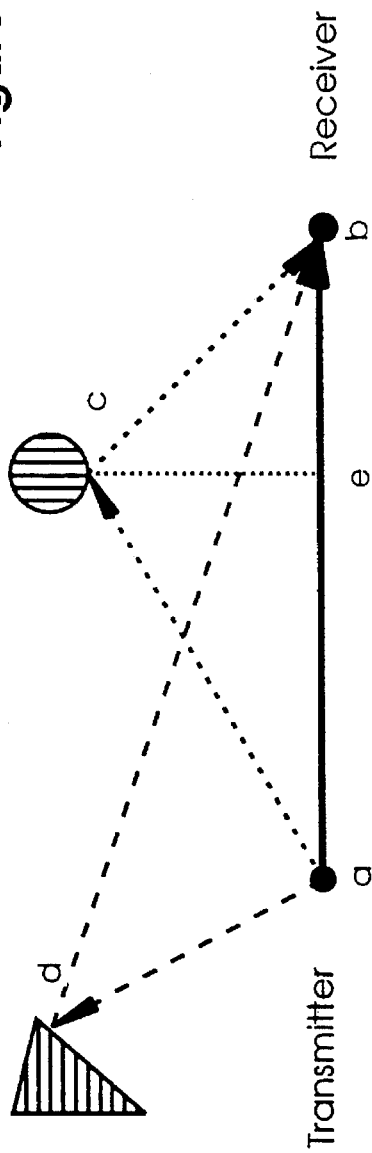
FIG. 14 is a diagram illustrating the phenomena of multipath.
Figure 15:
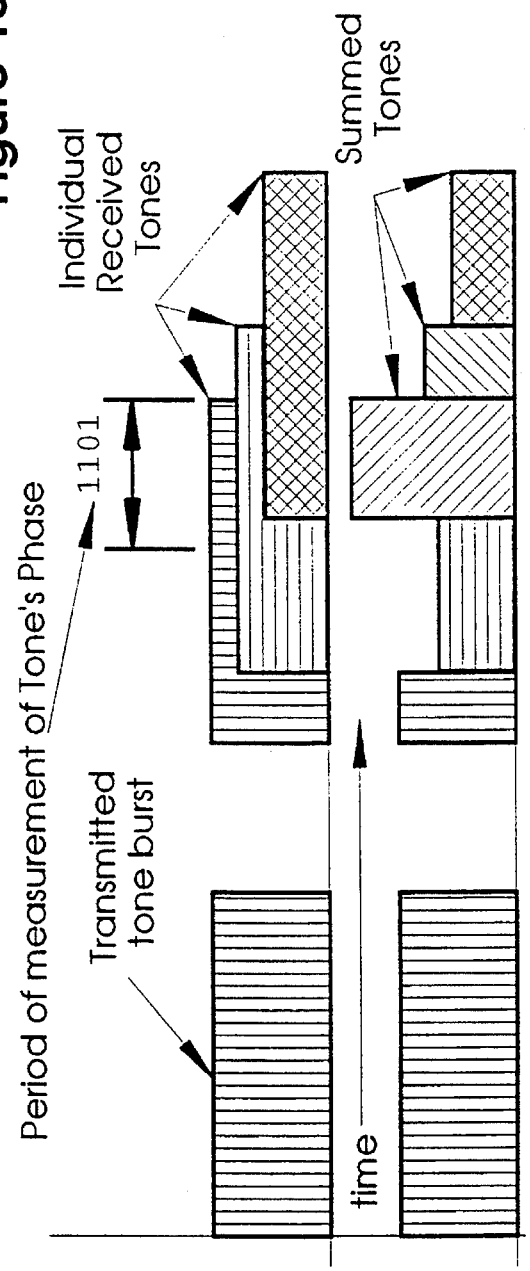
FIGS. 15–17 are time diagrams illustrating the manner in which a multipath signal is received.

If the signal was a burst of carrier as depicted in FIG. 15, the signal available at the receiver would consist of the instantaneous sum of the signals that arrived at the antenna via the different paths shown in FIG. 14, and overlap as shown in FIG. 15. If the phase of the carrier, or the phase of the tone modulating the carrier, were being measured, the measurement would typically be made near the end of the tone burst as shown by 1101 in FIG. 15, since some time near the beginning of the tone burst would be needed to allow phase lock loops and the like to lock-onto and track the phase of the tone before measurement.

From FIG. 15, it can be recognized that the receiver will only be able to measure the phase of the sum of signals received. Vector addition shows that the sum of multiple sine waves with the same angular velocity but different amplitudes and initial phases is another sine wave with the same angular velocity but a different amplitude and phase. Therefore, the phase measured for the resultant will differ from the phase of the desired signal. The amount of disturbance will depend on the particular modulation-demodulation and phase-measurement scheme used.

In addition to the phase distortion, the summation of overlapping signals at the receiver also introduces amplitude distortion, resulting in rapid fading of the resultant signal as the sum of the various multipath signals ranges from reinforcement to cancellation as the vehicle position varies. Such multipath fading can be ameliorated to some extent by use of broad-band spread-spectrum modulation in lieu of conventional narrow-band modulation schemes.

Figure 16:
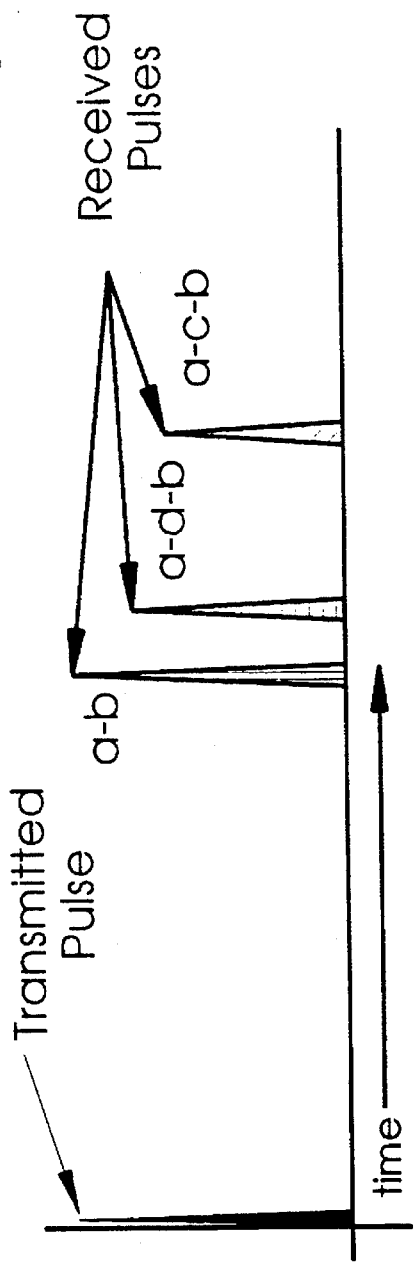
Figure 17:
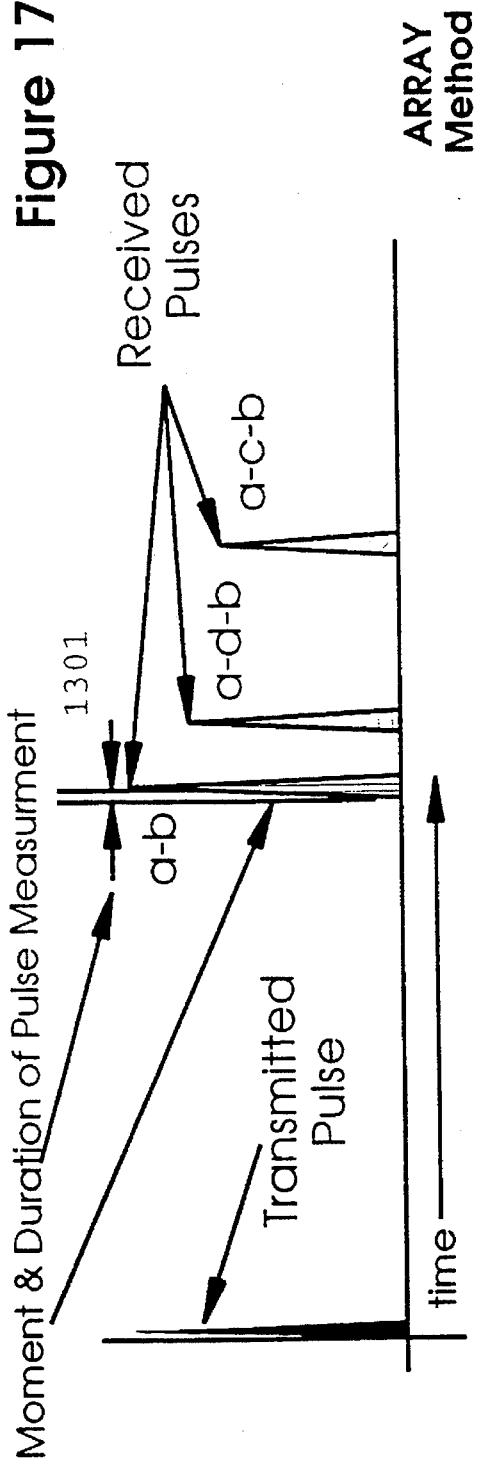

Alternatively, if the signal transmitted was a very narrow pulse, as shown in FIG. 16, then in the same communication environment as the tone modulation case above, the received pulses would be distinct from each other as shown. Further, if the ranging time-estimate only involved measuring the arrival time of the leading edge of the pulse that arrived soonest, as shown in FIG. 17, then multipath echoes could not interfere with the time-of-arrival measurement, since they arrive at the receiver only after the measurement has been made. In this sense, the echoes are rejected.

Note also that in this simplified case, the first arrival cannot be affected by multipath induced signal fading, because no canceling signal has arrived yet. Signal level (amplitude) variations could only be caused by propagation path-loss factors such as relative antenna heights, range and scattering obstructions. In practice however, some situations do arise under which multipath fading occurs.

The first situation is the case of the "ground-reflected" signal interfering with the direct "line-of-sight" signal (which condition leads to the conventional $1/R^4$ path loss characteristic for distances large in comparison to the transmitter and receiver heights). Under conditions where the phase shift between these two signals produce cancellation nodes (usually near the base station antenna tower), moderate fading of the spread spectrum signal is experienced. This class of fading can be greatly reduced by suitable design of an irregularly-spaced transmit base station antenna array.

The second situation is the case where the direct signal (line-of-sight) is obscured, and signals arriving at the receiver via different scattered paths with similar path lengths (differing by only a small number of wavelengths and similar in amplitude) can produce some moderate fading of the spread spectrum signal. This class of fading is more rare, and has a small effect on the overall performance of the system since it is very unlikely to occur simultaneously for most of the different signal paths between the mobile transponder and each of the nearby base stations.

The practical implementation of the ARRAY pulse ranging system, however, must take into account the more complex character of the urban communications environment (as compared to the simplified example described above) and necessary equipment design constraints required to produce cost-effective equipment for a wide range of target applications.

For example, the short duration, large-amplitude pulses illustrated in the simplified example above (FIGS. 14 through 17) would be too expensive to implement in a practical system, inter aria, because achieving an adequate output level from the transmitter would require a large (and costly) power amplifier. Generating a short duration pulse requires a correspondingly large bandwidth, and bandwidth is always a very scarce commodity. Therefore, a practical system would necessarily be implemented with lower power level devices and, therefore, lower priced devices; and would have to use the available, limited bandwidth (preferably without sacrificing the performance required to reach the target application markets).

The impulse response of a practical ranging system is more complex and the co-channel interference characteristics of the shared communications environment are harsher than the simple description provided in connection with FIGS. 14 through 17.

The concentration of echo pulses depends on the specific pattern and arrangement of the scatterers, and when highly concentrated as in metropolitan areas, the received multipath echoes almost form a continuum. While the return echoes are almost randomly related to each other, the continuum of returned echoes does have a statistically quantifiable nature. The single statistic that is usually. assigned to this environmental character is the "delay spread."

The delay spread is an aspect of the impulse response of the environment. On transmitting of an impulse through a scattering communications environment, a series of impulses will be received that decay in number and amplitude over time. When the impulses arrive close together, they appear to form a statistically definable envelope. The "decay time-constant" of this envelope is called the "delay spread." It is defined as the time it takes for the energy in the echoes to decay to less than 1/e of their initial value. In urban areas, like New York or Tokyo, at frequencies in the area of about 900 MHz, this delay spread typically has a maximum value of about 3 microseconds.

In practice, the measurement of the "delay envelope" of a radio communication environment relies on the impulse-like autocorrelation character of broadband white noise. The impulse response of a system can therefore be determined from its response to excitation by such random-noise-like signals.

Because impulses are difficult to work with in practice, an alternative method to that described above is used to actually measure the delay spread in practice. The method relies on the fact that the autocorrelation of broad-band white noise is impulsive. Therefore, the "delay envelope" is determined by transmitting a known, broadband pseudo-noise signal at the transmitter location, and determining the impulse response of the transmission environment by de-convolving the received signal with the known transmitted signal. In "Mobile Communications Engineering," William C. Y. Lee, pp. 40–43 (incorporated herein by reference), a number of examples are given, as well as further bibliography, on delay spread characteristic determination.

The ARRAY system uses a signal transmission technique very similar to that used for determining the delay spread of an environment to transmit data at high speeds and accurately measure signal arrival times. The method involves the transmission of a noise-like pulse-burst and reconstruction of the delay envelope from the received signal by correlation techniques in the receiver.

The leading edge of the largest one of a set of detected delay envelopes is used for estimating the earliest arrival time of the data-symbol pulse and the comparative energy in the outputs from a parallel set of envelope detectors is used to detect the presence (or absence) of a particular data symbol.

Only the leading edge of the delay envelope estimate is significant to the ranging measurement, since all signal information arriving after the leading edge contributes little to the shortest path arrival time estimate. Unlike the phase-delay methods of propagation time estimation, whose estimates of the average phase of the signal received can be markedly affected by the large multipath echoes, this method effectively ignores the late-arriving, but possibly larger echoes, producing the best estimate of arrival time from the available information.

The later information does however contribute significantly to the detection-reliability of the data content of the signal pulse, since it carries redundant information about the desired (data) signal, allowing the data detector to arrive at the best data estimate from the available information.

In terms of the simple model of the system described in the first paragraph above, spread spectrum techniques are used to spread the relatively large energy of a short excitation (ira)pulse in both time and frequency in a set of particularly controlled ways, and a non-coherent correlation technique is used in the receiver to contract the spread-pulses back into a near-impulses again. The wide-band correlation techniques applied to bursts of periodically-spaced data-symbol pulses allows many of the problems associated with multipath distortion to be overcome as described above. Furthermore, by using multiple, unique, non-interfering spreading-code-sequences (codes with low partial-correlation and low-cross-correlation products) to encode the position determining pulses, data symbols having multiple bits-per-symbol can be transmitted with very high reliability, at data rates much higher than those commonly used by conventional land-mobile communication.

Ranging Using The ARRAY System

The ARRAY system uses a signal transmission and detection technique very similar to that used for determining the delay spread of a communication environment. The transmitted signals consist of bursts of modulated carrier, in which the modulation imparts broadband, noise-like characteristics to each burst of the signal. The modulation is further designed to have autocorrelation characteristics that approach an impulse. The duration of the pulses is also significantly longer than the worst delay spread to be found in environments in which the system is to operate. Therefore, the detection and decorrelation of each encoded pulse produces an estimate of the delay characteristic of the communications environment through which the signal passed on its way from the transmitter to the receiver. The ARRAY system uses such periodically estimated delay envelopes to transmit data at high speeds, and to minimize the effects of multipath from the measurement of the arrival time of the ranging signal, as discussed further below.

FIGS. 18–22 illustrate the timing for a preferred manner of processing signal transmissions for the system illustrated in FIG. 1a. More specifically, these FIGS. 18– 22 show a preferred modulation/demodulation technique, according to the present invention, for high speed data communication and high resolution ranging using spread spectrum and coded pulses.

Figure 18:
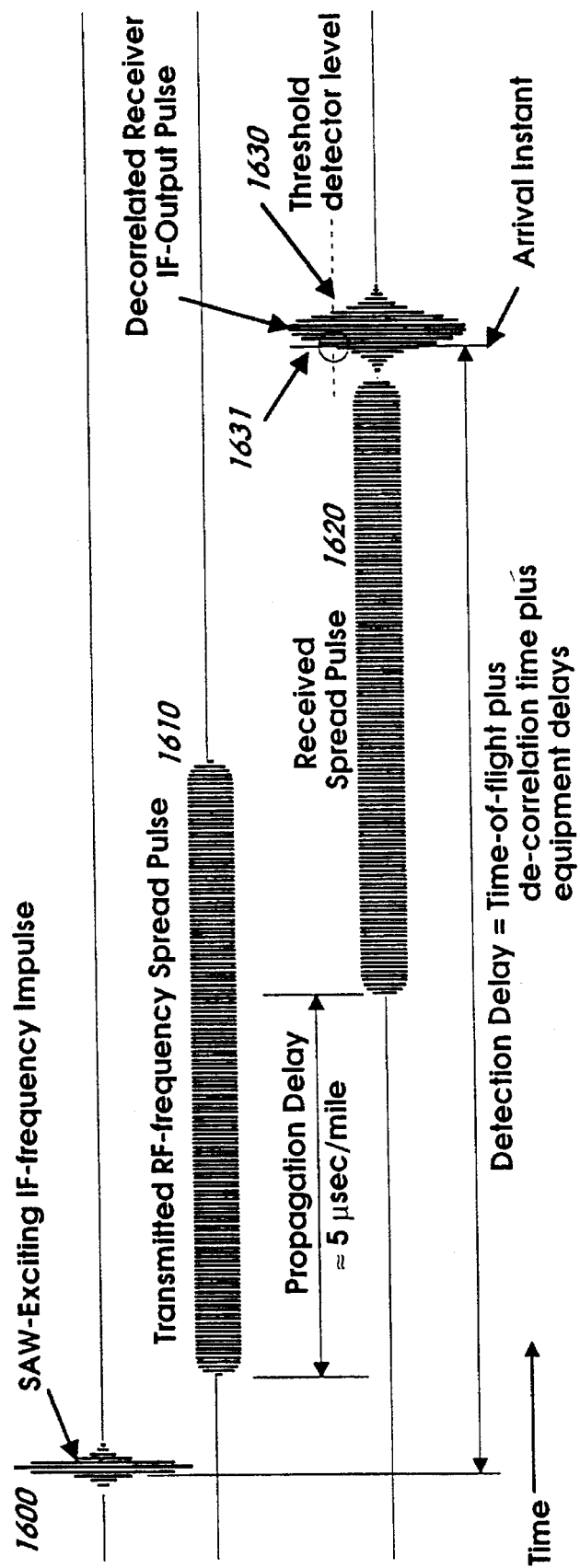

In FIG. 18, the time-line depicted 1600 illustrates an IF frequency impulse. Once converted into spread spectrum form, the impulse of time-line 1600 appears as shown on 1610 depicted as the transmitted RF frequency spread pulse. The spread pulse of time-line 1610 is shown being received at time-line 1620 with a propagation delay depicted as approximately 5 microseconds per mile. The time-line depicted 1630, which is a continuation of time-line 1620, illustrates the decorrelated receiver RF output pulse with a threshold detector level (subsequently discussed) shown by way of the dotted line.

The arrival instant, as recognized by the receiver, is the instant at which the decorrelated receiver RF output pulse first crosses the threshold detector level. This is shown by the point 1631 of FIG. 18. The detection delay between the time at which the impulse of time-line 1600 is first transmitted and the arrival instant is referred to as the detection delay; which is equal to the time of flight delays, plus the decorrelation time, plus the equipment delays.

In FIG. 19, the transmitted spread pulse on time-line 1700 is illustrated in conjunction with the same pulse shown at the receiver output at time-line 1710. The pulse at the receiver output comprises the first pulse (direct pulse) received via the line-of-sight signal plus the echoes (i.e., the same signals arriving at various delayed times). The symbol duration, being much longer than the delay spread, allows adequate time to capture most of the energy that would be received in a severe of multipath environment.

For example, in New York City, the maximum delay spread might be about 3 microseconds. Simple mathematical analysis substantiates that twice the delay spread for such an environment is more than adequate to capture the majority of energy that would be received for a system that is shown in FIG. 1a.

Because of the roughly exponentially decaying characteristic of the delay spread, data impulses separated by more than twice the delay spread experience little interference from each other in most environments. Therefore, a practical system using a minimum spacing of twice the worst case delay spread (experimentally found to be about 3 microseconds) between data symbols to minimize intersymbol interference, would have a maximum multipath limited symbol impulse rate of about one pulse each 6 microseconds, or about 160,000 pulses per second.

FIG. 20 corresponds directly to FIG. 19 except that three data symbols are being transmitted and received in FIG. 20 whereas only one data symbol is being transmitted and received in FIG. 19.

FIG. 21a shows a single broadband, pseudo-random-noise pulse transmitted by an ARRAY transponder. FIG. 21b illustrates the same transmitted pulse of FIG. 21a decorrelated by the receiver with no multipath present, while FIG. 21c shows the transmitted pulse of FIG. 21a received in decorrelated form in the presence of multipath. FIG. 21d illustrates the delay envelope detail of the signal represented by FIG. 21c. These signals are all shown on a timescale of about one microsecond.

FIGS. 22a and 22b show the same signal on a timescale of about 10 microseconds, which allows the full extent of the delay envelope to be appreciated. This is a typical signal envelope for a city like New York. The actual delay envelope is shown in FIG. 22a, and the integrated envelope is shown in FIG. 22b. The integration time is variably selected according to the associated level of noise. That is, the integration time terminates when the received signal falls close to the noise level.

The present invention uses a set of different pulse-stretching code sequences to convey data symbols in each ranging pulse. Each of the different pulse-stretching code sequences has the same duration, each has an autocorrelation function that approximates an impulse, and each has only small partial and cross-correlation products with all other codes in the set. No matter which code-sequence is used, the same delay envelope is obtained from a particular environment. Each pulse is, therefore, capable of performing as a ranging pulse, while at the same time the detection of the particular sequence used for the pulse conveys a particular data symbol. Data symbols, each represented by one of the members of the set of unique, non-interfering spreading-code-sequences (codes with low-partial-correlation and low-cross-correlation products), encode the ranging pulses.

Figure 23:
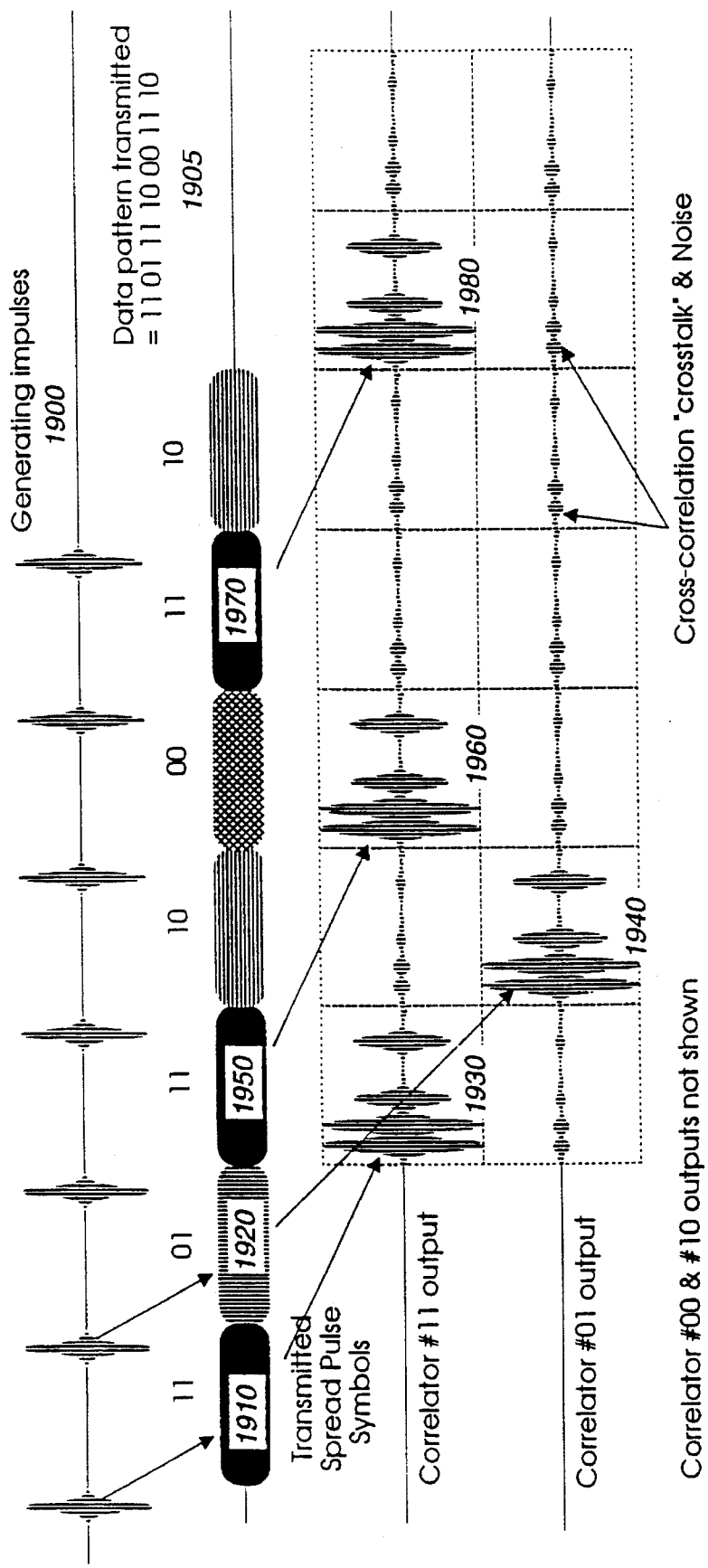

In FIG. 23, for example, a sequence of generated impulses on time-line 1900 represents the transmitted data pattern 11 01 11 10 00 11 10, with two data bits (a di-bit) per data symbol and a total of 6 data symbols. These generated impulses are shown on time-line 1905 in the form of spread spectrum pulses. In accordance with the present invention, this sequence may be processed through a multichannel (or multi-code) correlator which develops parallel output signals, such that each correlator output port provides only one of the data patterns, e.g., 11, 01, 00 or 10. The number of data bits per symbol depends on, or is limited by, the number of correlator output ports; in the present example there are two bits per symbol in view of an assumed limit of four correlator output ports; with 16 ports, four bits per symbol, etc.

As shown on the last two time-lines of FIG. 23, the correlator output signals for the data patterns 11 and 01 are illustrated after being received, in a multipath environment, at the output ports of a corresponding receive correlator with each port providing only the corresponding data patterns for the respective transmitted correlated data.

Figure 24:
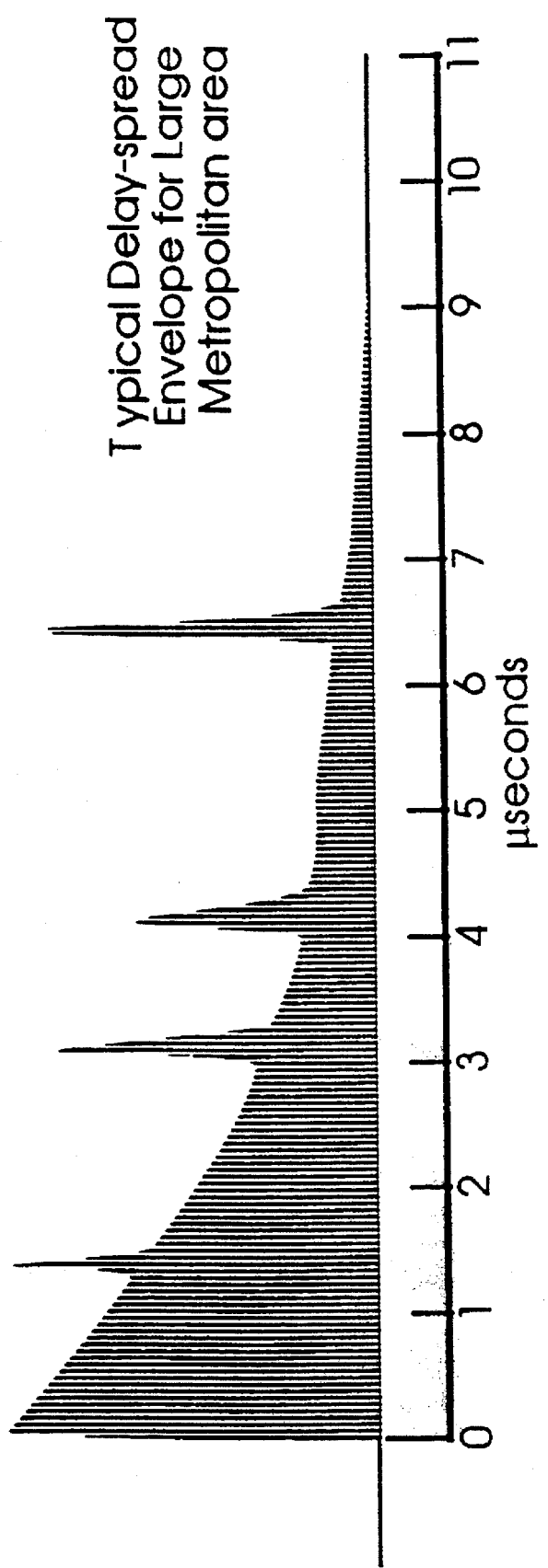
Figure 25:
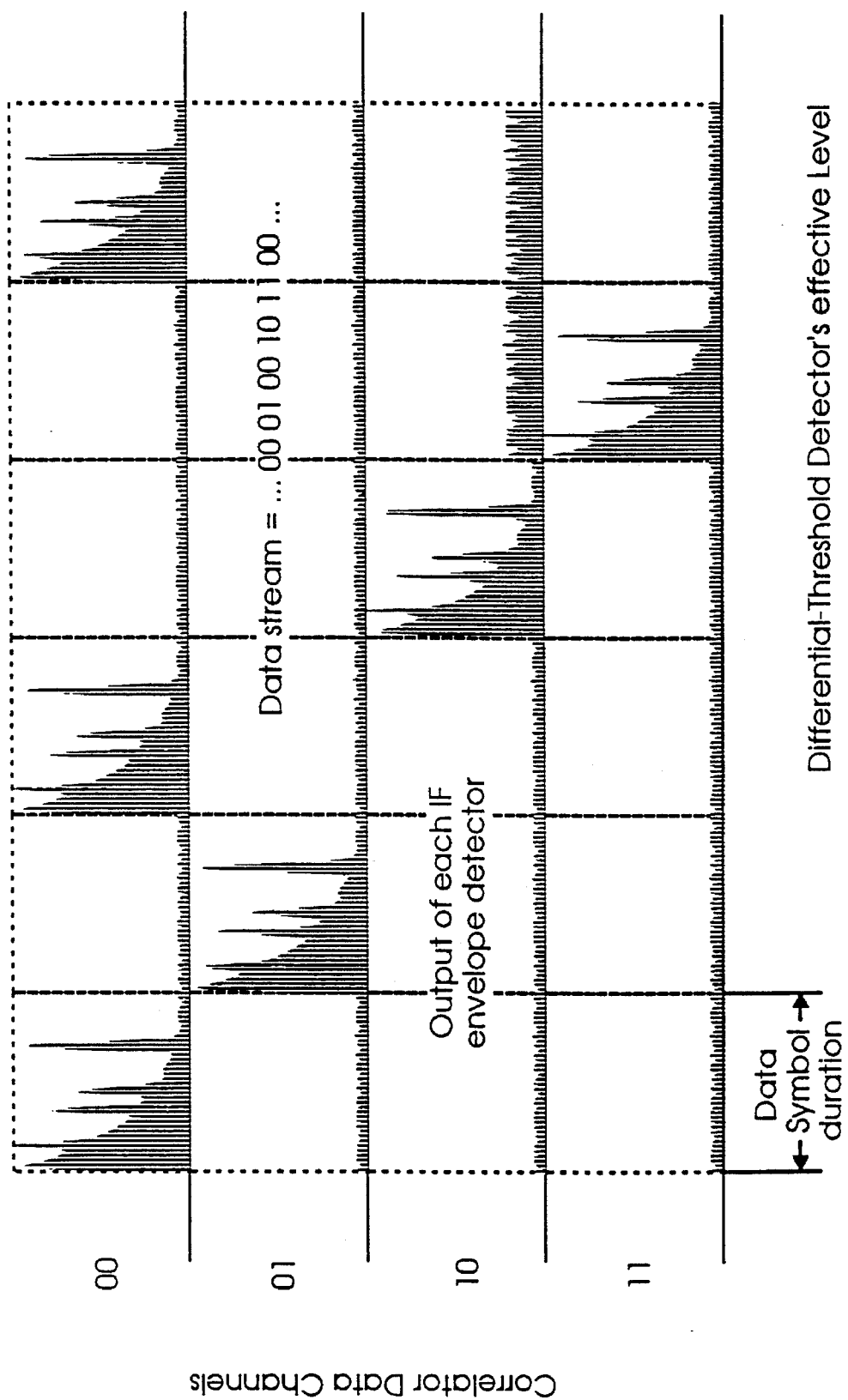
Figure 26:
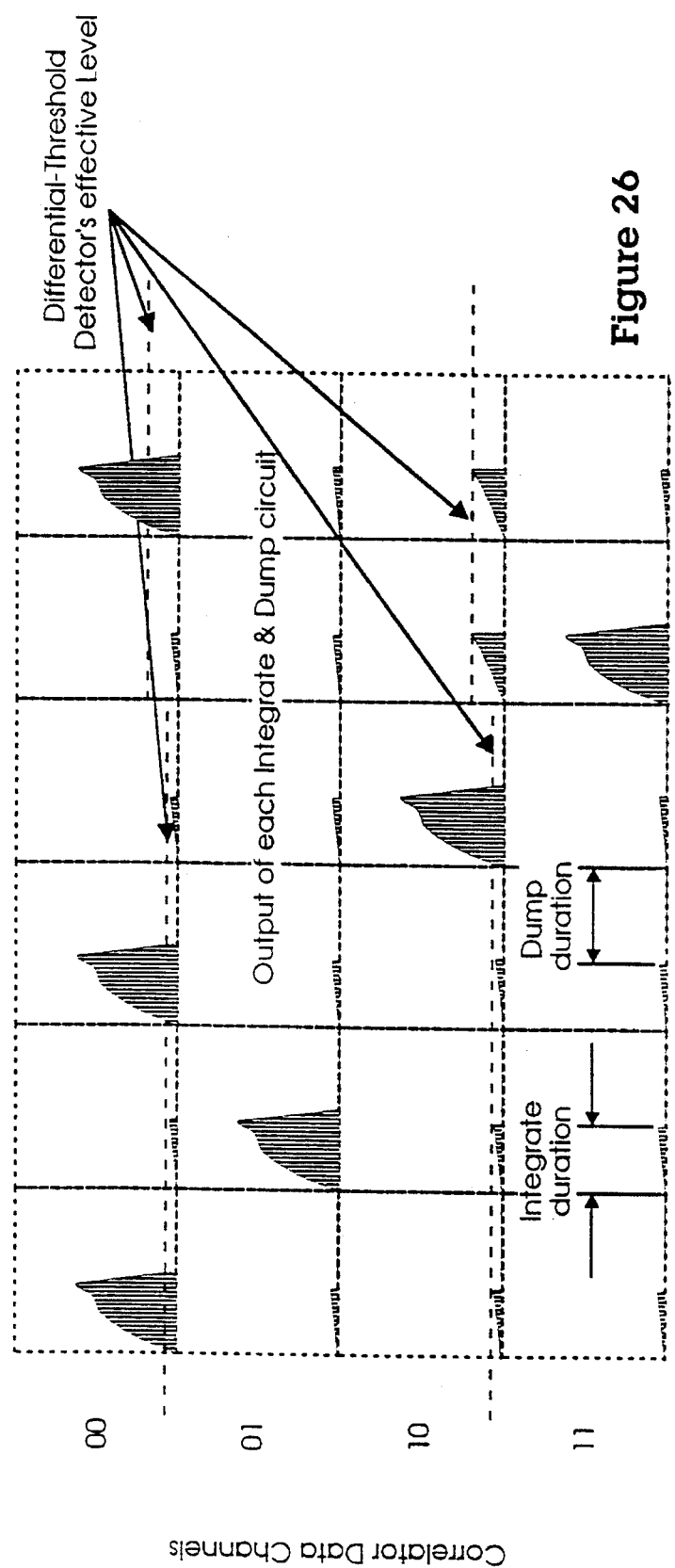

FIGS. 24 through 27 show the derivation of the data from the delay-envelope estimates made by the transmission of each data pulse. FIG. 24 illustrates a typical delay-spread envelope for a large metropolitan area having a period of approximately 7.3 microseconds. FIGS. 25 and 26 illustrate the waveforms of the received signals after certain processing has been performed by the transponder or base station circuitry, discussed infra.

Figure 27:
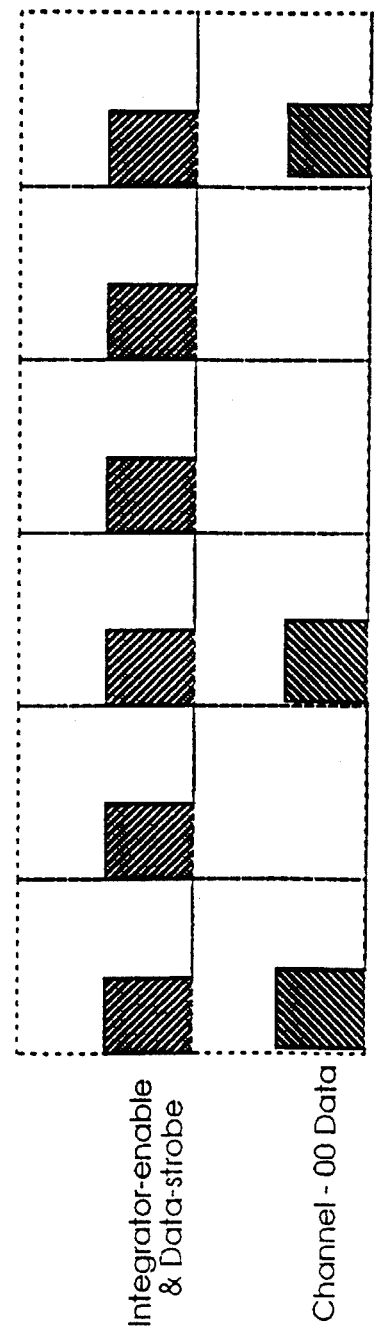

More specifically, FIG. 25 shows the output of each IF envelope detector, and FIG. 26 shows the output of each integrate and dump circuit. A total of six data symbols are shown for the corresponding data stream 00 01 00 10 11 00. The di-bits (00, 01...) on the left hand side of the FIGS. 25 and 26 identify the particular code sequence that was transmitted and subsequently received. FIG. 26 also illustrates the integration duration 2830, corresponding to the portion of the signal that is integrated, and the dump duration 2840, corresponding to the portion of the signal that is discarded. FIG. 27 illustrates the corresponding data that is retrieved from the integrated signal, as depicted for the channel 00 data.

Additionally, FIG. 26 illustrates the differential-threshold detector's effective level, which is the effective threshold level against which the integrated values are tested to determine which of the channels has the highest symbol energy level.

Accordingly, in a preferred embodiment of the present invention, the data-encoded pulses provide a communication platform for high-resolution distance ranging while at the same time carrying high-speed data in their encoding scheme.

The preferred embodiment of the ARRAY system reliably transmits data at a designed rate of about 136,161 data symbols per second, while providing a design-level line-of-sight ranging uncertainty in the range of 2 to 5 feet out to a typical range of 5 to 10 miles. Line-of-sight signal path obstruction and signal scattering by urban and suburban buildings and structures degrade this small uncertainty to between 20 and 200 feet for a single range measurement. However, due to the multiple-fold coverage of the ranging area, the resulting redundant ranging measurements allow this single-measurement range uncertainty to be reduced to between 10 and 50 feet, respectively.

Hardware Implementation

SAW Correlator

Another important aspect of the radio transmission and reception capability of the system concerns in the spread-spectrum modulation/demodulation scheme for generating and detecting the symbols. The set of coded spread spectrum pulses are simultaneously generated in the transmitter-part of the ARRAY transponder by a custom designed bidirectional, multi-channel, quartz surface acoustic wave (SAW) correlator. Metalized patterns, comprising input and output transducers, are deposited on the quartz substrate.

A general layout of the SAW design is shown in FIGS. 28–31. In accordance with the half-duplex (i.e., send and receive at mutually exclusive times) design of the radio communication protocol for the system, each SAW correlator is made bidirectional by equipping each of the longer, code sequence pattern input transducers that are series-connected between terminals 1530 and 1540 with two shorter, output transducers 1502 and 1504 at either end of the input transducers. The two output transducers allow the transponder or transceiver device to make use of the SAWs that propagate in both directions from the center encoding transducer.

The transducers serve to convert the voltages applied to them into mechanical strain waves in the quartz surface by virtue of the piezo-electric effect. The mechanical strains move like water-waves on the surface of a pond, radiating in both direction from sides of the "finger-patterns." The longer input transducers have finger patterns whose placement and spacing generate the specific code sequence's wave shape when the excitation pulse burst is applied to the input transducers.

Figure 31:
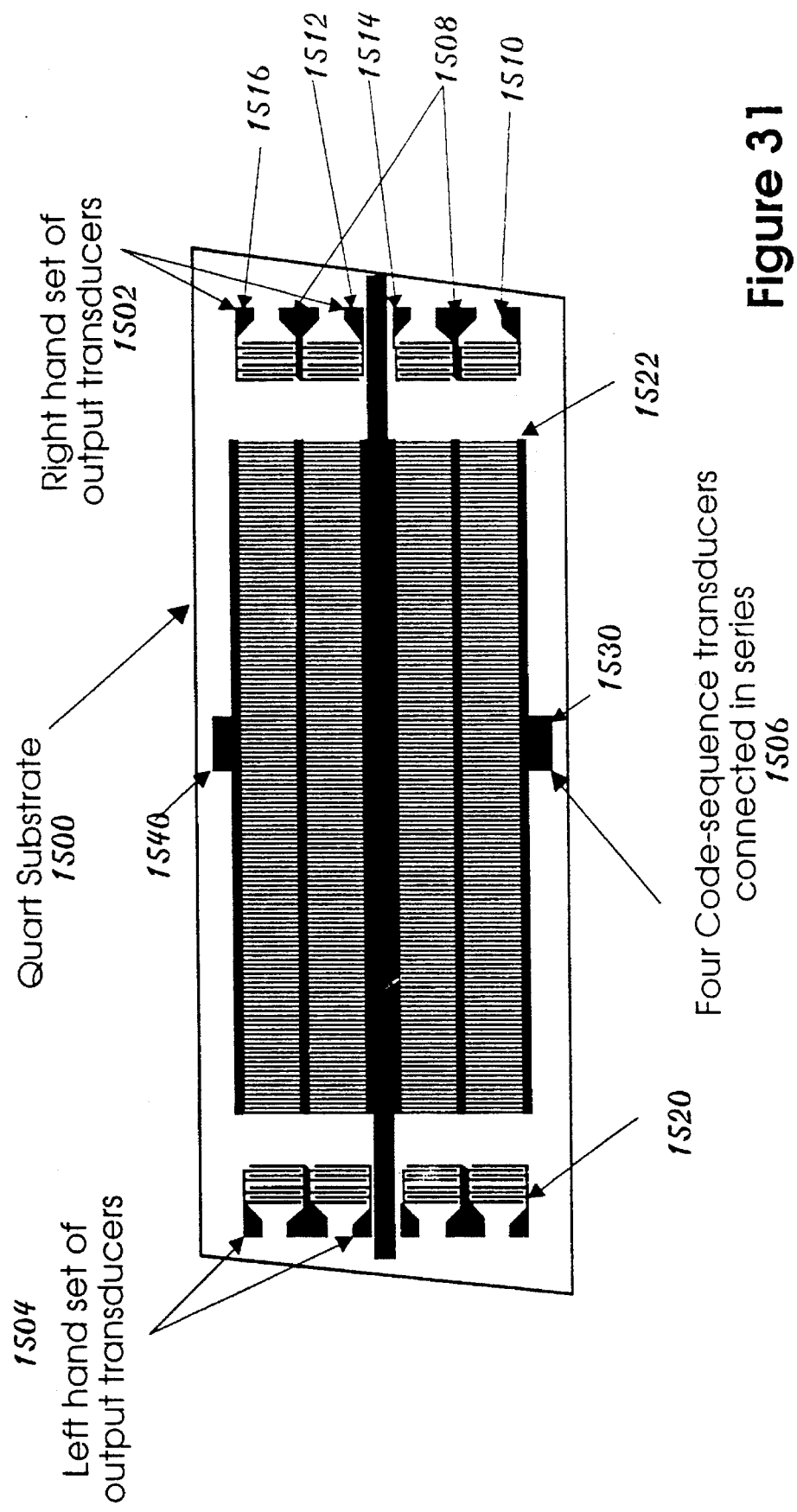

Due to fabrication constraints, the code-sequence generating (input) transducers in the center of the device must be connected in series, as shown between terminals 1530 and 1540 of FIG. 31. A single excitation pulse burst, usually consisting of a few cycles of alternating voltage at the IF center-frequency of the device, is applied to these terminals to cause an acoustic wave to be launched from both ends of the series-connected code-sequence-wave-generating input transducers.

The acoustic waves are converted back into electrical signals by the output transducers located near the ends of the device. The left-hand set of four output transducers provide a time-reversed version of the desired sequence and are ignored during transmission, while the right-hand set of four output transducers provide the correctly ordered time sequences. Each of the four strain-waves, generated at the output transducers, implement one of the encoding sequences. A multiplexer (shown and discussed in connection with FIG. 32) subsequently selects the desired sequence for radio transmission.

Figure 28:
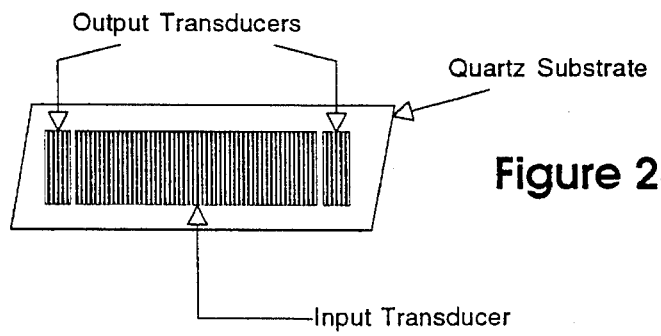
FIGS. 28–31 are illustrations of a SAW (surface acoustic wave) correlator, according to the present invention, showing signal flow for both the transmission and reception modes for use in the system of FIG. 1a and pursuant to the timing diagrams of FIGS. 24–27.
Figure 29:
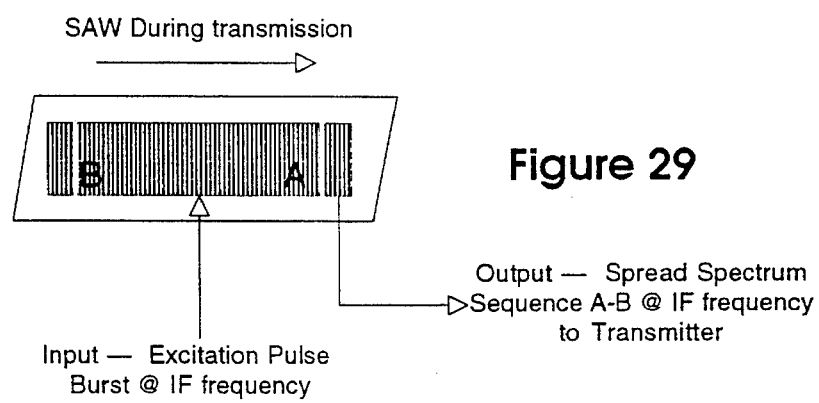
Figure 30:
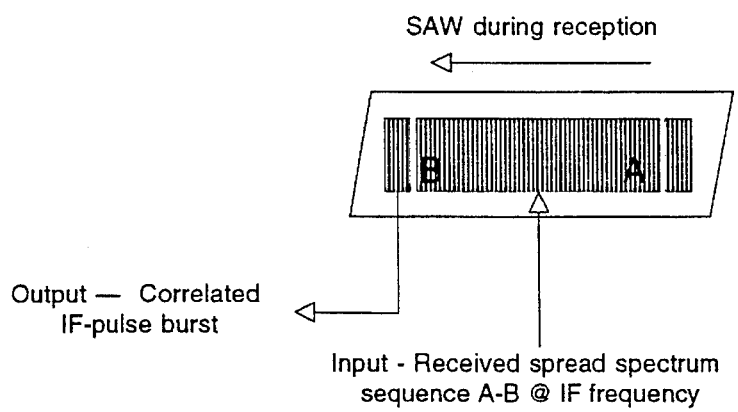

FIGS. 28, 29 and 30 show the sequence of events for using a single channel of the SAW device to generate the output code sequence for transmission, and by suitable switching, use the same transducer to de-correlate the (same) sequence during reception.

The encoding sequences spread the relatively large energy of the short compressed-duration ranging-data pulse in both time and frequency. The custom-designed, spread-code-sequence modulation waveform optimizes the time-domain ranging characteristics of the de-correlated impulse while minimizing the "spurious" out-of-band frequency-domain side-lobe energy. Non-coherent correlation in the receiver by the same SAW device compresses the spread-pulse back into a near-impulse again.

By choosing the spread-to-de-spread ratio in the preferred embodiment to be 127 (or possibly 255), and setting the maximum available bandwidth of 26 MHz equal to the main-lobe bandwidth of an MSK modulated signal (bandwidth between the spectral nulls closest to the center frequency), yields a chip rate of 17.292 MHz. At this chip rate the sequence duration becomes 7.344 microseconds, yielding a symbol rate of 136,161 SPS. Both larger or smaller values can also be used, depending on system design tradeoffs, such as symbol-duration, required process gain, maximum usable chip-rate, etc. For example, using the same chip rate on a correlator with 255 chips would have a symbol duration of 14.6538 microseconds, yielding a symbol rate of 68,241 symbols per second.

Through the use of a frequency band created for pulse ranging purposes by the FCC, the system transmits data symbols while performing vehicle position determination at data rates much higher than those commonly used by conventional land-mobile data communication. The bandwidth is used to define the characteristics of the pulses being used for ranging; characteristics such as compressed pulse width, pulse repetition rates and pulse signal-to-noise (s/n) ratio at the detector output. The data transmission characteristics are secondary to the ranging functions, and are determined mainly by economic factors, such as the manufactured cost of the mobile data-transceiver-modem. By suitable encoding and data detection circuitry (using Gold-codes derived from the 127 chip maximal-length-PRN ("Psuedo Random Noise") sequences), the theoretical limit of data transmitted by the pulse encoding/detection scheme is about 15 bits per data pulse. However, realization of such a capability would require a very large number (38,862) of symbol detectors (or fast digital signal processor (DSP) chips implementing an equivalent function) which would lead to a very high transponder cost. Thus, for economic reasons, the preferred embodiment limits the number of bits transmitted per symbol to two, or possibly three. SAW devices such as the one proposed here may be built in accordance with the teaching herein by companies such as Crystal Technologies, Inc., of Palo Alto, Calif., or Anderson Laboratories of Bloomfield, Conn.

FIG. 28 illustrates how the pulse spreading sequence is generated and how the pulse is recovered from the spreading sequence again by correlation. Generation of the code-sequence pulse occurs as previously described.

The short right-hand (RH) output transducer yields a sequence having the time-sense A-B (i.e., A first followed by B as in FIG. 29). The output of this transducer is connected to the transmit circuitry for transmission.

On reception, the sequence is now applied to the input transducer. However, in this case the output is taken from the other, i.e., left-hand (LH) output transducer, which has a time reversed sense (B first followed by A, as in FIG. 30) compared to the output of the RH transducer.

A mechanical sense for how the correlated response would result from this application of the matching sequence to the input transducer can be seen from the following. For such a correlated sequence, the leading edge of the wave propagating from A towards B, is created by the leading edge of the received signal applied to the transducer. The moving wave will be reinforced at every instant as it progresses at constant velocity along the substrate in synchronism with the incoming received signal sequence. This is because the voltage (of the matching sequence signal) will have exactly the right phase and amplitude to reinforce the wave as it passes under the corresponding finger in the code pattern metalization, much like pushing on a playground swing at the right time to build up the amplitude of the motion. Such reinforcement continues until the fully reinforced IF burst reaches the LH output transducer, producing a peak output as it traverses the output transducer.

In the case of an unmatched sequence, the propagating wave will be sometimes reinforced and sometimes restrained by the incoming signal, with the average over the complete sequence being no net reinforcement. (Equivalent to pushing on the playground swing randomly.)

In FIG. 31, the received sequence is shown applied to the series-connected input transducer, and the input sequence is simultaneously correlated with each of the four sequences encoded into the transducers. With well designed sequences, only the matching sequence generates any significant output pulse when the whole sequence has entered the SAW device, while all other correlation channels produce very small noise-like outputs.

In the preferred embodiment, the various encoding sequences are chosen from a class of maximal length sequences known as Gold Codes, so named after their discoverer. The desired set is chosen for the available set of 38,862 codes available for a 127 chip sequence for small partial-correlation and cross-correlation products. These sequences are used to drive the modulation function, which in the preferred embodiment is a modified minimum-shift-keyed modulation technique.

Most correlator's modulation characteristics have been implemented by finger patterns having regular spacing. Such regular spacing is simpler to design and manufacture, and is ideal for BPSK modulation implementation, since the finger spacing determined the center frequency of operation. The connections to the fingers alternate between the busbars running perpendicular to the fingers, in accordance to the phase relationship required for a particular chip in the modulation sequence. However, BPSK has significant out-of-band sidelobe energy which requires extensive filtering to reduce it to within workable limits. Furthermore, the coherence bandwidth of BPSK is still significant for small phase-change fading consideration and is less desirable for application in the present invention's embodiment.

Standard minimum shift keying produces continuous phase waveform with triangular phase trajectories between bit changes, and an amplitude spectrum envelope defined by $sin(x)/x^2$. The modifications applied to the MSK modulation function reduce the amplitude of the out-of-band "sidelobes" while maximizing the rise-time and minimizing the time-domain ripple of the decorrelated pulse. The modification of the MSK modulation form involves manipulation of the triangular phase trajectories by suitable band limiting of the phase characteristics of the sequences.

In the preferred embodiment here, the particular phase trajectories required by the particular dibit transitions are implemented in the spacing of the pattern of fingers in the code transducers. The phase trajectories between dibits are determined by computer design using Fourier transformation to vary the spectral components for continuous phase, minimum signal-amplitude variation, minimization of coherence bandwidth (for best multipath fading performance) and the out-of-band side-lobe energy (for minimizing the cost of addition transmit filters), while flattening (i.e., broadening) of the in-band spectral content and optimizing the autocorrelation-impulse response for optimum ranging performance.

Base Station Transceiver

Figure 43A:
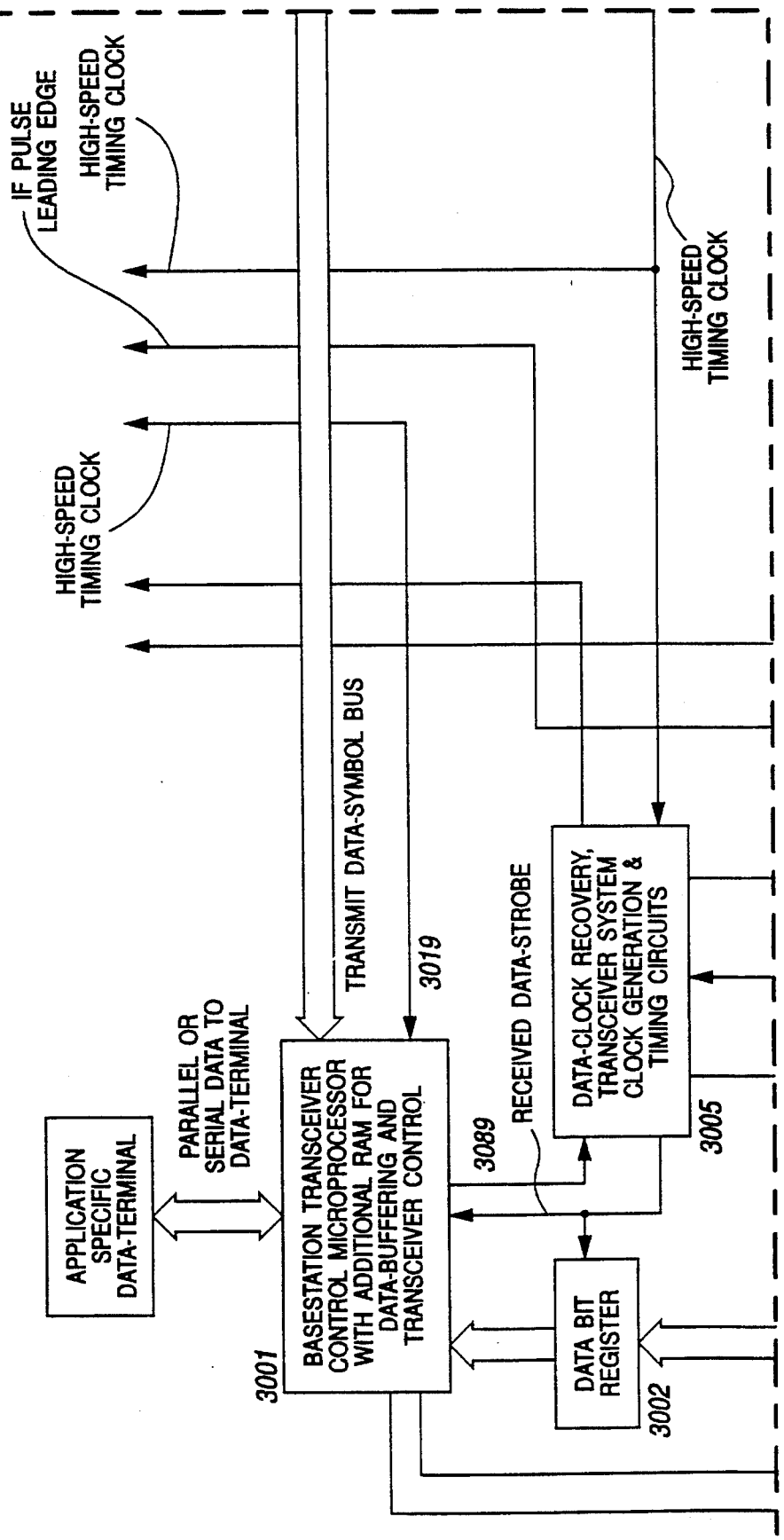
Figure 43B:
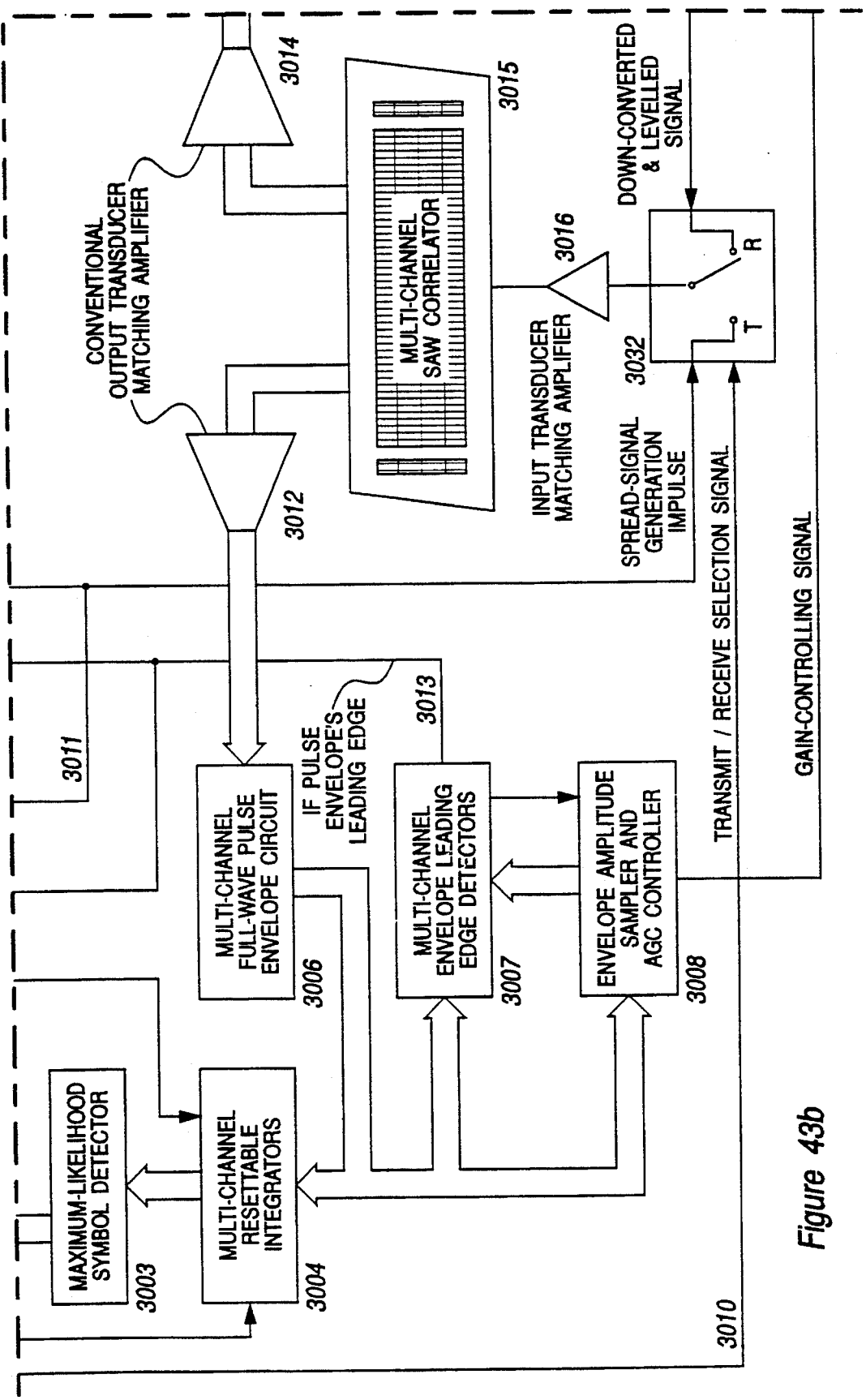
Figure 43D:
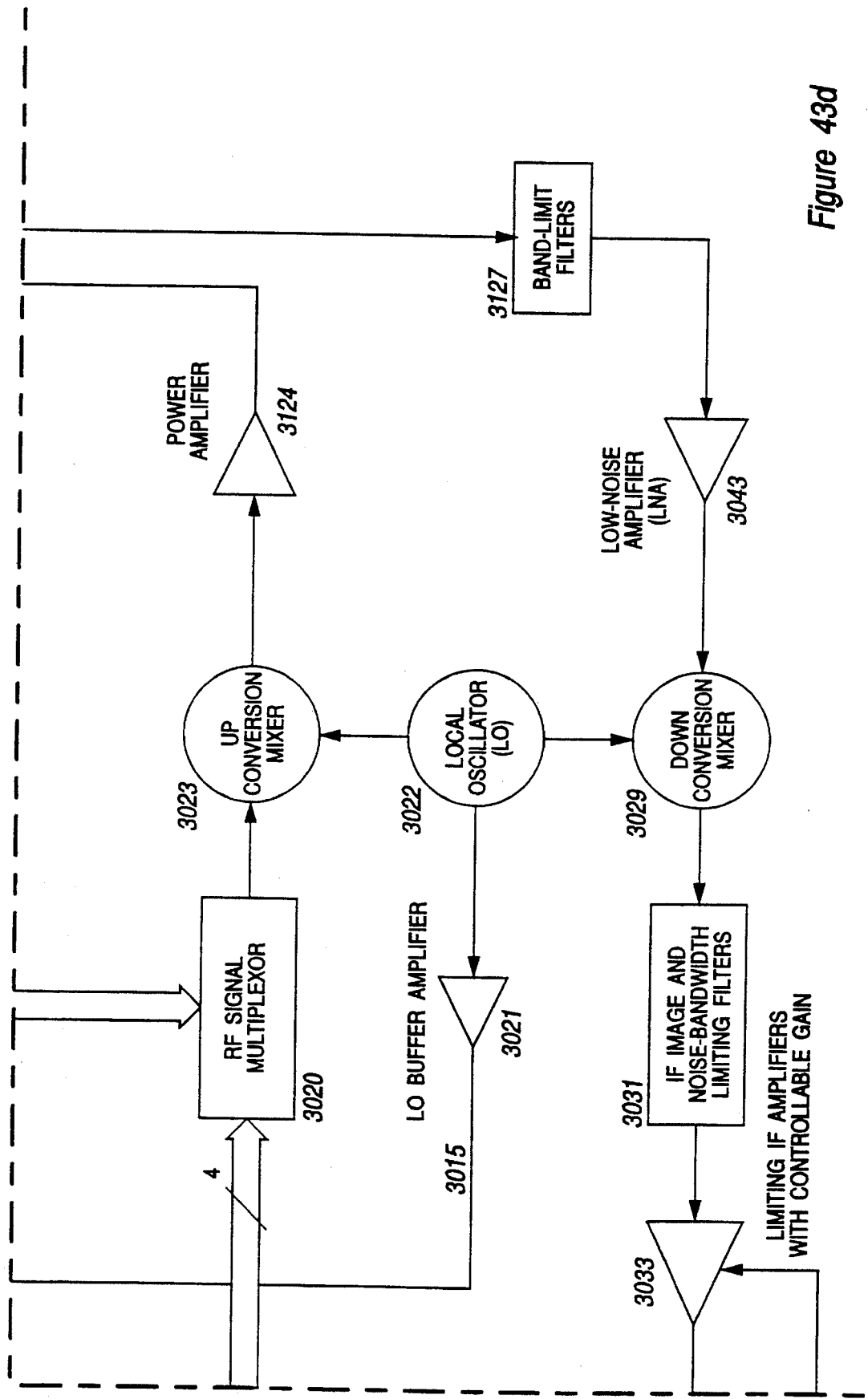
Figure 44A:
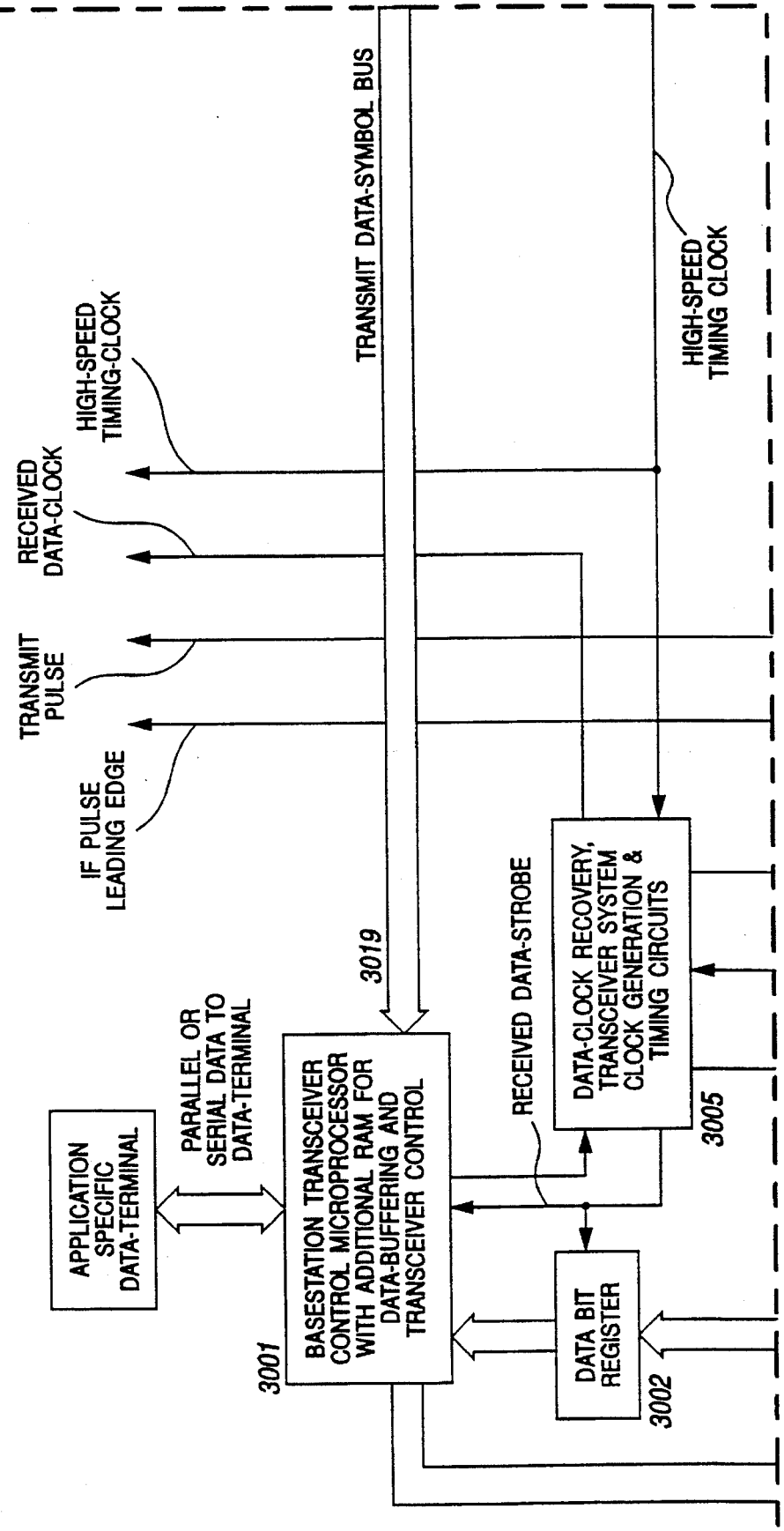
Figure 44B:
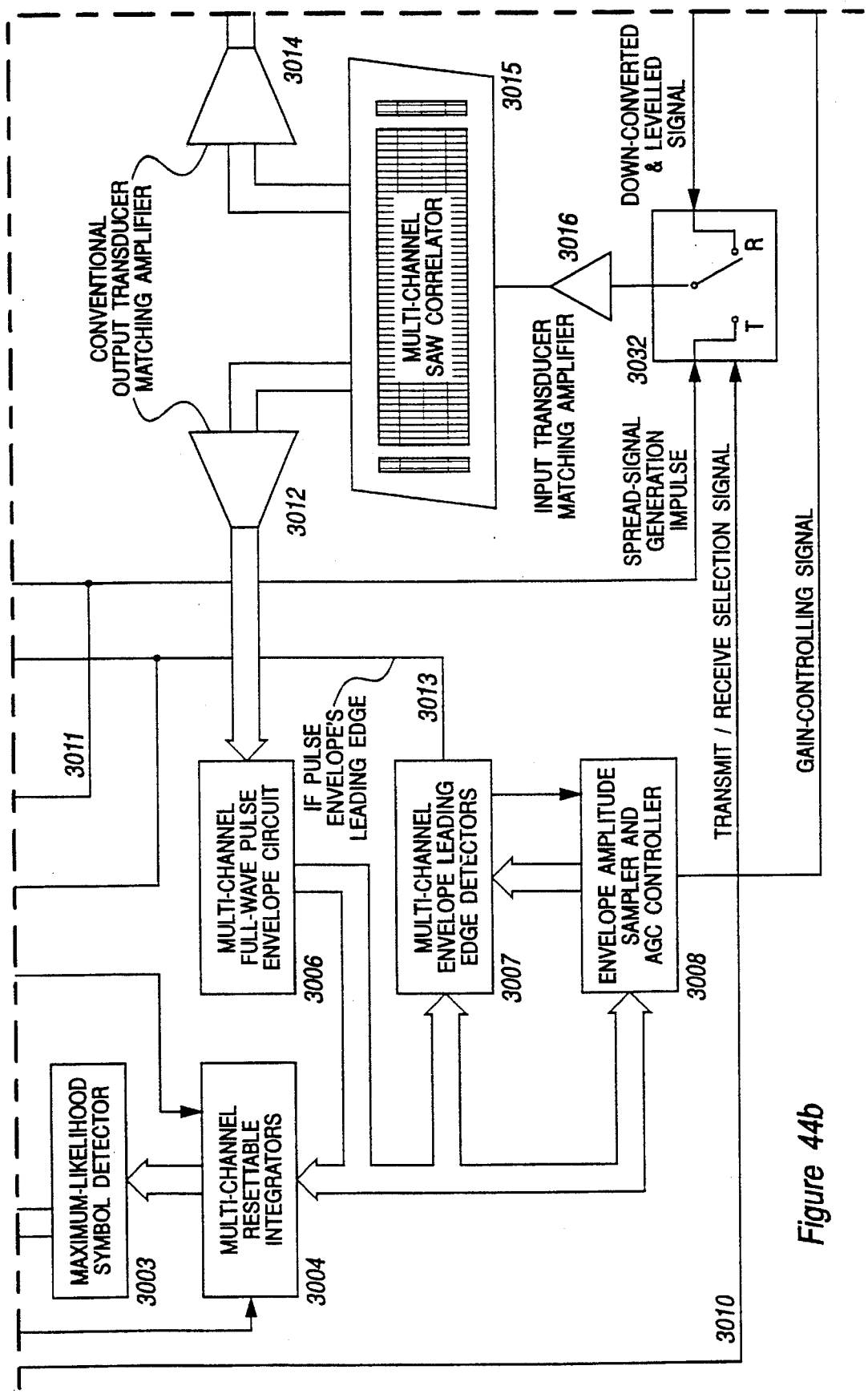
Figure 44C:
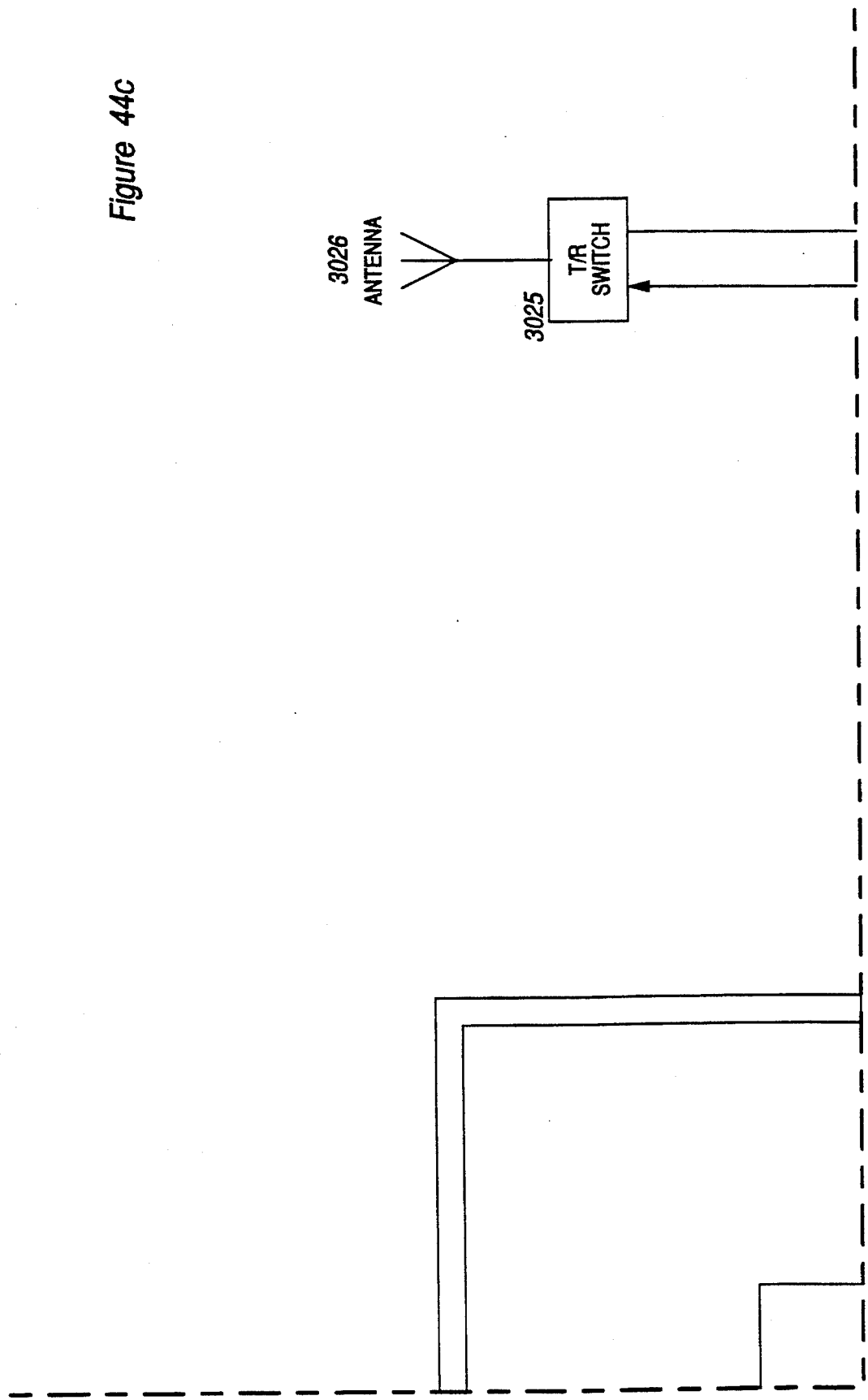
Figure 44D:
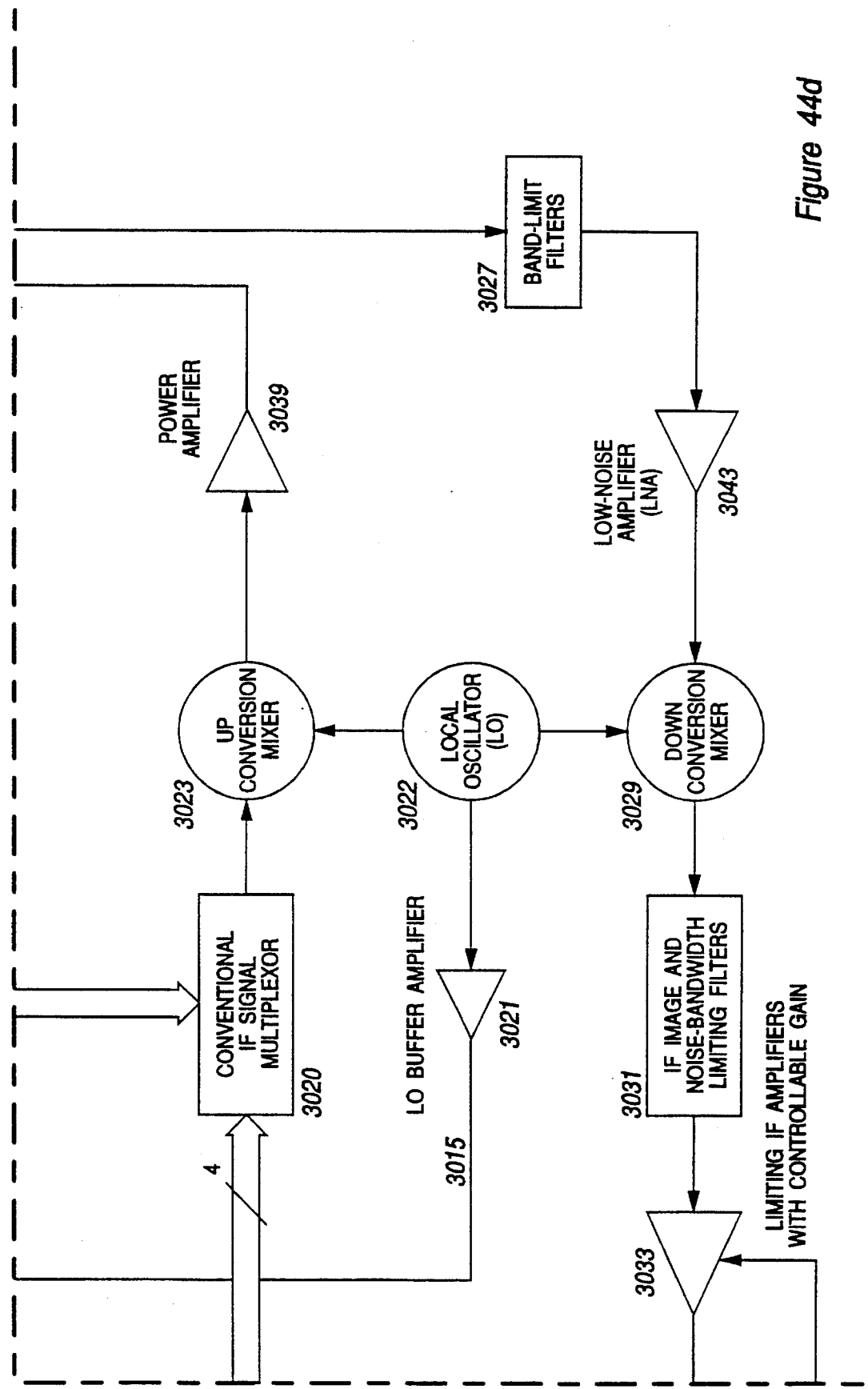
Figure 45A:
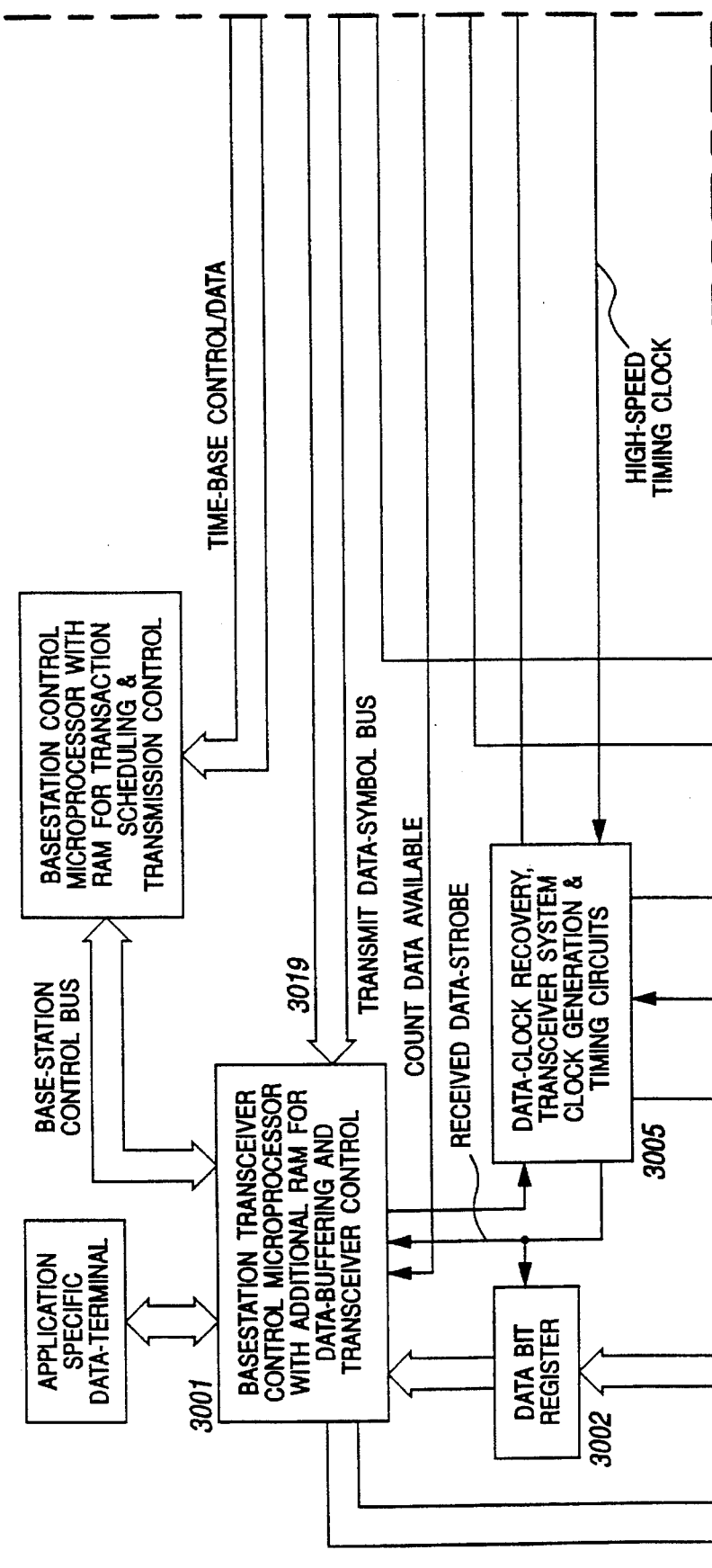
Figure 45B:
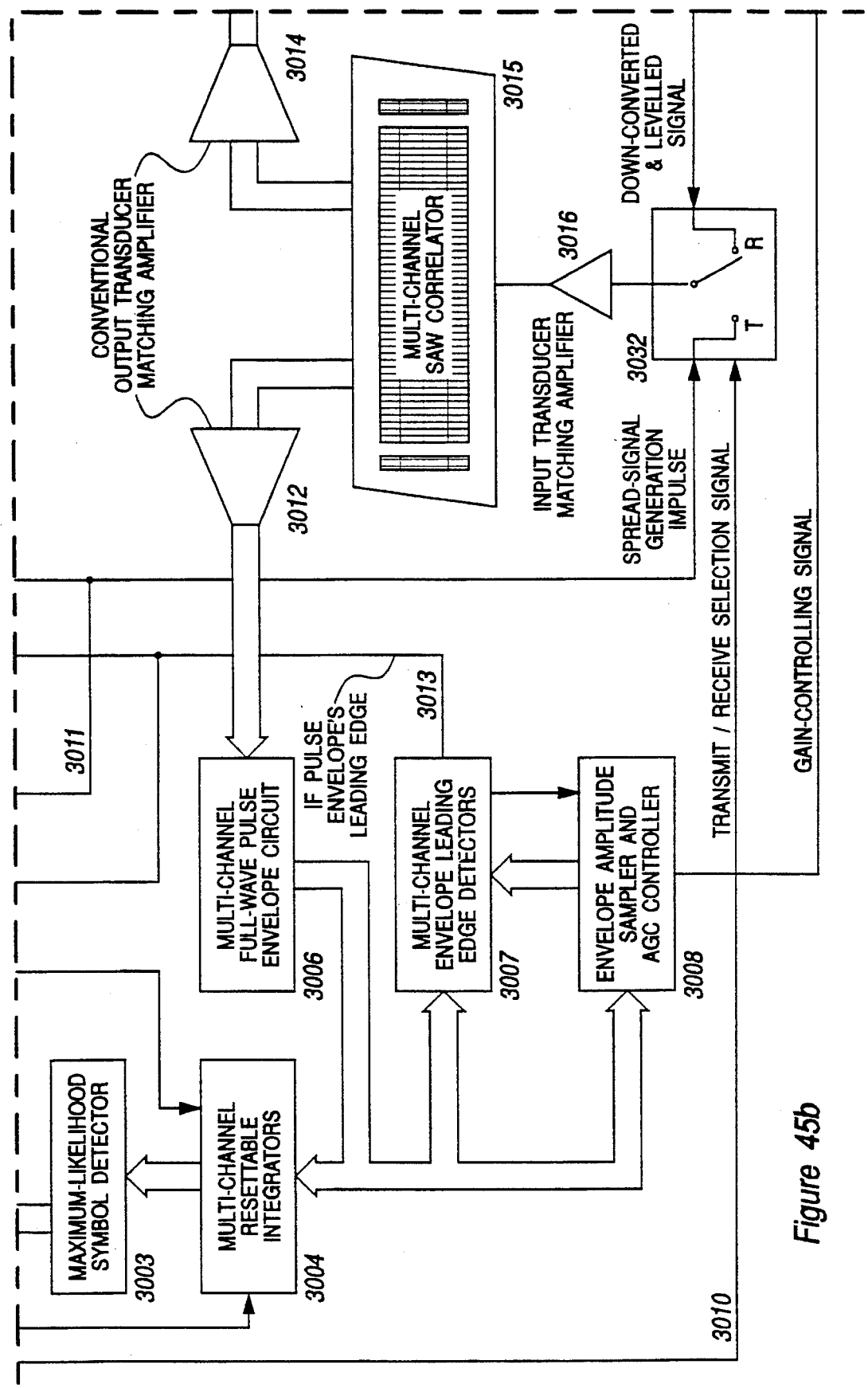
Figure 45C:
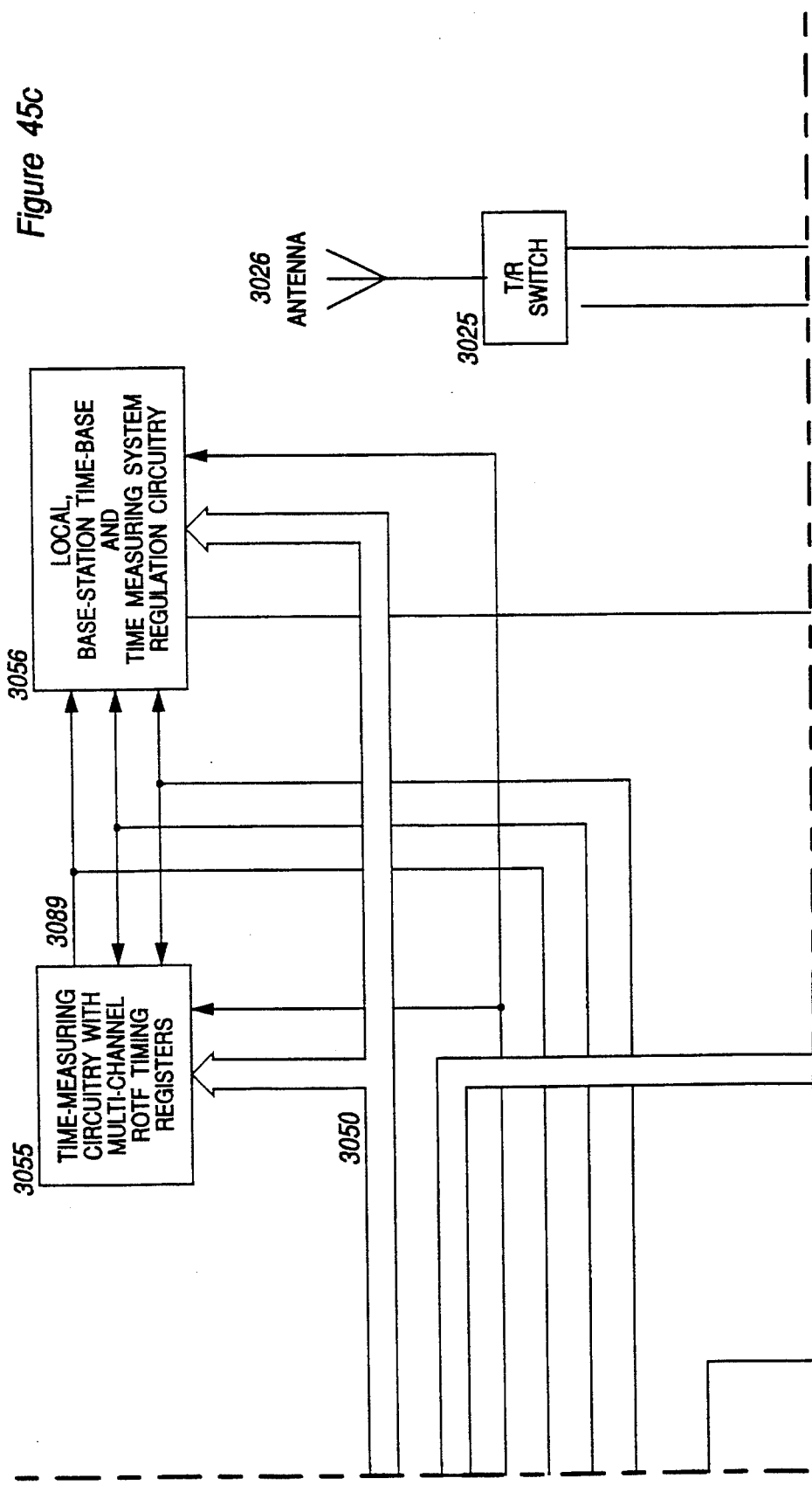
Figure 45D:
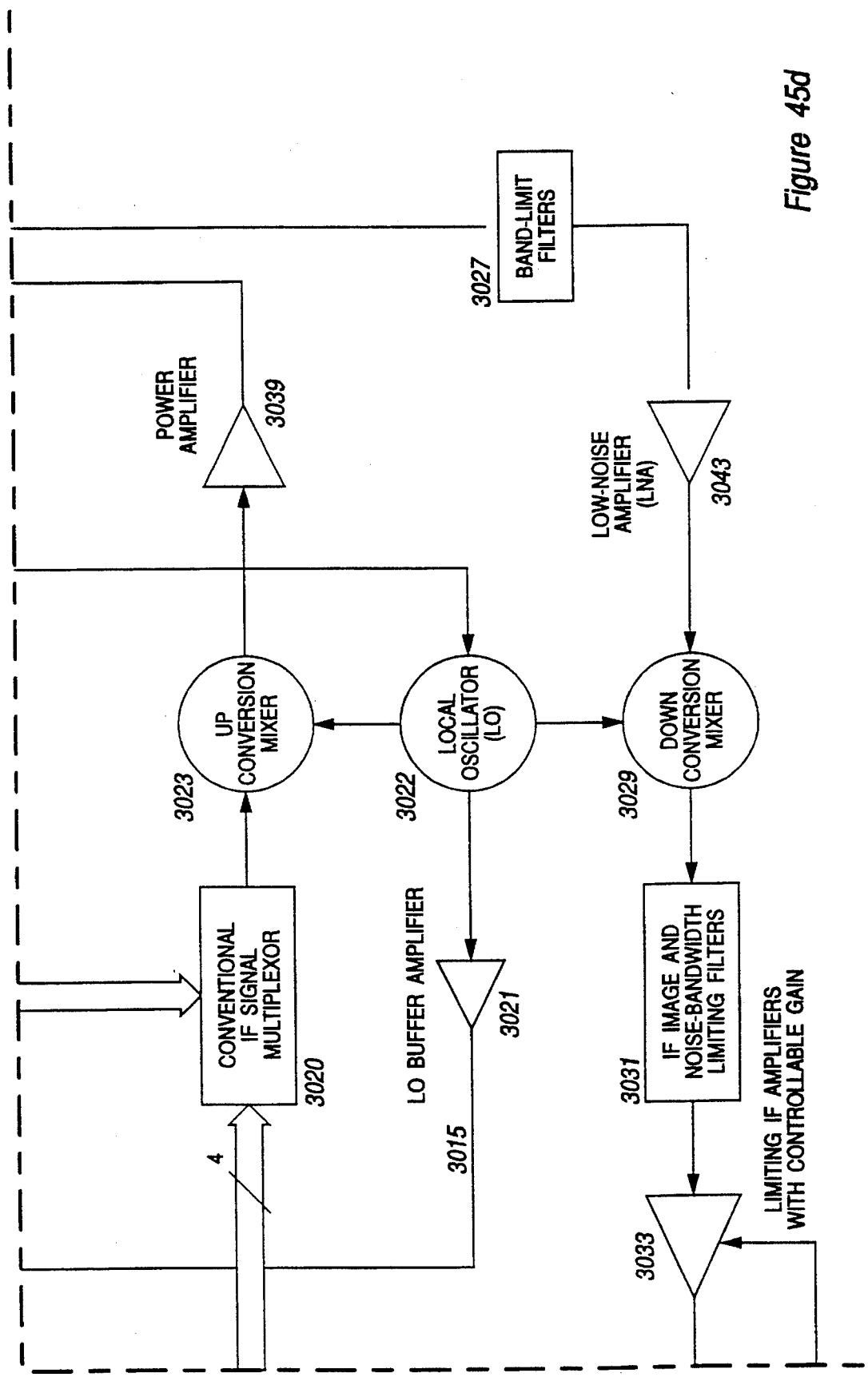
Figure 46A:
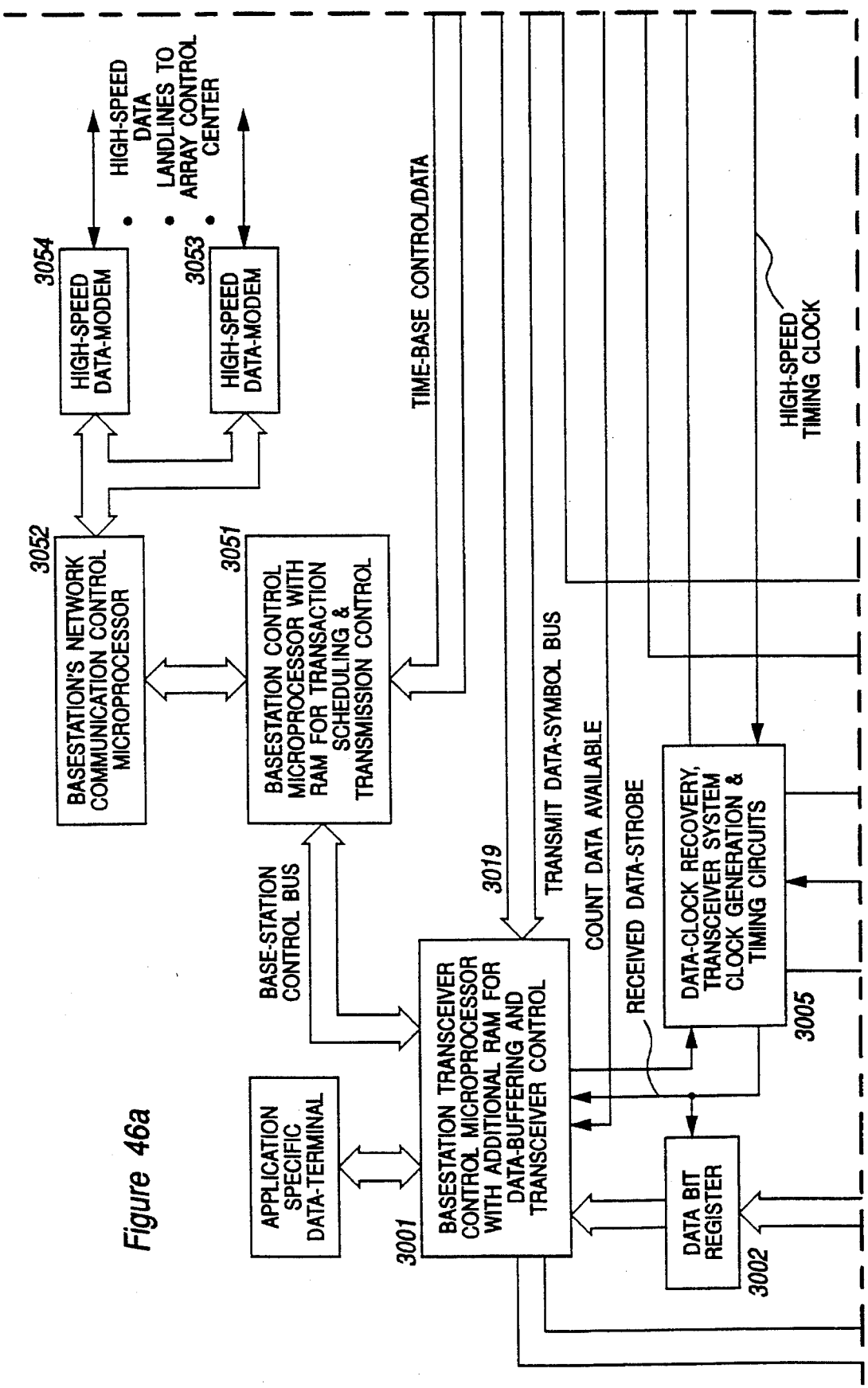
Figure 46B:
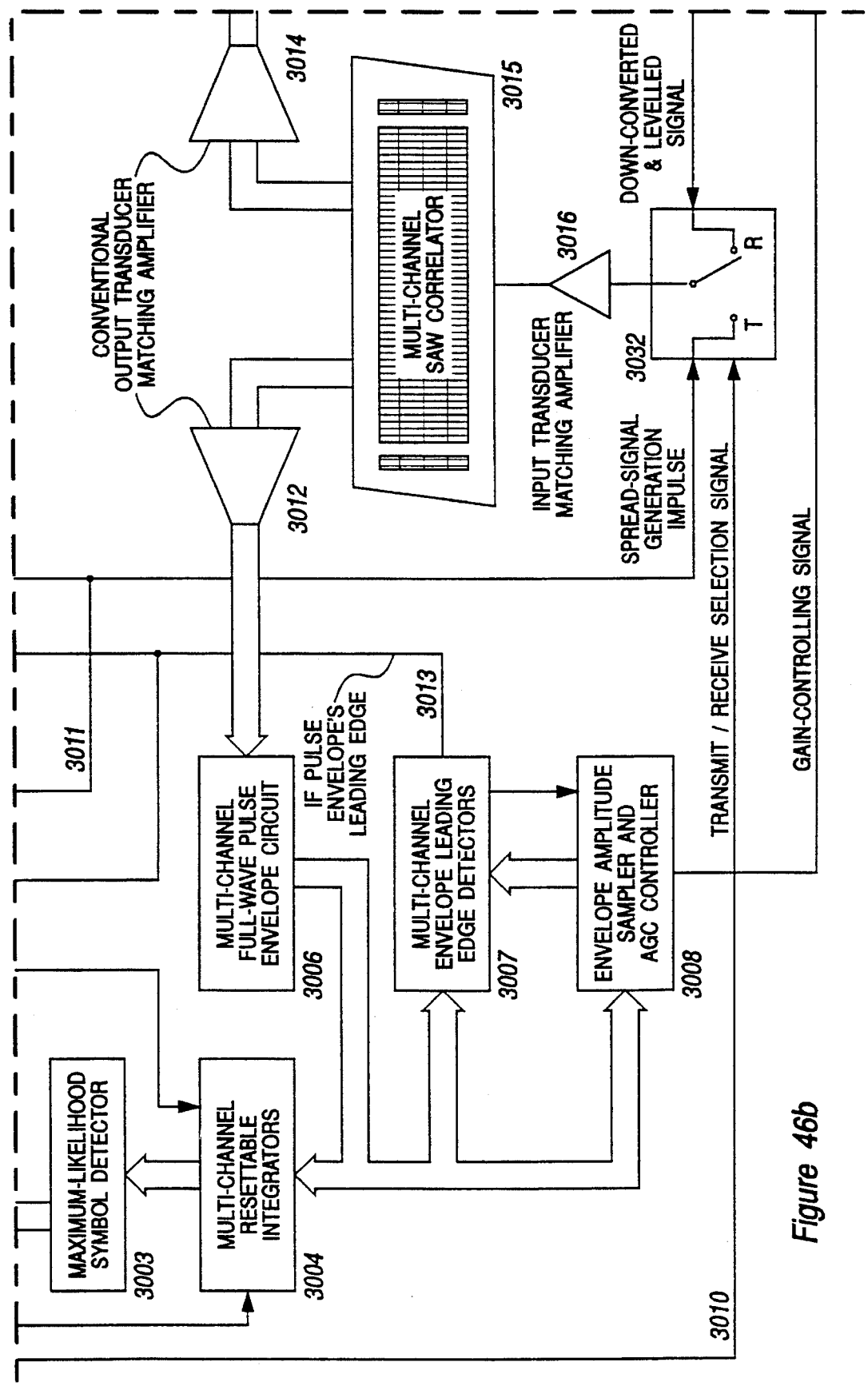
Figure 46D:
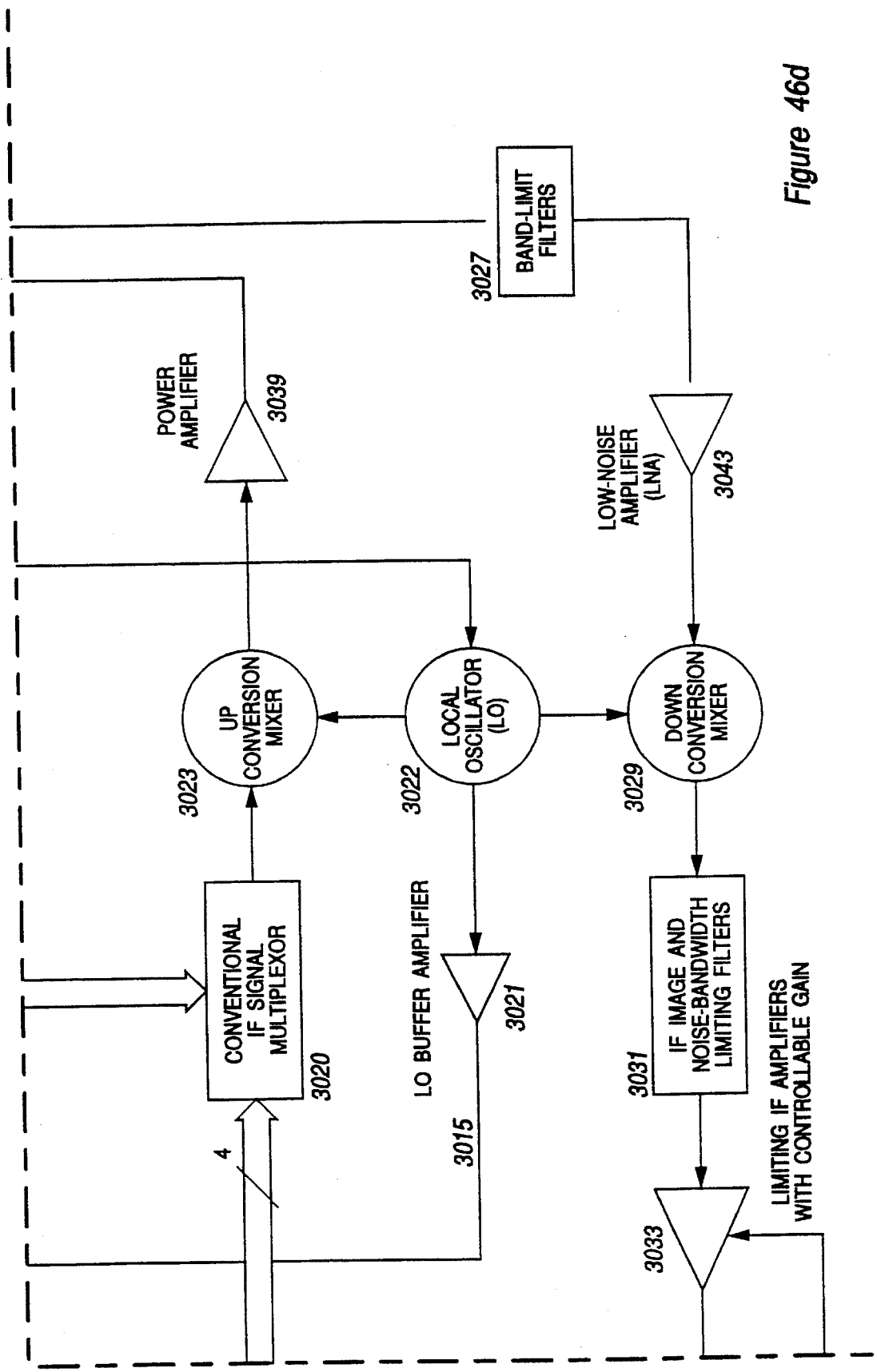

There are two different transceiver designs for the ARRAY system. They are respectively illustrated in FIGS. 32 and 43. While the RF and pulse-processing sections of the transceivers for the base station and transponder are basically similar, they differ in the functions they perform when serving as base station or mobile transponder. The power levels and separate antenna systems for the base stations are very different from the shared antenna and smaller power levels of the mobile transponder, and the extensive time measuring functions in the base station's transceiver are absent in the mobile's transceiver.

Figure 32B:
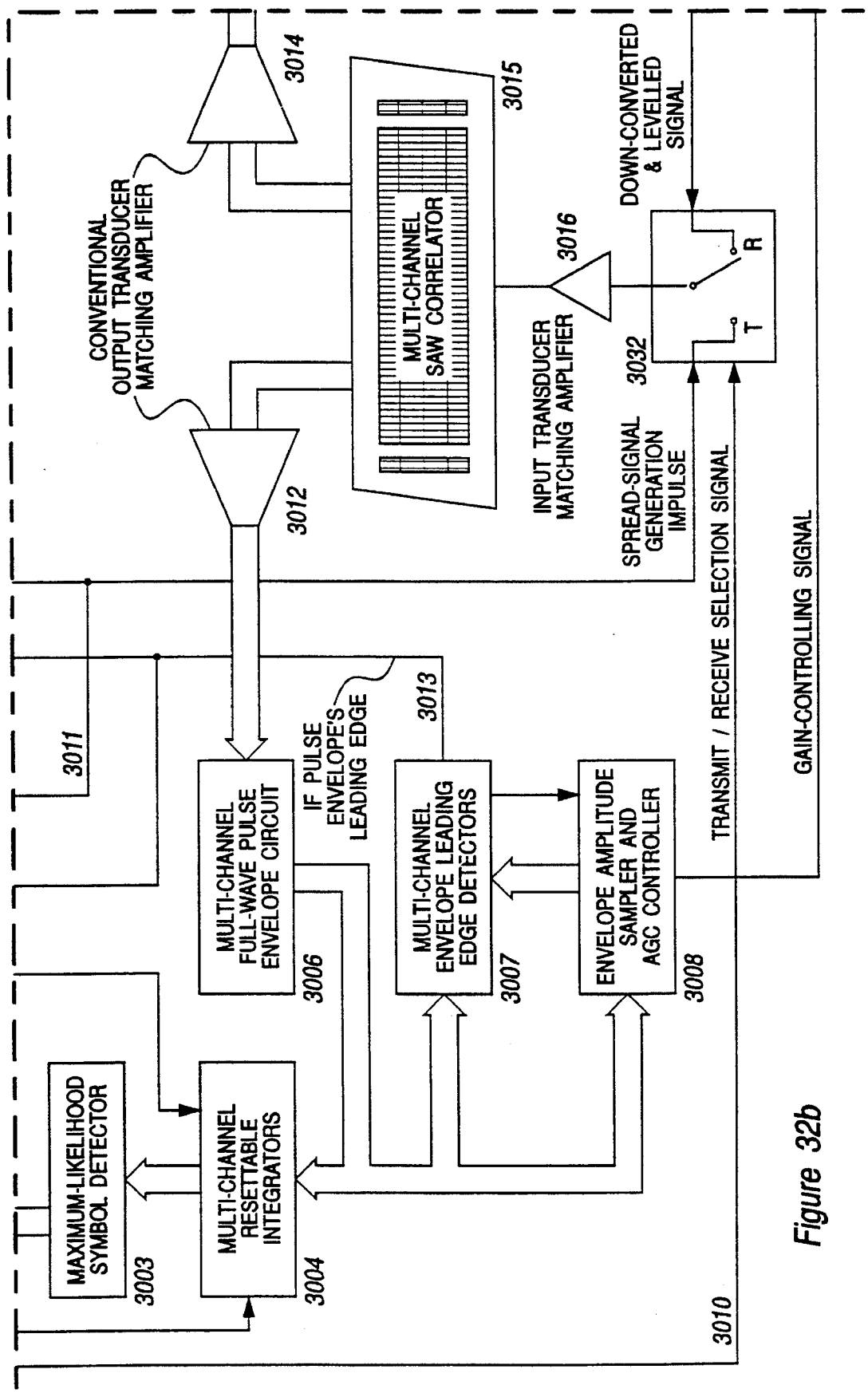
Figure 32D:
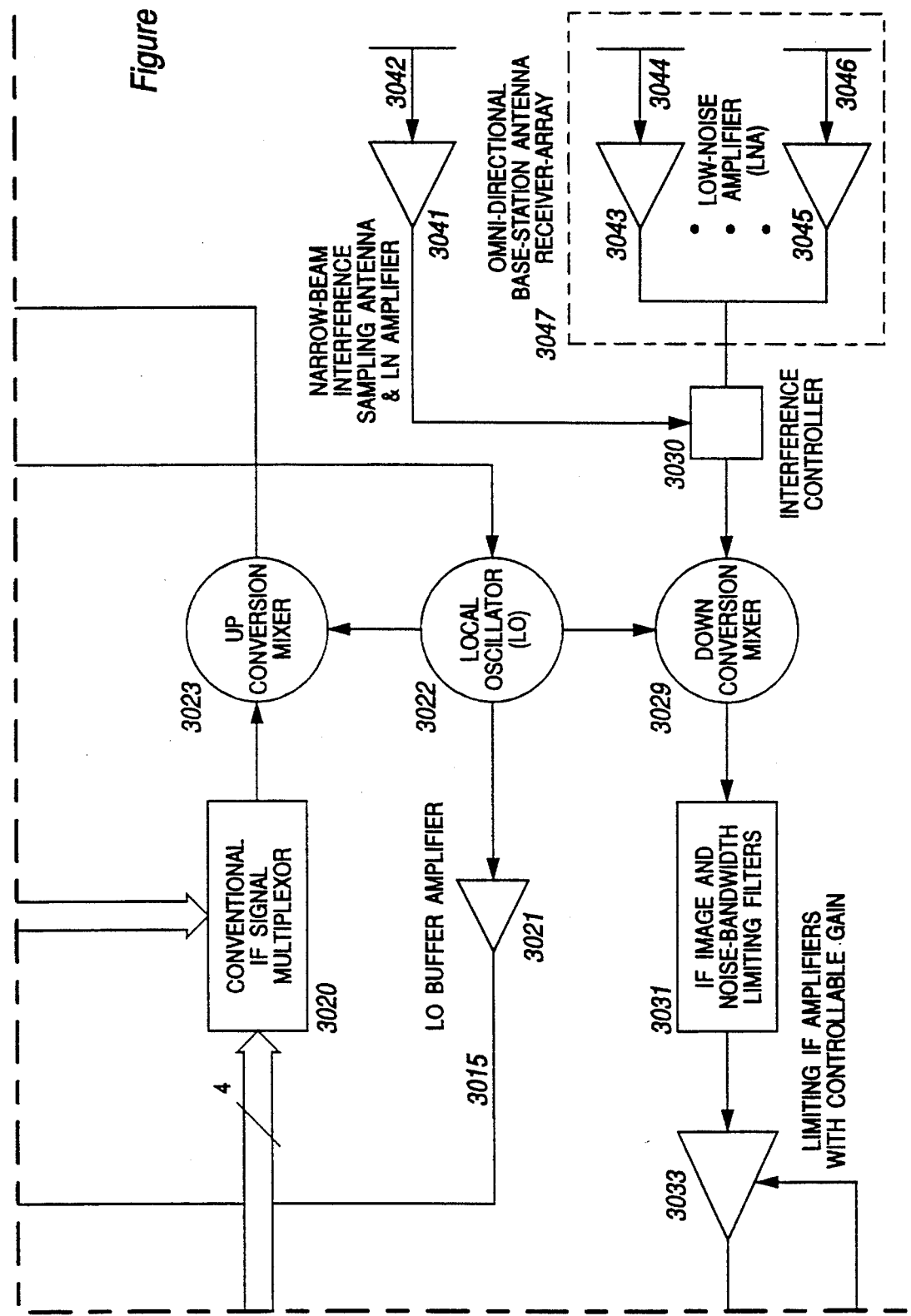

Referring now to FIG. 32, two elements determine the RF operating frequency of the transceiver; the IF center frequency of the SAW Correlator 301 5, and the local oscillator (LO) 3022 that translates the IF frequency to the operating RF frequency. In the preferred embodiment, both devices are implemented on quartz substrates to minimize the frequency changes with temperature. To produce an RF frequency of 915 MHz, the local oscillator 3022 could operate in either additive translation or subtractive translation. Subtractive translation would tend to compensate the drift in RF frequency caused by temperature changes since LO and SAW correlator frequencies would tend to follow each other with temperature. However, since both bandwidth and percentage bandwidth consideration force the correlator IF frequency to be in the region of 160 MHz, the compensation will in any case not be exact, and since the differences in price and performance of SAW resonators for 755 MHz versus 1175 MHZ are substantial, the additive translation is preferred.

In the base stations, the LO 3022 also serves as the base station's master oscillator for time keeping and ranging measurement, and is implemented as a voltage-tuned crystal oscillator (VCXO). A preferred method for rapidly synchronizing the timebase rates is described in connection with FIGS. 4 and 39.

Transmission of a data sequence pulse begins with the microprocessor 3001 in FIG. 32 a switching the send/receive switch 3032 to the transmit position, and allowing the sequence excitation pulse (via line 3011 ) from the clock generation and timing circuitry 3005 to reach the SAW cotrelator, via the input transducer matching amplifier 3016. The signal on line 3011 is also provided to the registers 3055 and circuitry 3056 (further discussed in connection with FIG. 39) to allow the receiver to measure the time that a signal is transmitted. This measuring may be used for system calibration with respect to the time and distance synchronization for precise ranging measurements.

From the output of the SAW correlator 3015, the four resulting low-level IF sequences at 152.5 MHz are amplified by a conventional amplifier 3014, and one of the four are selected for transmission by IF multiplexer 3020. The IF multiplexer 3020 is controlled by the microprocessor 3001, via the multiplexer bus 3019, selecting the correlator output channel that corresponds to the di-bit that the microprocessor is attempting to transmit via line 3011.

An up-conversion mixer 3023 translates the frequency of the signal to the desired RF frequency (915 MHz) where it is amplified by conventional power amplifiers 3037 ... 3039 to the required power level for radiation from the antenna array 3038 ... 3040. The equipment depicted in the block 3039' forms the active antenna transmission assembly.

Typical total amplifier power from the base station is preferably in the range of 50 to 200 watts, with the specific level determined by the link-budget requirements. The major determining element in the link budget is the level of co-channel interference experienced from other shared band user's base stations.

The design of the base station's transmit antenna has several aspects. Typical antennas for mobile base station applications at these frequencies utilize a regularly spaced vertical colinear array with an end feed. (The typical antenna, for example as used for cellular radio telephone, consists of many ¼-wave coaxial elements, with the inner and outer conductors exchanging connections at every ¼ wave transition, fed from a coaxial cable at the lower end.) The use of such an antenna in the preferred embodiment would display two significantly problematic characteristics.

Firstly, while such an antenna does have a azimuthally omnidirectional radiation pattern (when mounted with its axis vertical), with a narrow beam pattern in elevation (i.e. much like a flattened doughnut with the maximum gain in the direction of the horizon), this is only true for a narrow band signal in the steady state (i.e. for continuous carrier transmissions). In the transient case, however, the leading edge of the radiated pattern is quite different. For example, if the signal being fed to the antenna is a step modulated carrier (carrier turned on and off), then, since the signal is propagating from the feed end of the antenna almost as fast as the signal is being radiated from the excited elements, the radiated wavefront has a conical form, rather than the desired cylindrical one, with the wavefront rising at almost 45° from the horizontal.

The result of this wavefront distortion is that in the far-field the signal has a ramp-shaped leading edge, where the length of the ramp is approximately the length of the antenna. Since the length of the antenna required to produce the appropriate radiation pattern is significant (typically 10 to 20 feet at the 900 MHz frequencies used in the preferred embodiment), there is a significant reduction in the distance resolving ability of such a wavefront.

Secondly, the regular spacing of the elements of such an antenna, produces notches in the radiation pattern when the reflection from the earth is included in mobile applications. Such notches cause fluctuations in the signal level available to the mobile receiver as the mobile antenna moves radially from the base of the transmission antenna.

Because of these undesirable characteristics a different approach is taken in the antennas for the preferred embodiment.

The wavefront problem is dealt with by driving each one of the vertical dipole elements of the colinear array simultaneously (in phase), as shown in FIG. 32 in the block 3039'. An array of small power amplifiers 3037 through 3039 drive each of the dipole elements 3038 through 3040 respectively. The feedline from each amplifier feeding the dipoles is cut so that the signals reaching the dipoles are accurately in phase. The overall radiated power is the simply the sum of the power outputs of each of the amplifiers. Using a large number of smaller amplifiers provides a greater degree of system reliability compared to a single large amplifier, which would also be costly at the 900 MHz frequencies involved.

By suitably choosing the power level for each amplifier driving each the particular dipole element pair respectively, the aperture of the antenna can be tailored (shaped) to produce a radiation pattern with a single major lobe of the requisite shape. This aperture shaping technique is well know in the antenna design art.

The radial distance dependent fading due to ground reflection cancellation is controlled, and with good design can be nearly completely eliminated, by making the spacing of the dipole elements in the array irregular. A number of different variable -spacing strategies have been tried, which work with varying degrees of success. A preferred pattern varies the spacing of the elements according to the variation of the sine curve from 0° to 90° in accordance with a formulation $$x_i = S_{min} + a \cdot \sin[i \cdot \pi/(4(n-1))]$$

where $S_{min}$ is the minimum spacing, n is the number of elements, $x_i$ is the spacing of the (i)th element from the (i−1)th element and a is the maximum variation in spacing. By varying the values of $S_{min}$, a and n, an antenna system can be arrived at with very small signal level variations from the desired, smoothly varying path-loss with distance characteristics.

In the receive mode, a transmitted data sequence is collected and amplified by the base station receiver's active antenna assembly 3047, consisting of a dipole array 3044 . . . 3046 and a low-noise amplifier array 3043 . . . 3045.

As with the transmit antenna array, the receive antenna array uses an arrangement that minimizes the wavefront risetime to maximize the ranging resolution of the overall system. However, in this case each of the received signal dipole element pair feeds its own wide-dynamic range, low-noise-amplifier (LNA). Again the phase delay of the signal from each dipole pair is adjusted so that all the signals arrive at the outputs of their respective LNAs simultaneously, where they are added (combined) together, before further processing by the signal canceler 3030 and down-conversion mixer 3029.

The LNAs required here have specially high signal level handling requirements not normally found in other narrow-band, voice or data communication systems, that arise as a result of the wide input bandwidth of the receiver. While some of the signal in nearby bands can be removed by suitably shaping the bandpass characteristics of the LNAs, there are very powerful signals found in adjacent bands to the frequency band in which the preferred embodiment will operate. These bands are too close for effective filtering at the RF frequencies at the receiver input, and so the LNAs must be able to tolerate the signal levels without generating intermodulation products due to being driven into over-loaded operating conditions by these large signals. The front-end design used here deals with the overload problem in two different ways.

Firstly, the total input signal from the antenna array is processed a dipole pair at a time, i.e. the signal contributions from each of the element pairs is amplified before combining, so that each amplifier only has to deal with 1/N th of the signal level available from all N dipole pairs in the antenna array. Further, by suitably adjusting the gains of each of the LNAs, the receiving antenna's aperture can be shaped in the same way as that of the transmit antenna, for the same reasons of beam shaping, and the array's dipole element pairs can be irregularly spaced for the same reasons of radial distance pathloss variation smoothing.

Secondly, by using power field-effect transistors operating at high drain currents in the LNAs instead of the usual low-signal level devices, LNAs with low noise figure, but very high intermodulation intercept performance can be built. Such LNAs are capable of successfully operating across the wide signal level variations encountered in the application environment of the preferred embodiment of this invention.

As an alternative, the receive and transmit antenna as shown in FIG. 32 may be implemented in accordance with conventional cellular radio telephone antenna structures.

Since the signal collected by the receiving antenna array may contain significant interference signals from other users of the operating band, a phase reversal signal canceler consisting of narrow-beam sampling antenna 3042, an optional amplifier 3041 and an interference canceler 3030 are used to remove the interfering signals. This illustrated implementation can also be used to remove the interference caused by out-of-band interference, such as cellular mobile radio and 930 MHz band paging signals. The remaining signal is down-converted to the correlator's IF frequency by the same LC) frequency in a down-conversion mixer 3029 (cancelers will be discussed further in connection with FIGS. 41 and 42).

The received signal is then filtered by IF image and noise-bandwidth limiting filters 3031, and then amplified by a controlled gain amplifier 3033 with output limiting. The output limiting protects the SAW device from being over-driven by a large receive signal in the case when the initial IF gain is high. The function of the controlled gain is to "level" the height of the leading edge of the delay envelope that will (eventually) appear at the output of the envelope detector 3007.

For reception, the microprocessor 3002 will have switched the transmit/receiver switch 3032 to the receive position, allowing the amplified signal to be applied to the series connected input transducers via the matching amplifiers 3016 of the multi-channel SAW correlator 3015.

After being coupled through a conventional output transducer-matching amplifier 3012, the outputs of the four correlator channels are processed by a multichannel full-wave pulse envelope circuit 3006, a multichannel envelope leading edge detector circuit 3007, and an envelope amplitude sampler and AGC controller 3008. The detection of the leading edge of the delay envelope is an important part of the present invention. It provides an arrival-time estimate of the earliest arriving data-symbol radio-ranging pulse, while simultaneously facilitating the detection of the particular data symbol in the ranging pulse. The detector finds the particular symbol by comparing the integrated energy envelopes from each of the set of code sequence envelope detectors with each other.

The multichannel full-wave pulse envelope circuit 3006 is used to generate the signal illustrated in the timing diagram of FIG. 21d and to provide the resettable integrators (integrate-and-dump circuit) 3004 and maximum-likelihood symbol detectors 3003 with the necessary information to determine the particular data symbol transmitted in the pulse. Although the resettable integrators 3004 are time-controlled by the clock generation and timing circuitry 3005, the microprocessor 3001 controls the integration period via line 3089 to the clock generation and timing circuitry 3005. A data bit register 3002, which is also time-controlled by the clock generation and timing circuitry 3005, is used to store the received data symbol until retrieved by the microprocessor 3001.

The multichannel envelope leading edge detector circuit 3007 is used to detect the arrival of the leading edge of the data symbol in order to start the AGC controller's adjustment to the appropriate gain level. At the beginning of each received data message, the AGC is set for maximum gain. When the leading edge of the first preamble is detected, the gain is immediately reduced.

Upon its detection of the leading edge of a data symbol, the multichannel envelope leading edge detector circuit 3007 generates a signal 3013, which is received by the clock generation and timing circuitry 3005 and by the registers 3055 and circuitry 3056 for determining when the data symbol/ranging pulse has been received.

The envelope amplitude sampler and AGC controller 3008 is the interface circuitry that is used to level the pulse amplitude, via control of the gain of the IF amplifier 3033. The detection of the crossing instant of the leading edge of the envelope is preferably performed at its 50% level, because the slope of the leading edge is typically highest at that point. The envelope amplitude sampler and AGC controller 3008 is implemented in the form of a microprocessor, as described in connection with FIG. 36.

In addition to the transceiver functions discussed above, the base station also performs the functions of timebase maintenance, landline data communication with the control center, base station event scheduling and signal arrival time measurement.

The landline communications (which can be implemented, e.g., using leased landlines, microwave link or fiber-optic link) are handled via a separate data microprocessor 3052, which is connected to a variable number of high-speed data modems 3053, 3054. The number of modems depends on the kind of landline facilities and the maximum message traffic volume expected on the system in the base station's region. As traffic volume builds during the life of the system, or as landline facilities are changed, data modems can be added to, or removed from, the base station.

The landline communication microprocessor 3052 also communicates with the base station's event scheduling, transmission control and local time-measurement-processing microprocessor 3051. Via a high-speed parallel data bus 3050, the microprocessor 3051 directly communicates with the time measuring system regulation circuitry 3056, which controls a high-speed read-on-the-fly (ROTF) timing register set 3055. Whenever a leading-edge signal strobes a time measurement into the ROTF register, the microprocessor 3056 reads the count before it is lost at the next leading-edge strobe. It also measures the local base station's time offset from the system cycle's master synch pulse measured at the beginning of each new system cycle, and corrects each ranging time measurement by that amount before transmitting the results to the control center.

The microprocessor 3051 also exchanges base station control information with the transceiver control microcomputer 3001. Data to be transmitted in the next time-slot is downloaded into the microcomputer 3001, which then controls the transmission via the clock generation and timing circuitry 3005, the transmit/receive switch 3032 and the RF multiplexer 3020.

On reception, the data symbols formed by the data combiner (comprising blocks 3002, 3003 and 3004) are assembled into a complete message by microprocessor 3001, which at the end of each timeslot, uploads the result to the microprocessor 3051 for eventual transmission to the control center.

The time measuring system regulation circuitry 3056 is used to provide a frequency adjust signal to the LO 3022. The clock recovery circuit 3005 is preferably driven by the LO 3022, via a buffer amplifier 3021. The frequency correction signal is adjusted at the beginning of each system cycle, to maintain frequency dependence on the master clock at the master base station.

The clock recovery circuit 3005 provides a high speed clock which is used for the clock generation and timing circuitry 3005, the registers 3055 and the time measuring system regulation circuitry 3056. The high speed clock is used by the clock generation and timing circuitry 3005 to provide a read data-strobe signal to the microprocessor 3001 for indicating that di-bits are available. Registers 3055 provide a strobe to the time measuring system regulation circuitry 3056 for indicating that count data is available.

Data Symbol Detection

Figure 33:
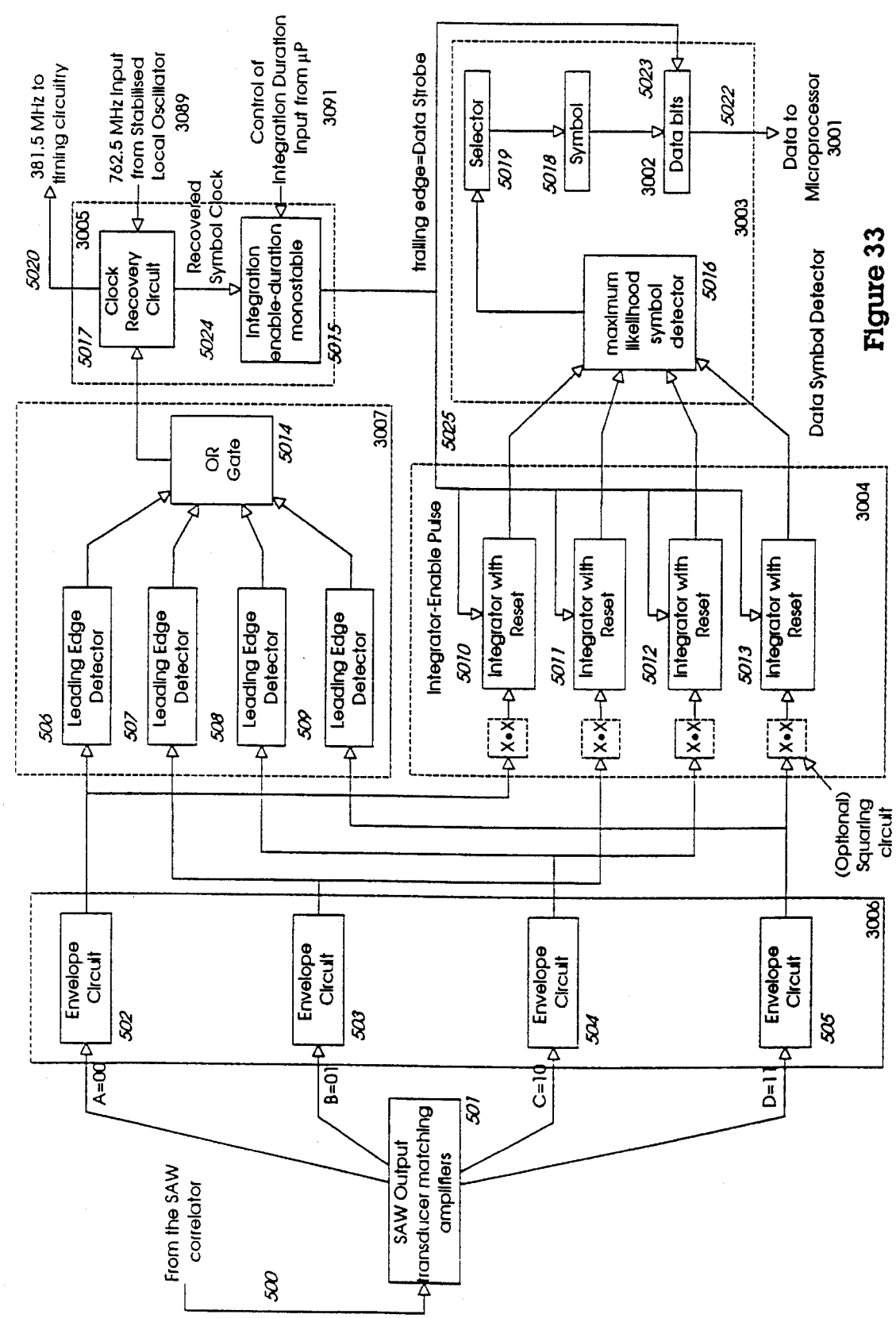
FIG. 33 is a more detailed block diagram of portions of FIG. 32 illustrating a preferred implementation for detecting data symbols received by the base station transceiver.

Referring now to FIG. 33, the data symbol detection circuitry is shown in more detail. From the output transducer 3012, respective envelope circuits within block 3006 simultaneously form the envelopes by full-wave rectification and smoothing of the correlated IF output signals. Thus, the output of each envelope circuit is as shown in FIG. 21*d*.

One of the four leading edge detectors within block 3007 (one for each channel) determines the 50% level crossing instants of the respective envelope circuit output to mark the arrival instant of the pulse. Since any one of the correlator channels may produce an output, the logical OR gate 5014 of the leading edge detectors 3007 is used to trigger the clock recovery circuitry 5017 at the first edge.

The envelopes are individually integrated to make maximum use of the redundant energy contained in the multipath signals. Each signal is integrated for the same variable length of time by the respective resettable integrators within block 3004. These integrators effectively accumulate the energy available in each envelope. Preferably, this energy is accumulated using a squaring circuit before the actual integration to emphasize the presence, or absence, of the received signal. At the end of the integration delay, the maximum likelihood detector 3003 compares all the integrator outputs with each other. The largest integrator output is determined by the selector gate 5019 indicating the symbol that was the most likely to have been transmitted. The data bits representing the symbol formed by 5018 are strobed by the trailing edge of a monostable multivibrator 5015 and are strobed, via a monostable multivibrator 5015, into a bit register 3002 for subsequent retrieval by the microprocessor 3001.

Figure 35:
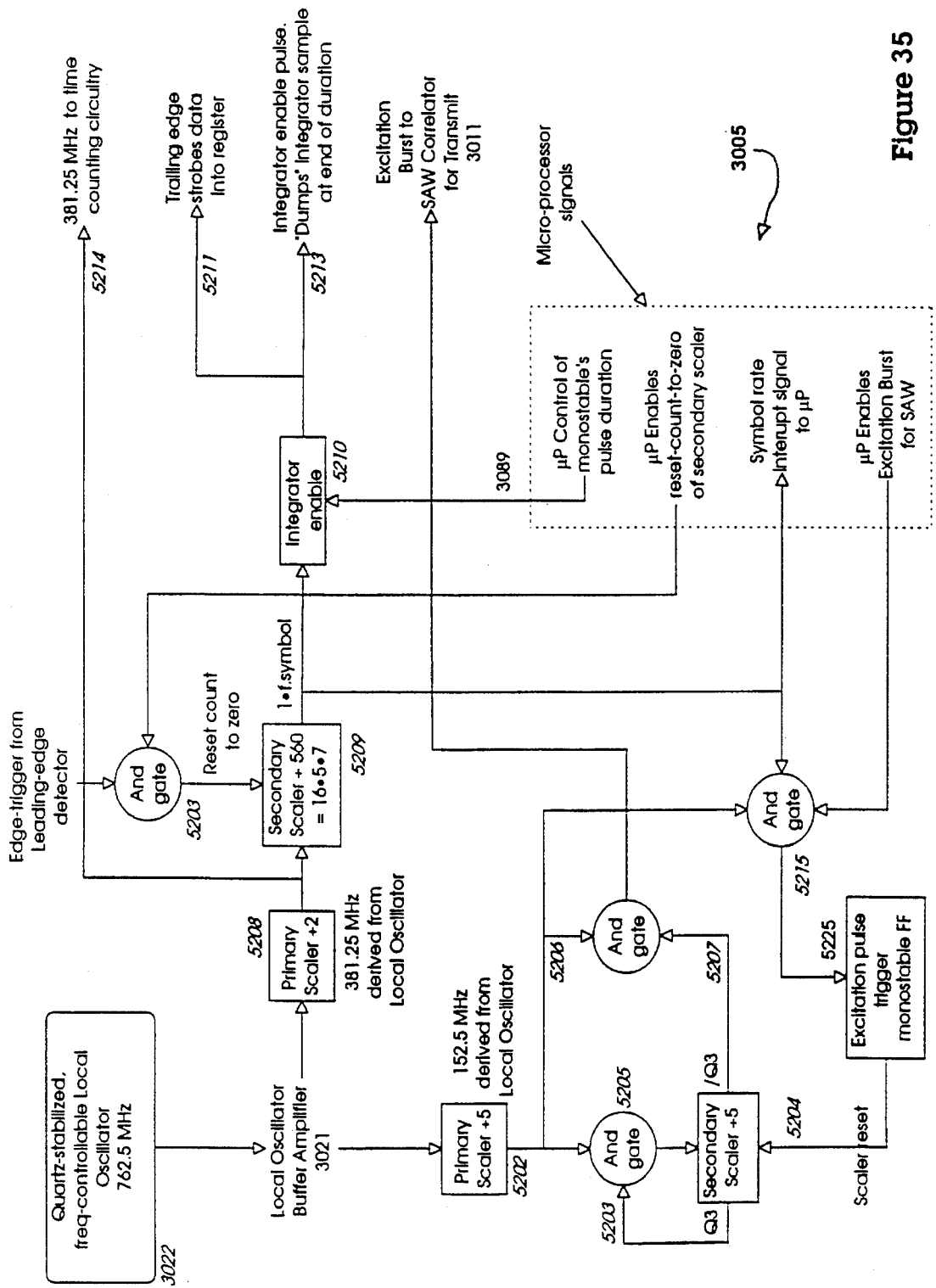
FIG. 35 is a more detailed block diagram of the clock recovery circuit shown in FIG. 32.

The clock generation and timing circuitry 3005 is illustrated in FIG. 33 as including a clock recovery circuit 5017, which is further illustrated in FIG. 35, and monostable multivibrator 5015. The clock recovery circuit 5017 controls the monostable multivibrator 5015, so that the received di-bits are properly received by the microprocessor 3001 (FIG. 32*a*) and the integration period is properly limited.

Envelope Formation

Figure 34:
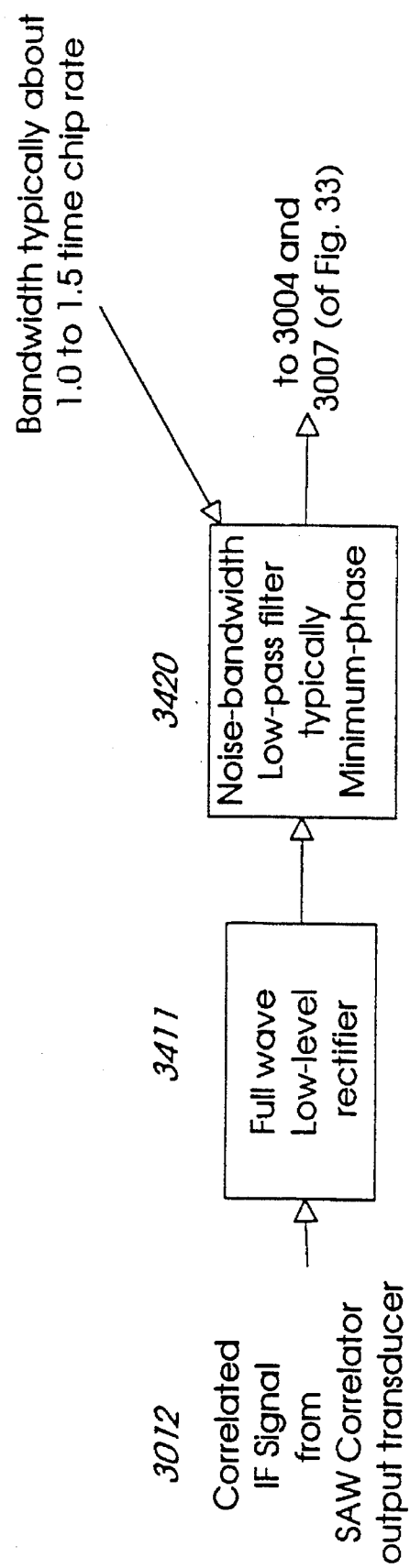
FIG. 34 is a more detailed block diagram of the envelope circuit of FIG. 33.

FIG. 34 illustrates a preferred embodiment for each of the four envelope circuits of block 3006 of FIG. 33. From the output of the SAW output transducer 3012 (FIGS. 32*b* and 33), the correlated IF signal is processed through a conventional full-wave rectifier 3410, from which the envelope is formed at the output of a low pass filter 3420. The low pass filter 3420 may be implemented using a minimal-phase (Gaussian) characteristic with a pass band of 1.0 to 1.5 times the chip rate. The output of each filter 3420 is passed to blocks 3004 and 3007, as previously discussed.

Clock Recovery Circuitry

In FIG. 35, the clock generation and timing circuitry 3005 (FIGS. 32 and 33) is shown in expanded form. The clock generation and timing circuitry 3005 has three outputs, which serve to: (i) enable the integrators 3004 (FIG. 33) to accumulate the energy for the detection of a new data symbol; (ii) the trailing edge of the integrator enable signal strobes the detected data bits into the data bit register 3002 (FIG. 33), (iii) generate the excitation burst for exciting the SAW correlator to generate the spread-sequences, and (iv) provide the scaled LO clock for the time measuring circuitry 3055. The clock generation and timing circuitry 3005 performs these functions in response to the buffered LO signal, via amplifier 3021, and the leading edge trigger from the leading edge detector 3007.

Its operation is further affected by (1) a pulse-width duration input from the microprocessor 3001 (FIG. 32) to control the integration interval, (2) an enable signal which allows the edge trigger signal which allows the secondary scaler 5209 to zero to synchronize the integrator interval with the data symbol, and (3) an enable signal which allows an excitation pulse to be generated for transmitting a symbol. The microprocessor 3001 receives an interrupt from the circuitry synchronous with the symbol rate.

The 762.5 MHz. input from the LO is divided by primary scaler 5208 to yield the 381.25 MHz. local timing clock. This rate is further divided by 560 in the secondary scaler to yield the symbol rate, which drives the integrator-enable monostable as described above.

The buffered LO signal is also divided by 5 by another primary scaler to yield the 152.5 MHz. IF needed for the SAW correlator excitation pulse. AND gates 5205 and 5206 combined with the secondary scaler 5204 gate the 152.5 MHz. signal for the duration of an excitation burst whenever the secondary scaler is reset by a trigger pulse from the trigger monostable 5225. This monostable is synchronously triggered by the symbol rate signal whenever enabled from the microprocessor 3001.

Data-Pulse Amplitude Leveling

Figure 36:
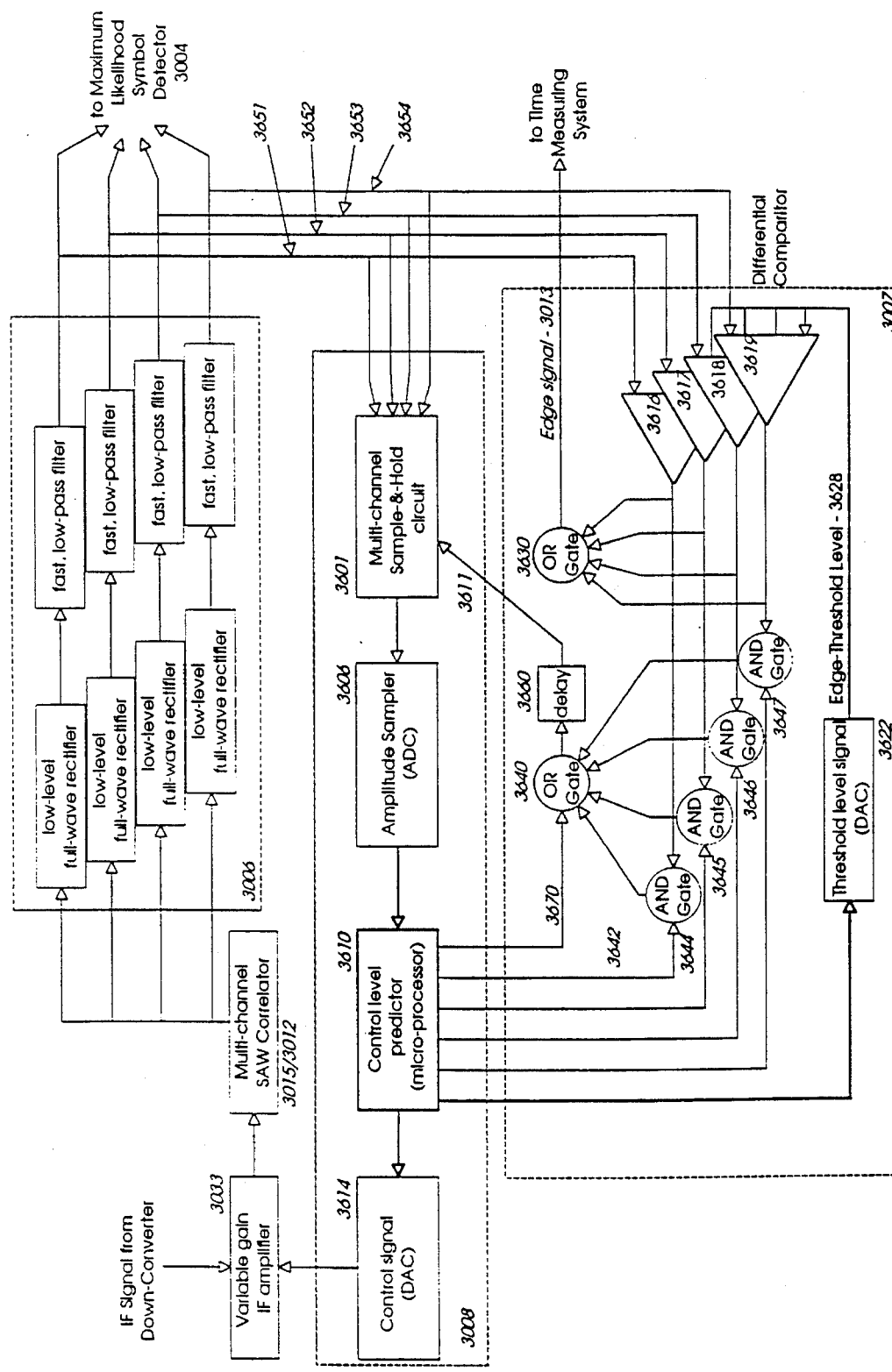
FIG. 36 is a more detailed block diagram of data-pulse signal leveling, edge detecting and envelope processing circuitry, comprising the signal flow and circuitry in the lower left of FIG. 32.

Referring now to FIG. 36, the control loop encircling the send/receive switch 3032 of FIG. 32 is illustrated in expanded form. More specifically, the circuitry associated with the control of the gain of limiting IF amplifiers 3033 is illustrated with particular focus on the leading edge detector circuit 3007 and the envelope amplitude sampler and AGC control circuitry 3008.

In order to measure consistent arrival time instants on the leading edge of the decorrelated pulse, the threshold crossing circuitry requires a consistent signal amplitude or a threshold level adjusted to the appropriate percentage level of the leading edge amplitude. In the preferred embodiment, the amplitude is adjusted to a target level by varying the gain of the IF amplifier 3033. Since the signal whose amplitude must be controlled is dynamic (or transient) and, because of the processing gain of the SAW correlator, only available after correlation, the pulse's amplitude is sampled after the correlator. In block 3008, the amplitude of the envelope from each correlator channel is sampled simultaneously by a multichannel sample-and-hold circuit (S & H) 3601, and then converted to a digital value, via analog to digital converter (ADC) 3606, for further control action.

The amplitude of the pulse is adjusted from one pulse to the next by a control level predicting microprocessor 3610 (internal to block 3008), which sets the IF gain of amplifier 3033 via a digital-to-analog convertor 3614, in accordance with gain tables contained in its control program. Good values can be obtained by the processor "learning" from the results of its prior control action.

The strategy of the leveling circuit is to operate with maximum gain until a signal is acquired, which will provide an initial edge to trigger the S & H circuit. Thereafter, the circuit can refine the leveling by "hunting" in time around successive envelope peaks in the message via the control line 3670 and selection lines 3644 through 3647. Typically, the level is sufficiently refined during the message preamble pulses so that by the arrival of the first message bit, the timing measurement will have minimum amplitude adjustment induced timing variances.

In block 3007, each of the outputs from the correlator channels is coupled to one of four respective differential comparators 3616–3619, respectively. Each differential comparator compares the signal level of the correlator output to a common edge-threshold level which is set by the microprocessor 3610, via a digital-to-analog converter (DAC) 3622. While the leveling process performed by the circuit discussed above attempts to standardize the level of signals 3651 through 3654 for edge detection, this will not always be possible. For example, at the extremes of communication range there may not be sufficient gain to accommodate the leveling, or the noise level may be so high (due to the higher gain setting) that the 50% threshold level may be inappropriate. Therefore the control level predictor 3610 may also adjusts the comparison level 3628 via the threshold DAC 3622. This flexibility allows the predictor 3610 to set the most appropriate level 3628 based on the examination of the envelope shape of signals 3651 through 3654 determined by the amplitude sampler 3606 via 3601.

An OR gate 3630 is used to provide an edge detection signal 3013, as shown in FIG. 32, for the previously discussed time measuring circuitry. The inputs of the OR gate 3630 include the outputs from each of the differential comparators 3616–3619. Thus, the OR gate 3630 output is "true" (or high) when any channel carrying the di-bit whose amplitude exceeds the threshold set by the DAC 3622, since the remaining channels will be carrying only a lower level noise, as depicted in FIGS. 24–26.

An OR gate 3640 is used to provide an edge detection signal 3611 in response to time control provided by the microprocessor 3610 via selection lines 3644 through 3647, or via the independent sampling line 3670. The selection signals carried on lines 3644 through 3647 are, therefore, ANDed with the outputs from the differential comparators 3616–3619 at AND gates 3644–3647. Thus, the output of OR gate 3640 is "true" (or high) only when any of the edge detection signals 3611 is present and the selection by the microprocessor 3610 is enabled, or the microprocessor sampling pulse 3670 is present. Thus, sampling of any one channel (e.g., preamble codes only) or independent sampling of the envelope by the microprocessor is possible.

Maximum-likelihood Symbol Detection

Figure 37:
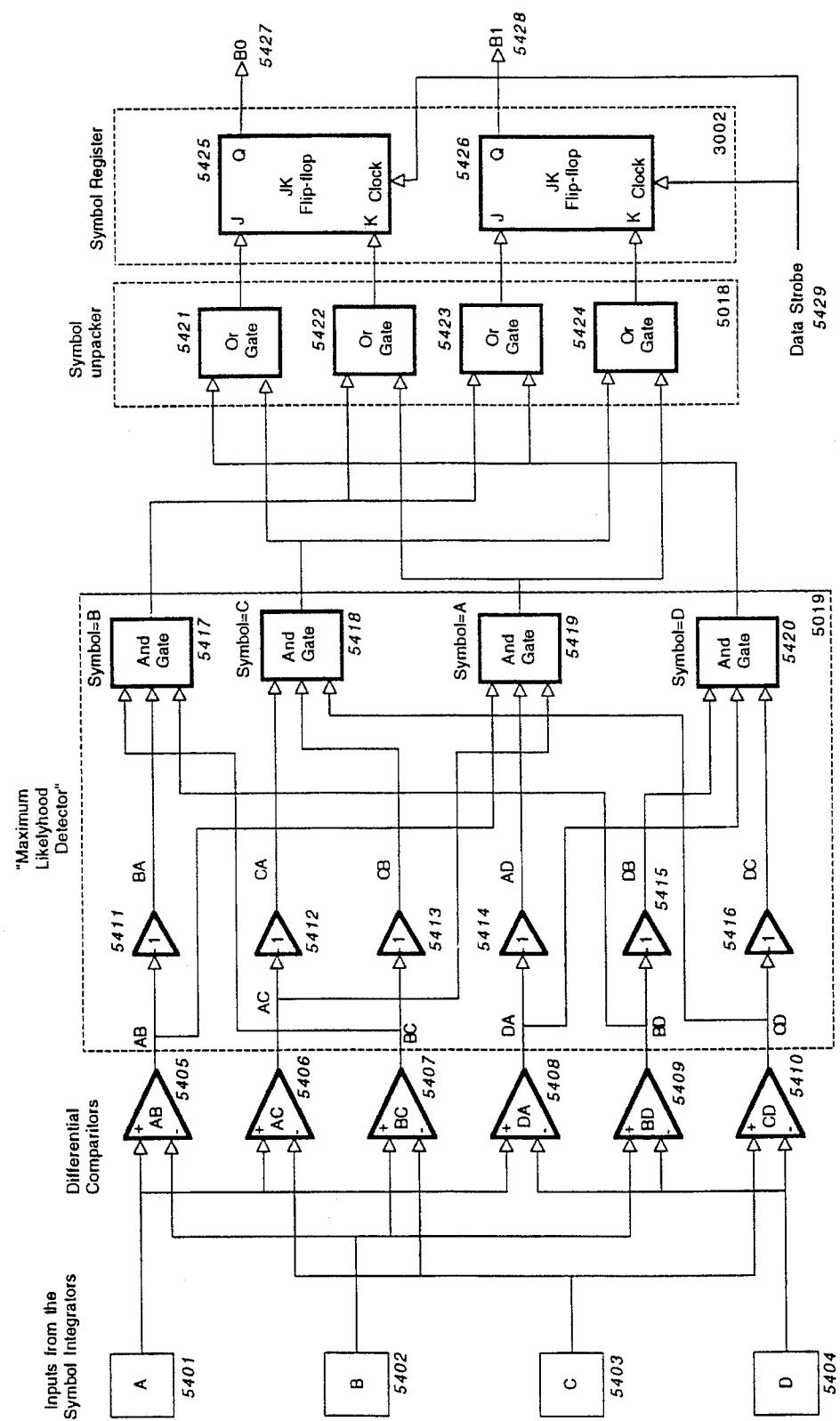
FIG. 37 is a more detailed block diagram of the maximum likelihood detector of FIG. 33.

FIG. 37 illustrates the maximum likelihood detector 3003 of FIG. 32b in expanded form. The circuit of FIG. 37 compares the level of each integrated envelope signal 5401, 5402, 5403 and 5404 (from the integrators 3004 of FIG. 32b) against each other using a set of six comparators 5405 through 5410. Inversion and gating circuits 5411 through 5420 form a single output from the gates identifying which of the four correlation channels most likely carries the transmitted symbol for the instant symbol time. This follows since the signal level of the transmitted symbol is much greater than the noise level carried on the remaining channels. Thus, only one of the outputs of the AND gates 5417, 5418, 5419 and 5420 will be true so as to indicate the channel carrying the symbol. The OR gates 5421 through 5424 form the corresponding bit pattern to be strobed into the symbol bit registers 5425 and 5426 (of block 3002 of FIG. 32a), from which the microprocessor 3001 (FIG. 32a) builds the data message.

Comparing each signal against the other in this manner provides a variable threshold for comparison that effectively accounts for variations in noise level variations as the gain of the IF amplifier is adjusted to level the correlated signal.

Read-On-The-Fly Counting Register and Timebase Correction

An important function of the base station transceiver is to measure the arrival time of every data symbol pulse. These pulses, in the preferred embodiment, will be arriving 7.344 microseconds apart, while the timing counter is counting a timing frequency of 381.25 MHz.

The present invention provides a method for estimating the arrival time of radio ranging signals with high levels of resolution and accuracy. This is accomplished by using the timing redundancy available in the data-symbol stream. In the system of FIG. 1a, every message transmitted consists of multiple individual data symbols, with each symbol pulse capable of conveying the same ranging (time) information.

The time-spacing of the individual data symbols in a message are made very precise, allowing the estimate of the arrival time of the first pulse in a message to be improved by deducting the average error in the estimated arrival times of the other pulses in the multi-symbol message-symbol-burst from the estimated arrival time of the first pulse.

The leading edge of the decorrelated ranging pulse is perturbed by a number of contributing causes, which lead to jitter (i.e., time uncertainty) in the measurement of the arrival time of a number of pulses transmitted under (apparently) identical conditions. The jitter reduces the resolution of the time-of-arrival estimate of the pulses. However, due to the fact that most of the contributions to the jitter are randomly related variables, it is possible to markedly improve the estimate by making more than one measurement and then averaging the result as shown below.

The timing resolution of a system is determined by a number of inter-related factors. In the preferred embodiment of this system, the major contributions to diminishing the timing resolution are the IF carrier uncertainty, the timebase counter count uncertainty, the threshold detector jitter and the rising edge slope jitter introduced by the receiver output signal-to-noise ratio.

The values described below typify an application for the system of FIG. 1a. Since the IF carrier frequency of the correlators is 152.5 MHz, there is a maximum decorrelated impulse-envelope uncertainty due to the carrier of ±1 carrier cycle or ±6.5 nanoseconds per measurement.

The counter system uncertainty is also ± one clock count, which at 381.25 MHz count timebase would add 2.6 ns. The jitter in the threshold sensor depends on the design, and can be held to the order of 2.5 ns in a typical system. The jitter due to receiver noise is given by:

$$jitter = 1/[BW * \sqrt{(2 * S/N)}]$$

With a 26 MHz bandwidth (BW) and an output signal-to-noise ratio of 10 dB, the jitter is about 8.6 nanoseconds and with a 20 dB signal-to-noise ratio, the jitter is about 2.7 ns.

Since each of these factors is a random process (except possibly "carrier beats;" i.e., the instantaneous carrier frequency being very close to an integral multiple of the symbol frequency), they are subject to the same improvements available from "measurement averaging." Because of the random noise-like nature of the contributions, the statistical variations typically improve as the square-root of the number of estimates taken. In a preferred embodiment, measurements are made of the arrival times of between 25 and 90 pulses in a message burst. As a result, the timing resolution is improved by a factor of between 5 and 10. For example, if the mean error caused by the above factors is 45 nanoseconds for a single measurement, then the resolution of the ensemble measurement is not worse than 9 nanoseconds.

The pulses in a message stream are all preferably transmitted with the same spacing between each pulse. This is a desirable feature, because making the spacing between each pulse exactly equal to the duration of one complete encoding sequence allows the decorrelated signal to follow the predicted autocorrelation gain for repeated pulses (typical of the preamble in a message) and to realize the cross-correlation and partial correlation gains with strings of different sequences. This is because the correlation function of maximal length sequence is only equal to [N] at zero shift and [−1] at every other shift for a repeating sequence.

Figure 40:
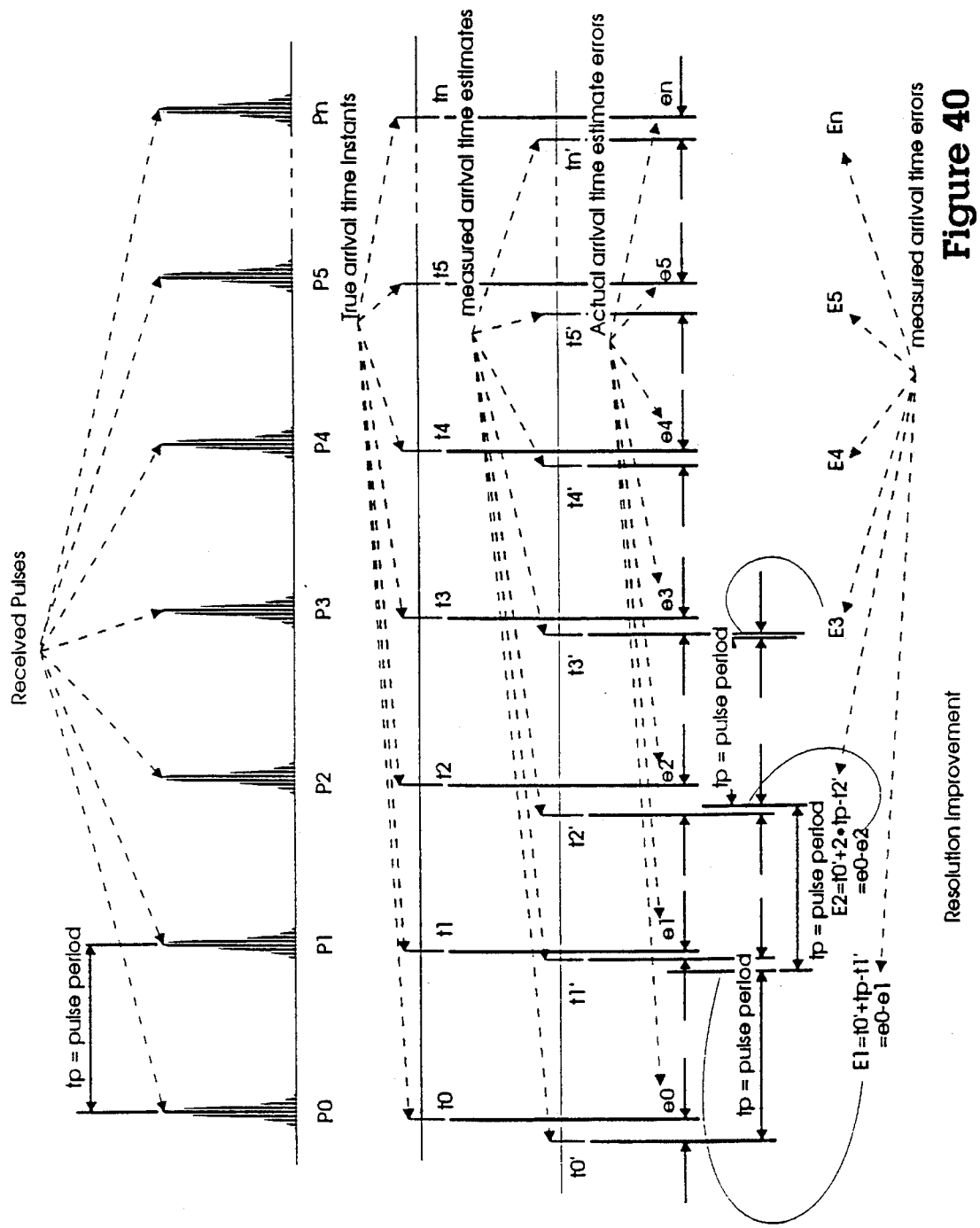
FIG. 40 is a preferred algorithm which may be used to implement the signal processing depicted by the circuitry shown in FIG. 39.

The following mathematical description, in conjunction with FIG. 40, conveys this principle. This averaging can easily be accomplished by causing the pulses in the message to be transmitted with an accurately known interval between the beginning of each pulse, say $t_p$. As shown in FIG. 40, if $t_0{'}$ is the estimate of the arrival time of the first pulse, $t_1{'}$ is the estimate of the arrival time of the second pulse, etc. . . . up to $t_n{'}$, the estimate for the (n+1)th pulse in a pulse burst. Then the error correction for the estimate of the first arrival time can be found as follows:

a first-error estimate is $e_1 = t_0{'} + t_p - t_1{'}$, a second-error estimate is $e_2 = t_0{'} + 2 \cdot t_p - t_p{'}$, etc. . . . till the nth-error estimate is $e_n = t_0{'} + n \cdot t_p - t_n{'}$.

The average error estimate is then the average of these error estimates, i.e., $$e_{ave} = (e_1 + e_2 + \ldots + e_n)/n$$

The improved estimate of the arrival time is then:

$$t_{improved} = t_0{''} = t_0{'} - e_{ave}.$$

A preferred implementation of this improvement strategy in the transceiver is able to accurately measure the arrival time of each of the pulses in a message. One mechanism for doing this is to use a counting register that is capable of being read while it continues to count, sometimes call a read-on-the-fly (ROTF) counter. Since the timing resolution of the counter in the preferred embodiment is one count of the transceivers master clock, which runs at 381.5 MHz, and the time between datasymbol, or ranging pulses is preferably 7.344 microseconds, this would require a binary counter with at least 15 stages, with the fastest stage toggling about every 2.579 nanoseconds. While ripple counters counting at 400 MHz are quite common, gates capable of propagating a carry signal through 15 stages for a parallel counter with a total delay of less than 2.5 nanoseconds are esoteric. To overcome the need to build a parallel counter system with such great speed requirements, an alternative approach, which uses simple ripple counters is adopted.

Ripple counters have the virtue that each succeeding stage is toggled at half the rate of the previous stage, and so within a few stages, the logic form required for the very high speed end are no longer required. However, changes of state between one count and another "ripple" through the counter, and if slower logic stages or many stages are involved, the total time for the state change to ripple through the counter may easily amount to a few counts at the high speed end of the counter. Therefore such a counter cannot ordinarily be read while counting, since a snap-shot look at the counter contents in mid "ripple" will contain significant counting errors. However, in the preferred embodiment, the interval between views of the counter are infrequent in comparison to the count rate, allowing us to take advantage of the ripple counter, and read it on the fly.

Figure 39:
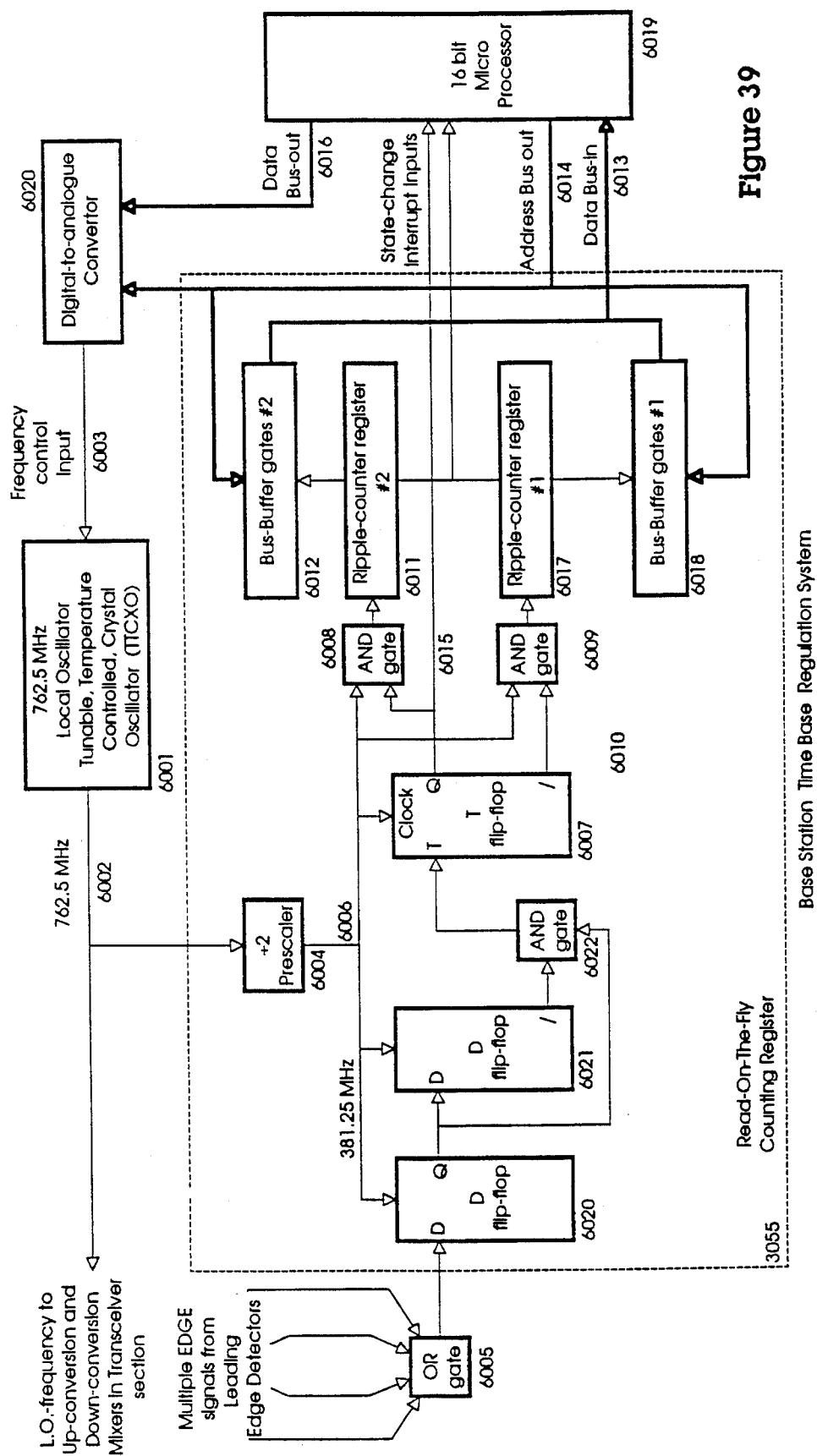
FIG. 39 is a more detailed block diagram of the time measuring and read-on-the-fly circuitry of FIG. 32.

FIG. 39 shows a block diagram of such an implementation, with the counting register 3055 and the time measuring system regulation circuitry 3056 shown in expanded form. The aforesaid ripple counter is shown as two alternate counting registers 6017 and 6011, with each counting register being a typical ripple counter made up of a few fast counting flip-flops at the high frequency end, and, at the lower frequency end, slower counting flip-flops.

As in other parts of the system, a tunable, temperature-controlled crystal oscillator (6001) operating at 762.5 MHz serves as the local oscillator for the transceiver's transmitter and receiver, and as proposed here, also serves as the master oscillator for the time measuring system. The master oscillator output is divided down by 2 by the prescaler 6004 to provide a counting rate of 381.25 MHz, and give a count resolution of 2.56 nanoseconds on line 6006.

Assume for the moment that the initial state of T flip-flop is cleared (/Q high). (It does not matter what the state is while the system is running, since the two counting registers 6011 and 6017 are symmetrical). Under these conditions ripple counter #1 counts the scaled clock pulses on line 6006.

An edge synchronizer consisting of D flip-flops 6020 and 6021 and AND gate 6022 produces a single toggling input to the T flip-flop (FF) 6007, so that at every positive edge transition from the OR gate 6005 (which occurs each time a new delay-envelope edge is detected), the T flip-flop 6007 toggles. When the state of /Q of the T flip-flop 6007 is low, AND gate 6009 inhibits further counting by register #1. Further, with q of the T flip-flop being high, counting proceeds in ripple counter register #2 (6011) which now continues to count the scaled clock pulses on line 6006. The state change of the T flip-flop 6007 is detected by the state change detecting interrupt input of the microprocessor 6019, which then reads the contents of counting register #1 via the buffer gate #1 (6018) after a short delay to allow the counter to settle to a stable condition.

Since the state change of the T flip-flop 6007 occurs synchronously with the clock signal 6006, no counts are lost between the two registers #1 and #2 (6011 and 6017). Provided that each of the counting registers count range is sufficiently larger than the number of counts that could be accumulated between data-symbol pulses, overflow of any one register is insignificant to these counting results, which only require the difference in counts between any two envelope-edges, i.e.,between toggles of the T flip-flop. The overflows are noted by an interrupt input on the microprocessor in order to keep track of larger parcels of time, such as the repeat transmission delay that occurs when a base station acts to repeat the master timing signal transmitted at the beginning of each system cycle.

Note also that clearing of any particular register is not necessary, since the previous count, i.e., the starting count, for each register is known by the microprocessor from the previous reading of the register.

Thus, by taking into account the expected interval between readings, very simple and inexpensive circuitry performs very high resolution counting and timing functions.

Signal Cancellation

Signal canceling becomes an important part of the system of FIG. 1a when there are third-party base stations which are transmitting signals that interfere with the reception of the transponder signals. The preferred band for this system is a shared band, and co-channel interference is an expected obstacle to be handled. Of the various types of interferences which may be present, the interference from other systems' base stations is the most troublesome. To overcome this dilemma, however, the present invention employs phase-reversal signal cancelers which effectively deal with both co-channel interference as well as most of the nearby out-of-band interference.

Figure 41:
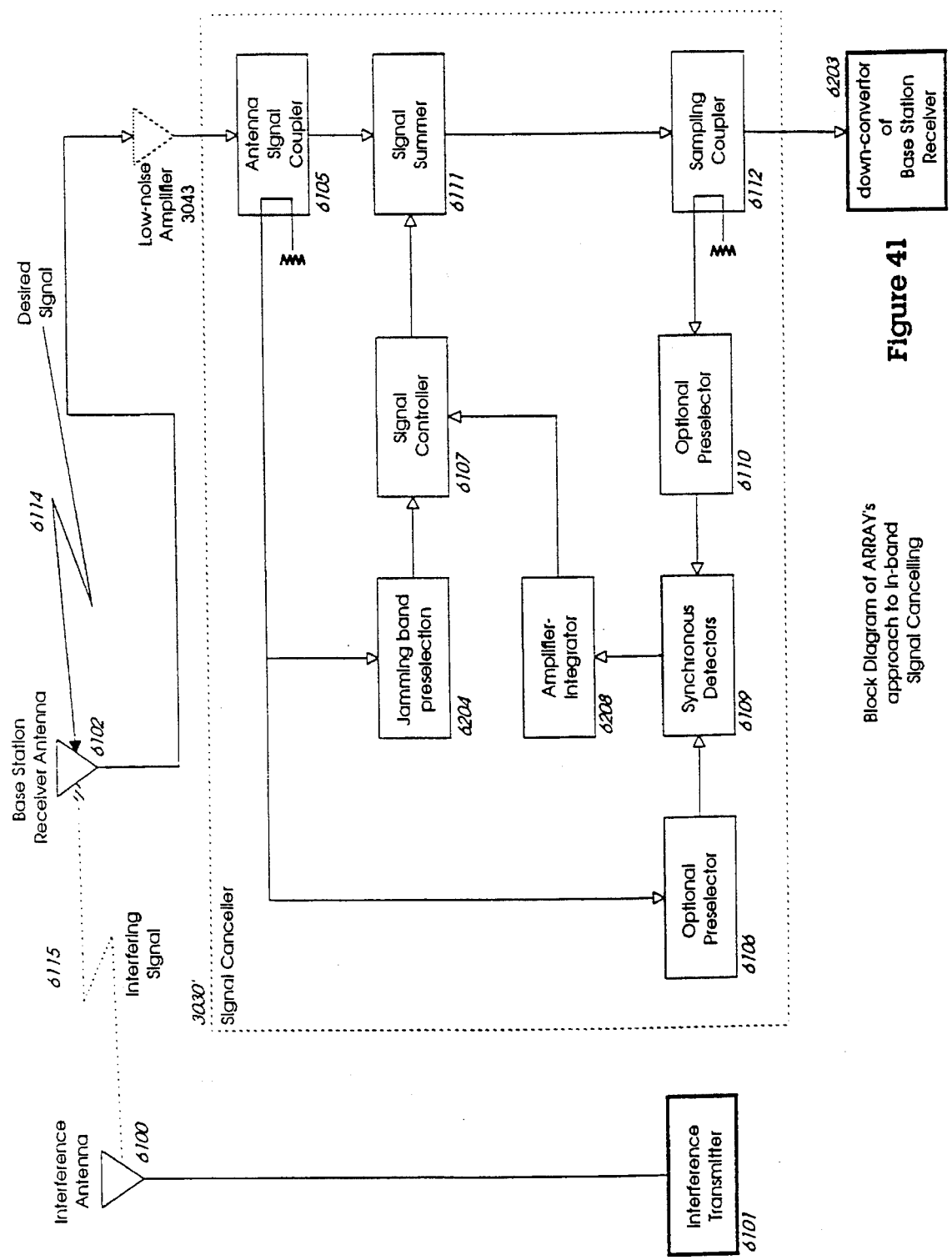
FIG. 41 is a more detailed block diagram of the narrow-beam interference sampling antenna and amplifier of FIG. 32 illustrating a signaling canceling implementation for interfering radio signals.

Two implementations are respectively illustrated in FIGS. 41 and 42. In FIG. 42, a canceler circuit for canceling co-channel and out-of-band interference is shown. An interfering transmitter 6101 radiates signal via its antenna 6100 along path 6115 to the base stations antenna 6102, where it interferes with the desired signal 6114. An auxiliary antenna, typically a high gain, narrow beam array, aimed at the interfering signal source 3042 (FIG. 32), samples the interfering signal and applies it, via the low noise amplifier 3041, to the signal canceler 3030 (FIG. 32). Signal cancelers of this type are available from the American Nucleonics Corp., Los Angeles, Calif.

A synchronous detector 6109 samples both the interfering signal amplitude output of the optional preselector 6106, via coupler 6105, and the signal amplitude output of the optional preselector 6110, via sampling coupler 6112 and summer 6111, (representing the signal received over the antenna 6102) to control the amplitude and phase of the canceling signal. Thus, via an amplifier-integrator 6108, the synchronous detector 6109 drives a signal controller which provides the necessary feedback to the summer 6111 for subtracting the interfering signal.

The lower port of the sampling coupler 6112 typically has less than −50 dB to −80 dB of residual interfering still present in the desired signal to the down conversion mixer 3029.

The second, alternative implementation is illustrated in FIG. 41. In FIG. 41, is directed to applications in which the primary interference is due to out-of-band interference. The circuit of FIG. 42, for example, may experience the problem that the maximum rejection of interfering signals arriving via multipath may not be intercepted by the narrow beam of the sampling antenna, and hence will not be removed from the base station feed. In such cases, the circuit in FIG. 41 improves the quality of the signal reception, by more efficiently removing out-of-band interference.

The implementations of FIGS. 41 and 42 are, for the most part the same. The primary differences are that a single omnidirectional base station receiver antenna 6102 is used, and preselection at 6106 and 6110 determine the range of the interfering signals that will be removed from the base station feed. Since the same signals feed both inputs of the canceler (or summer 6111), the performance is superior to that of FIG. 41 ,i.e., for out-of-band interference.

In situations in which in-band and out-of-band interference is significant, both the approach of FIGS. 41 and 42 may be applied to a single station feed simultaneously.

Transponder

While the configuration shown for the transceiver of FIG. 32 may also be used to implement the transponder, the transponder configuration of FIG. 43*a–d* is a simpler version of that shown in FIG. 32. The circuitry blocks shown in FIG. 43 operate in the same manner as the corresponding blocks of FIG. 32. Since the transceiver 32 and the transponder 43 operate on a half-duplex single frequency communication system, even the operating frequencies of each configuration are the same. Of course, the transponder does not communicate directly with the control center of FIG. 1a and, therefore, does not use the base station control bus. However, the control bus shown in FIG. 43 is communicatively coupled to an application specific data terminal, as previously discussed, for reception of user commands and for sending the user the received messages.

A further difference concerns the timing operation of the transponder. While data transmission and reception take place exactly as described for the base station, the transponder does not perform any time measurements on the received pulses, other than note the completion of the reception of a message. Once received, the transponder's microprocessor 3001 determines whether an immediate ranging response is required, or whether a pending message must be transmitted to be followed by an acknowledge block (as shown in FIGS. 10–12).

The transponder also differs in the details of the antenna systems. In this case, a single antenna is used in a half-duplex fashion without any interference cancellation circuits, as compared with those required by the base station. During transmission, a (second) conventional hybrid transmit/receiver switch 3125 (coupled to the antenna) is used to keep the transmission of energy out of the receiver's input. During reception, the same hybrid switch effectively isolates the transmitter from the antenna, while sending the received signal to the receiver circuitry.

In an additional preferred embodiment of the transducer, designed for the performance of radius-radius multilateration as previously discussed in relation to FIG. 5 and FIG. 8, the transponder can be equipped with the time measuring circuitry previously discussed in relation to FIG. 32, the base station transceiver's design.

Using the method previously discussed, the arrival time of the polling message from the base station is accurately determined by the transponder. After decoding the message, the transponder transmits a response message in accordance with the protocol previously described, but in addition, a message block is appended to the response which contains the measured delay between the (measured) arrival time of the polling message and the transmission of the response.

This response information eventually arrives at the control center via the nearby base stations that receive the response transmission as previously outlined. Since the round trip time for the signal from the polling base station to the transponder and back to the polling base station can now be calculated, the effective time for the signals travel from the transponder to the other nearby base stations can also be calculated, and hence the radius-radius calculations for determining the position of the transponder can be made.

Figure 38:
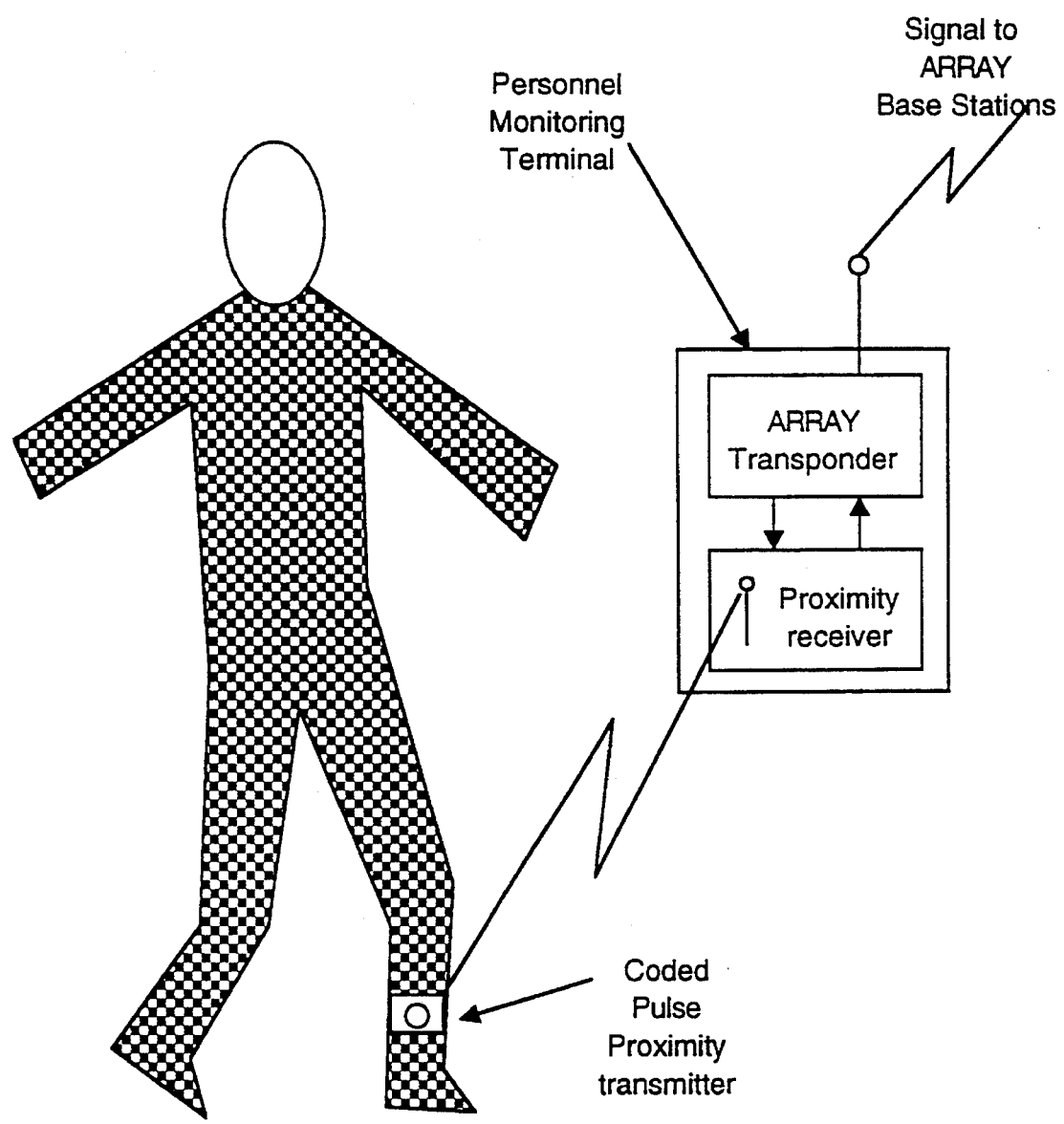
FIG. 38 is a block diagram illustrating another application of the present invention, being applicable to a proximity monitoring device worn by a person.

An additional application of the transponder allows the position of a person to be monitored frequently and conveniently. A small, low-powered proximity transmitter, worn by the monitoree, can be coupled with a transponder, as depicted in FIG. 38, so that if the monitored person moves out of the proximity detectors range, a position fix and suitable message is transmitted. To prevent such messages, and to allow the person's position to be determined at will, the monitored person is obliged to ensure that the transponder is kept within range of the proximity detector.

There is presently a limit to the size to which an transponder can be reduced which is determined by the size of the operating energy source (batteries) and the size of the SAW correlator device. The present combination of these size constraints prohibits the fabrication of the transponder small enough to be conveniently worn by a person whose position would need to be frequently monitored, such as an offender, probationer or parolee on "open-house arrest" or a patient in a recovery or geriatric facility.

This convenience can be restored by providing the person with a small, battery-powered transmitter which periodically transmits a coded pulse to a receiver (effectively a proximity detector) in a monitoring terminal containing a transponder a short distance away (say less than 50 ft). Such a small pulse transmitter could be conveniently worn by (or be attached to) the person, since such devices are already being built about the size of a wrist watch, with battery life expectancies of up to 3 months. The transponder terminal would then monitor the transmissions for regularity and/or content, and when polled, or when an irregularity or specific messages are detected, would transmit an appropriate message to the control center and provide a position fix.

The proximity terminal device containing the position transponder could be carried in a purse or pocket or worn on a belt of the person being monitored, much like a pager, and it could be recharged overnight in a charging stand near the person while sleeping.

Such an approach overcomes both the size inconvenience and the energy source replenishment problems associated with a transponder device worn by (or attached to) the monitoree. Operational features could be provided in the terminal and/or worn-transmitter to.

1) warn the monitoree of inconsistencies in operation, allowing them to correct the situation before an infraction was registered, or 2) A pushbutton on the pulse transmitter could change the code to indicate, for example, a medical emergency situation or other status condition.

Control Center

Figure 47A:
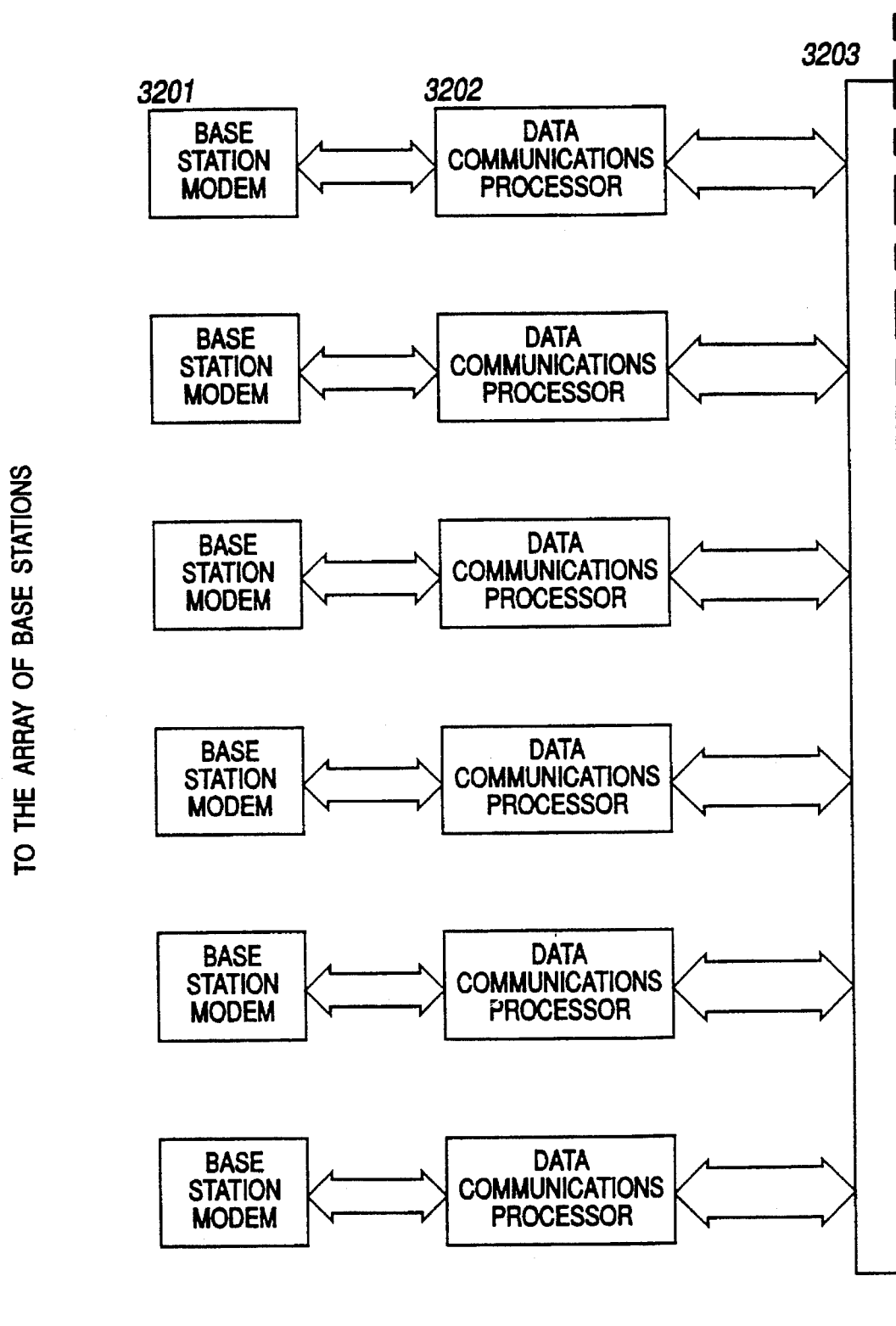
Figure 47B:
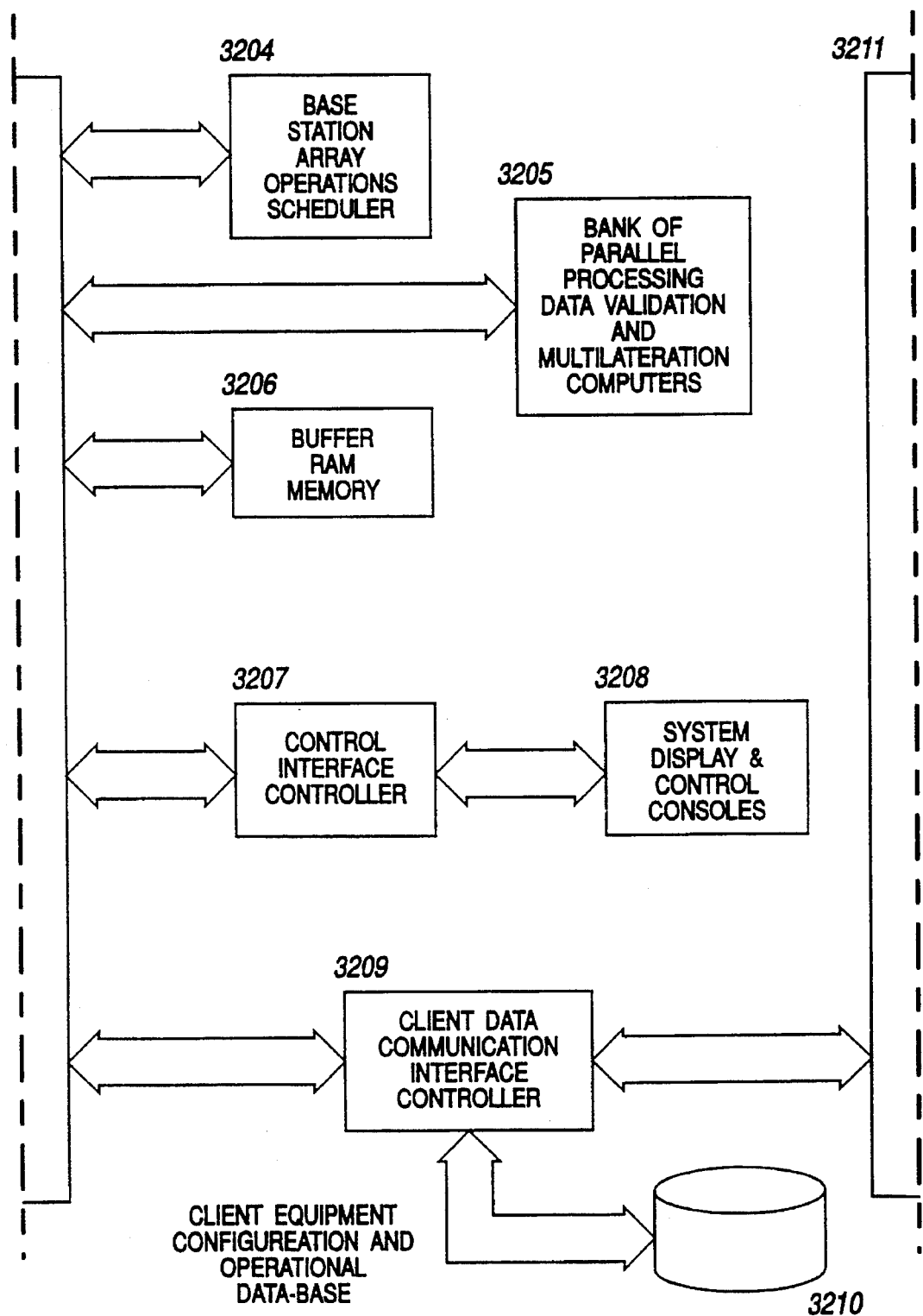
Figure 47C:
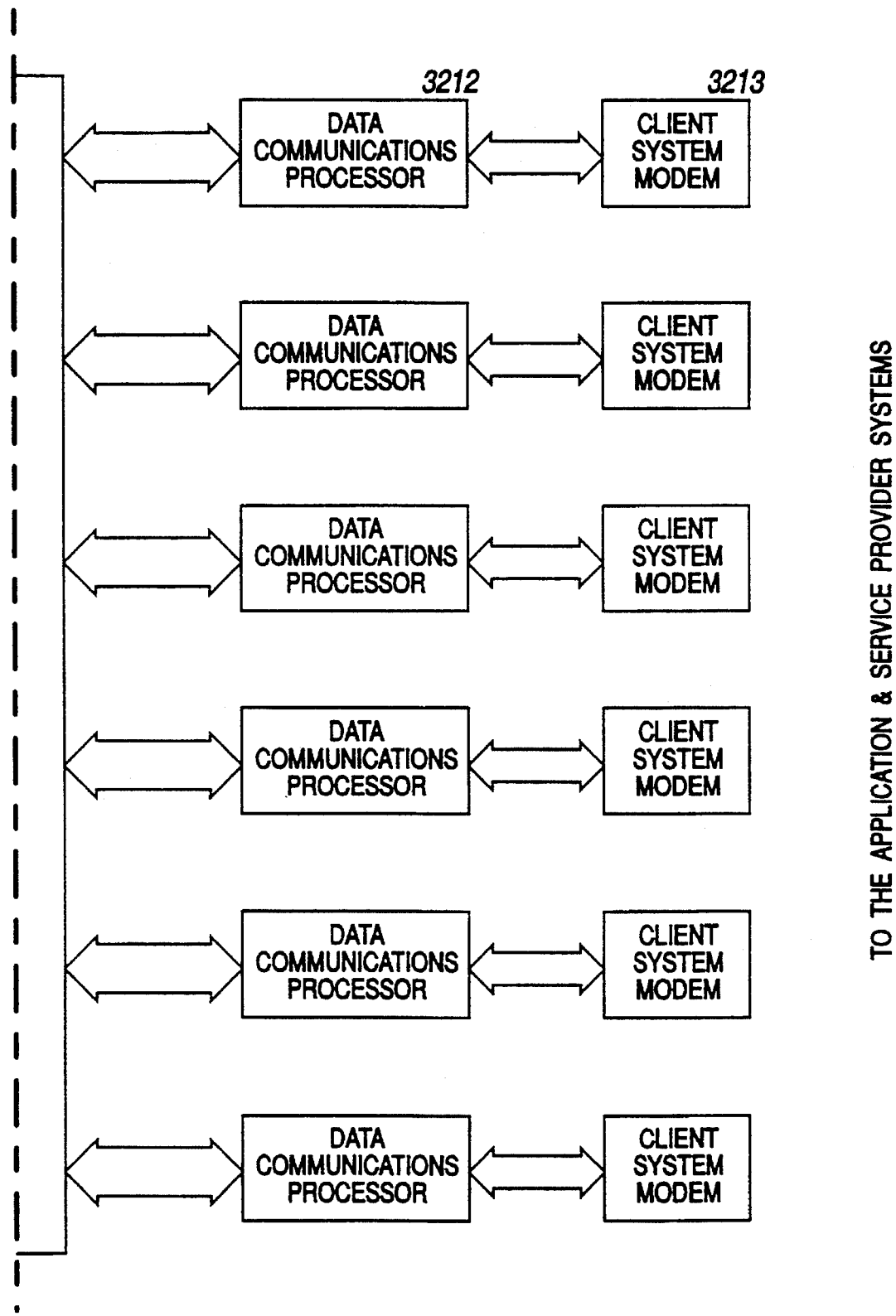

Turning now to FIG. 47a–c, a block diagram of the control center of FIG. 1a is illustrated. The control center includes two main connection areas. First, the control center connects to the array of base stations throughout the system via a base station modem 3201 coupled to each respective base station. A data communications microprocessor 3202 is used to control the communication between the base station modem 3201 and a base station array bus 3203.

At the other side of the control center is a second area of connection. Client system modems 3213 and data communication microprocessors 3212, which respectively correspond to base station modems 3201 and the data communication microprocessors 3202, similarly provide an interface between the application centers of FIG. 1a and the application and service provider bus 3211. The application and service provider bus 3211 and the base station array bus 3203 each act as a system interface to the heart of the control center.

At the heart of the control center are a number of computers and storage devices for controlling many of the basic system functions which have been previously discussed. For instance, a base station array operations scheduler 3204 is a computer which is custom programmed to schedule the transmission and receptions at each respective base station. A host of parallel processing computers 3205 are used for data validation to maintain the integrity of the system communication and for multilateration calculations.

For the convenience of the system owner, a console interface controller 3207 and a system display and control console 3208 are provided for monitoring and entering various commands into the system. Both the controller 3207 and the console 3208 may be implemented using conventional desktop computers.

The application and service provider bus 3211 is coupled to the computers via a client data communication interface controller 3209, which may also be implemented using the conventional computer. The interface controller 3209 sends commands to, and receives information from, the remainder of the system via the base station array bus 3203. Conventional memory means (e.g. RAM memory 3206 and database 3210) may be used in a conventional manner for storage and retrieval.

While the invention has been particularly shown and described with reference to certain embodiments, it will be recognized by those skilled in the art that modifications and changes may be made to the present invention described above without departing from the spirit and scope thereof.

Microprocessors disclosed herein may be implemented as one of a number of commercially available devices, having internal communication ports and memory.

I claim:

1. A remote radio locating and two-way message delivery system for mobile vehicles, said system comprising a transponder on each vehicle, said transponder including means for generating and transmitting a radio frequency data signal representing the current status of the vehicle, an array of at least three fixed base stations for communicating with each transponder via radio frequency signals, each base station including means for periodically polling each transponder to initiate the generation and transmission of a data signal from the polled transponder, and a control center containing means for determining the location of the polled transponder using the time shift of the data signal received from the polled transponder with respect to the polling signal.

2. The system of claim 1 wherein said data signal comprises data indicating the current status of said transponder.

3. The system of claim 1 wherein said means for periodically polling each transponder includes means for producing a response message from the polled transponder on said vehicle which includes the current status of said vehicle, an applications center containing means for receiving and analyzing said response message from the polled transponder and means for sending a request to change current status of said vehicle to a control center, wherein said control center, is communicatively coupled to said base stations and said applications center, and contains means for scheduling communications between said transponders and said base stations, and means for communicating response messages from said control center to said applications center, means in said control center for determining the location of said transponder, means for determining if said location is unknown, and means, if said location is unknown, for scheduling a polling request, which comprises data indicating the sequence of base stations used for polling the transponder, means in said control center for transmitting said polling request to said base stations, means in each base station for interpreting said polling request, constructing a polling message, and transmitting said polling message to one or a group of transponders, said polling message including a portion for data sent to the vehicle and a response portion for data sent from the transponder, means in each transponder responsive to the detection of said polling request for decoding said polling request and for transmitting a transponder response containing the current status or service request information to base station, and means in each base station responsive to the detection of the absence of a transponder response for causing other base stations to poll the transponder.

4. The system of claim 1 wherein said means for determining the location of the polled transponder includes means for assigning a base station to one of a plurality of groups, each base station in each group having coverage areas which do not overlap, means in each base station for transmitting a polling signal, means for producing a response message from the polled transponder which includes the current status of said vehicle, means in each base station for detecting said response message, means in each base station for detecting the absence of said response message, and means in each base station in each group for transmitting another polling signal upon detecting the absence of said response message.

5. The system of claim 1 wherein the current status includes data indicating whether said vehicle is being used for some user-defined operation, and whether said vehicle is free to be used for some operation or any other user-defined status indicating vehicle availability.

6. The system of claim 3 which includes means for assembling transponders into groups, the transponders in each group having a common secondary address and responding identically to said secondary address, means for modifying the membership of each group and communicating such modifications to the appropriate transponders, and means, in each transponder, responsive to the detection of said secondary address for receiving a message containing the detected secondary address, interpreting data in the message, and performing the action signified by the secondary address.

7. The system of claim 6 wherein said means for assembling transponders into groups which means for programming said transponders with said secondary addresses which represent said groups, and means in each transponder for receiving and storing the programmed secondary address.

8. The system of claim 6 wherein the transponder is either a modem in which said transponder is attached to a terminal with comprehensive data functions or is a communications terminal in which said transponder itself acts as a data terminal or similar device.

9. The system of claim 6 wherein said means for performing the action signified by the secondary address includes means for associating with said transponder's secondary address a unique time slot number which represents the time in the next system cycle during which the transponder will respond to a message from the control center, means for producing a message from the control center including the message's secondary address, means, in each transponder, for comparing said transponder's secondary address with said message's secondary address, and means for causing all transponders with the same transponder secondary address as message secondary address to respond substantially simultaneously and to respond identically to said message from the control center by placing requested information into their unique time slots.

10. The system of claim 6 which includes means for computing the ratio of polled messages to transponder service requests with respect to any transponder or group of transponders, and means for constructing a message to said transponder or group of transponders, said message having a format of variable length segments, said lengths determined by said computed ratio.

11. The system of claim 10 which includes means for producing transponder service requests including information indicating whether a transponder needs to send information to the control center.

12. The system of claim 1 which includes a master controller base station which includes means for communicating with other base stations, means for sending a message to all base stations within its communication range, and a master base station clock containing means for measuring time in predetermined intervals, means for choosing one base station to function as a master controller base station relative to all other base stations and for choosing the predetermined time interval, means in each base station for calculating the arrival time of said messages, a base station clock in each base station containing means for measuring time in predetermined intervals identical to the predetermined intervals in said master base station clock, and means in each base station for calculating the time difference between one message received and the next message received, comparing said difference with the same interval as measured by the said master base station clock, and adjusting said base station clock so as to be in synchronization with said master base station clock.

13. The system of claim 12 which includes means for self-calibrating the system comprising means for transmitting calibration messages from a control center to base stations at accurately known times, means in said base stations for measuring the arrival of said calibration messages and sending to a control center the instances of transmissions of said calibration messages, means in said base stations for transmitting said arrival time to said control center, and means in said control center for computing the positions of the base stations based upon said arrival time but adjusting said positions because of variations in air temperature, humidity, and barometric pressure.

14. A system of claim 13 which includes means for assembling a group of identical messages received at different base stations into an event ensemble, means for performing CRC polynomial error checking on said messages in said event ensemble, means for performing multiple-message redundancy cross-checking as between the same message received at different base stations as contained in said event ensemble, and means for using the results of said multiple file redundancy cross-checking to perform error correction on said message.

15. A remote radio locating and two-way message delivery system for mobile vehicles, said system comprising a transponder on each vehicle, said transponder including means for generating and transmitting a radio frequency data signal representing the current status of the vehicle, an array of at least three fixed base stations for communicating with each transponder via radio frequency signals, each base station including means for periodically polling each transponder to initiate the generation and transmission of a data signal from the polled transponder, and means for determining the location of the polled transponder using the time shift of the data signal received from the polled transponder with respect to the polling signal, means for producing a response message from the polled transponder which includes the current status of said vehicle, an applications center containing means for receiving and analyzing said response message from the polled transponder and means for sending a request to change current status of said vehicle to a control center, a control center, communicatively coupled to said base stations and said applications center, containing means for scheduling communications between said transponders and said base stations, and means for communicating response messages from said control center to said applications center, means for assembling transponders into groups, the transponders in each group having a common secondary address and responding identically to said secondary address, means for modifying the membership of each group and communicating such modifications to the appropriate transponders, means in each transponder responsive to the detection of said secondary address for receiving a message containing the detected secondary address, interpreting data in the message, and performing the action signified by the secondary address, means for assembling transponders into groups, including means for programming said transponders with said secondary addresses which represent said groups, and means in each transponder for receiving and storing the programmed secondary address, means for associating with each transponder's secondary address a unique time slot number which represents the time in the next system cycle during which the transponder will respond to a message from the control center, means for producing a message from the control center, said message including the message's secondary address, means in each transponder for comparing said transponder's secondary address with said message's secondary address, means for causing all transponders with the same transponder secondary address as the message secondary address to respond substantially simultaneously and to respond identically to said message from the control center by placing requested information into their unique time slots, a master controller base station which includes means for communicating with other base stations, means for sending a message to all base stations within its communication range, and a master base station clock containing means for measuring time in predetermined intervals, means for choosing one base station to function as a master controller base station relative to all other base stations and for choosing the predetermined time interval, means in each base station for calculating the arrival time of said messages, a base station clock in each base station containing means for measuring time in predetermined intervals identical to the predetermined intervals in said master base station clock, means in each base station for calculating the time difference between one message received and the next message received, comparing said difference with the same interval as measured by the said master base station clock, and adjusting said base station clock so as to be in synchronization with said master base station clock, means for transmitting calibration messages from a control center to base stations at accurately known times, means in said base stations for measuring the arrival of said calibration messages and sending to a control center the instances of transmissions of said calibration messages, means in said base stations for transmitting said arrival time to said control center, and means in said control center for computing the positions of the base stations based upon said arrival time but adjusting said positions because of variations in air temperature, humidity, and barometric pressure.

16. A remote radio locating and two-way message delivery system for mobile vehicles, said system comprising a transponder on each vehicle, said transponder including means for generating and transmitting a radio frequency data signal representing the current status of the vehicle, an array of at least three fixed base stations for communicating with each transponder via radio frequency signals, each base station including means for periodically polling each transponder to initiate the generation and transmission of a data signal from the polled transponder, and means for determining the location of the polled transponder using the time shift of the data signal received from the polled transponder with respect to the polling signal, means for producing a response message from the polled transponder which includes the current status of said vehicle, an applications center containing means for receiving and analyzing said response message from the polled transponder and means for sending a request to change current status of said vehicle to a control center, a control center, communicatively coupled to said base stations and said applications center, containing means for scheduling communications between said transponders and said base stations, and means for communicating response messages from said control center to said applications center, means for assembling transponders into groups, the transponders in each group having a common secondary address and responding identically to said secondary address, means for modifying the membership of each group and communicating such modifications to the appropriate transponders, means in each transponder responsive to the detection of said secondary address for receiving a message containing the detected secondary address, interpreting data in the message, and performing the action signified by the secondary address, means for assembling transponders into groups includes means for programming said transponders with said secondary addresses which represent said groups, and means in each transponder for receiving and storing the programmed secondary address, means for associating with said transponder's secondary address a unique time slot number which represents the time in the next system cycle during which the transponder will respond to a message from the control center, means for producing a message from the control center including the message's secondary address, means in each transponder for comparing said transponder's secondary address with said message's secondary address, means for causing all transponders with the same transponder secondary address as the message secondary address to respond substantially simultaneously and to respond identically to said message from the control center by placing requested information into their unique time slots, means for computing the ratio of polled messages to transponder service requests with respect to any transponder or group of transponders, and means for constructing a message to said transponder or group of transponders, said message having a format of variable length segments, said lengths determined by said computed ratio, means for assigning a base station to one of a plurality of groups, each base station in each group having coverage areas which do not overlap, means in each base station for transmitting a polling signal, means for producing a response message from the polled transponder which includes the current status of said vehicle, means in each base station for detecting said response message, means in each base station for detecting the absence of said response message, and means in each base station in each group for transmitting another polling signal upon detecting the absence of said response message.

17. A remote radio locating and two-way message delivery system for mobile vehicles, said system comprising a transponder on each vehicle, said transponder including means for generating and transmitting a radio frequency data signal representing the current status of the vehicle, an array of at least three fixed base stations for communicating with each transponder via radio frequency signals, each base station including means for periodically polling each transponder to initiate the generation and transmission of a data signal from the polled transponder, and means for determining the location of the polled transponder using the time shift of the data signal received from the polled transponder with respect to the polling signal, means for producing a response message from the polled transponder which includes the current status of said vehicle, an applications center containing means for receiving and analyzing said response message from the polled transponder and means for sending a request to change current status of said vehicle to a control center, a control center, communicatively coupled to said base stations and said applications center, containing means for scheduling communications between said transponders and said base stations, and means for communicating response messages from said control center to said applications center, means for assembling transponders into groups, the transponders in each group having a common secondary address and responding identically to said secondary address, means for modifying the membership of each group and communicating such modifications to the appropriate transponders, means in each transponder responsive to the detection of said secondary address for receiving a message containing the detected secondary address, interpreting data in the message, and performing the action signified by the secondary address, means for assembling transponders into groups, including means for programming said transponders with said secondary addresses which represent said groups, and means in each transponder for receiving and storing the programmed secondary address, means for associating with said transponder's secondary address a unique time slot number which represents the time in the next system cycle during which the transponder will respond to a message from the control center, means for producing a message from the control center including the message's secondary address, means in each transponder for comparing said transponder's secondary address with said message's secondary address, means for causing all transponders with the same transponder secondary address as the message secondary address to respond substantially simultaneously and to respond identically to said message from the control center by placing requested information into their unique time slots, means for assembling a group of identical messages received at different base stations into an event ensemble, means for performing CRC polynomial error checking on said messages in said event ensemble, means for performing multiple-message redundancy cross-checking as between the same message received at different base stations as contained in said event ensemble, and means for using the results of said multiple file redundancy cross-checking to perform error correction on said message.

18. A time-slotted polling and location determination system for mobile vehicles, said system comprising means for scheduling radio communications during a series of system cycles, each system cycle including polling messages and response messages each comprising a plurality of contiguous time slots of a fixed time slot duration, at least three fixed base stations, each containing means for transmitting a polling message from said base stations during a system cycle in time slots, said polling message containing data including a transponder identification number, a transponder on each vehicle, said transponder containing means for receiving a polling message during the system cycle and means for generating and transmitting a response message to said base stations during the system cycle, said response message containing data indicating the current status of the vehicle, and a control center communicatively coupled to said base stations and containing means for selecting said time slot duration, means for analyzing the data contained in the polling messages and response messages, and means, responsive to the detection of a response message, for determining the location of a transponder.

19. A time-slotted polling and location determination system for mobile vehicles, said system comprising a transponder on each vehicle, said transponder including means for generating and transmitting radio frequency signals, at least three fixed base stations, each containing
  means for communicating with each transponder via radio frequency signals,
  means for scheduling all radio frequency signals for transmission during a series of system cycles and means for dividing each system cycle into a plurality of contiguous time periods including a polling time period, said polling time period comprising a plurality of contiguous time slots including message packets, or a header packet and a response packet,
  means in each base station for constructing a message packet containing data representing a plurality of coded characters,
  means for constructing and transmitting a header packet during the polling time period, said header packet containing data indicating a unique transponder number, a control status word comprising a request to change the operational status of a vehicle, check bit data, and a unique transaction number for identifying each communication between a base station and a transponder,
  means in each transponder responsive to the receipt of a header packet for constructing a response packet containing data representing the operational status of the vehicle, said operational status comprising data indicating the availability of the vehicle for use or the physical condition of the vehicle, and means for transmitting said response packet to a base station during the system cycle, and a control center communicatively coupled to said base stations and containing means for scheduling all communications among the base stations, the control center, and the transponders, means responsive to the detection of a response packet or a message packet for determining the location of each transponder using either radius-radius multilateration or hyperbolic multilateration techniques, means for assigning a transaction number to each communication, and means for assigning a unique transponder number to each transponder.

20. A periodic status monitoring, location monitoring, and event detection system for transponders on mobile vehicles comprising at least three fixed base stations, each containing means for communicating with each transponder within the base station's coverage area via radio frequency signals, means for receiving a response message from a transponder containing the current status of a vehicle, and means for communicating said response message to a control center, a transponder on each vehicle, said transponder containing means for receiving radio frequency signals and means for generating and transmitting a response message containing the current status of the vehicle to said base stations, a control center communicatively coupled to said base stations, said control center containing means responsive to the detection of a response message of a transponder for computing the location of the vehicle carrying that transponder, means for periodically monitoring said current status and said computed location of each vehicle, means for detecting changes in the current status of a vehicle or the location of a vehicle, and a plurality of user output devices for receiving from said control center said detected changes in said current status or location.

21. A periodic status monitoring, location monitoring, and event detection system for transponders on mobile vehicles comprising at least three fixed base stations, each containing means for communicating with each transponder within the base station's coverage area via radio frequency signals, and means for receiving a response message from a transponder, a transponder on each vehicle, said transponder containing means for receiving radio frequency signals and means for generating and transmitting a response message at regular intervals to said base stations, said response message containing the current status of the vehicle, means for determining the current status of a vehicle, said current status comprising data indicating vehicle availability or a physical condition of the vehicle, a control center communicatively coupled to said base stations and containing means responsive to the detection of a response message for computing the location of the vehicle carrying the transponder that transmitted said response message, said computation using radius-radius multilateration or hyperbolic multilateration techniques, means for extracting the current status of the vehicle from said response message, and means for transmitting the location and current status, and an applications center communicatively coupled to said base stations and containing means for periodically monitoring the status and location of each vehicle, said monitoring means including means for recording the status and location of each transponder at regular intervals, means for comparing the recorded status and location with the current status and location at regular intervals, means for detecting changes in the status or location of a vehicle at regular intervals, and means for communicating said changes to the system's users via an application-specific computer terminal at regular intervals.

22. A periodic status monitoring and location monitoring system for transponders on mobile vehicles using time-slotted communications said system including means for scheduling all radio frequency signals for transmission during a series of system cycles said system cycles comprising a plurality of contiguous time slots, at least four fixed base stations each containing means for receiving a radio signal from transponders said radio signal containing the transponder's current status, a transponder on each vehicle, each transponder containing means for sending the transponder's current status to a base station said current status containing data indicating the availability of the vehicle for use or the physical condition of the vehicle, an application-specific computer terminal containing means for receiving a particular geographic location to send a vehicle from a user, means for selecting a particular vehicle to go to said particular geographic location, means instructing the control center to construct a message to said particular vehicle, said message containing data indicating said particular geographic location, and means for monitoring the current status and location of any vehicle, and a control center communicatively coupled to said base stations and application-specific computer terminal containing means for determining the location of a transponder using radius-radius multilateration techniques or hyperbolic multilateration techniques, and means for reporting the location of said transponders to said application-specific computer terminal.

23. A periodic status monitoring, location monitoring, and event detection system for transponders on mobile vehicles using time-slotted communications said system including means for scheduling all radio frequency signals for transmission during a series of system cycles, said system cycles comprising a plurality of contiguous time slots, at least four fixed base stations each containing means for receiving a radio signal from transponders said radio signal containing the transponder's current status, and means for sending a polling signal to transponders, a transponder on each vehicle, each transponder containing means responsive to the detection of a polling signal for sending the transponder's current status to a base station said current status containing data indicating the availability of the vehicle for use or the physical condition of the vehicle, an application-specific computer terminal containing means for compiling lists of vehicles to be polled, means for providing said lists to a control center, means for monitoring the current status and location of a vehicle, and a control center communicatively coupled to said base stations and application-specific computer terminal containing means for determining the location of a transponder using radius-radius multilateration techniques or hyperbolic multilateration techniques, means for reporting the location of said transponders to said application-specific computer terminal, and means for polling transponders on said lists.

24. A simulcast avoidance and message scheduling system for mobile vehicles, said system comprising a transponder on each vehicle, said transponder containing means for receiving radio frequency signals and means for generating and transmitting a response message containing the current availability or physical condition of a vehicle, at least three fixed base stations, each containing means for communicating with each transponder within the base station's coverage area via radio frequency signals, and means for receiving a response message from a transponder, and a control center communicatively coupled to said base stations and containing means for determining the coverage areas of each base station, means for detecting overlapping coverage areas among base stations, means for scheduling and transmitting radio frequency communications simultaneously or substantially simultaneously using base stations with non-overlapping coverage areas.

25. A wide-area location determination system for mobile vehicles, said system comprising a transponder on each vehicle, said transponder containing means for receiving a polling signal from a base station and means for generating and transmitting a response message containing data indicating the current availability or physical condition of a vehicle, at least three fixed base stations, each containing means for transmitting a polling signal to each transponder within the base station's coverage area, and means for receiving a response message from each transponder within said coverage area, a control center communicatively coupled to said base stations and containing means for determining the coverage area of each base station, means for detecting overlapping coverage areas among base stations, means for grouping base stations into a plurality of groups, means for selecting non-adjacent base stations with non-overlapping coverage areas for membership in a group, and means for sequencing a polling signal through groups of base stations, means in each base station for transmitting polling signals substantially simultaneously from all the base stations in a group, and means in said control center responsive to the detection of a response message for terminating said sequencing of the polling signal through groups of base stations.

26. A wide-area location determination system for mobile vehicles, said system comprising a transponder on each vehicle, said transponder containing means for receiving a polling signal from a base station and means for generating and transmitting a response message containing data indicating the current availability or physical condition of the vehicle, at least three fixed base stations, each containing means for transmitting a polling signal to each transponder within the base station's coverage area, and means for receiving a response message from each transponder within said coverage area, a control center communicatively coupled to said base stations and containing means for determining the coverage area of each base station, said control center including means for determining if two or more base stations have coverage areas which overlap, means for grouping base stations into a plurality of base station groups, means for selecting non-adjacent base stations with non-overlapping coverage areas for any base station group, means for constructing an ordered ranking of said base station groups, means for sequencing a polling signal through base station groups in the order indicated by the ordered ranking of the base station groups, means responsive to the absence of detection of a response message for sequencing the polling signal to the next base station group indicated by the ordered ranking of the base station groups, and means responsive to the detection of a response message for terminating the sequencing of the polling signal, and means in each base station for transmitting polling signals substantially simultaneously with the transmission of polling signals from all the other members of a selected base station group.

27. A dynamic group assignment system for mobile vehicles, said system comprising a transponder on each vehicle, said transponder containing means for receiving a polling message from a base station and means for transmitting a response message, at least three fixed base stations, each containing means for transmitting polling messages to each transponder within the base station's coverage area, and means for receiving response messages from each transponder within said coverage area, and a control center communicatively coupled to said base stations and containing means for assigning transponders to transponder groups, means for periodically determining the status and location of transponders within transponder groups, and means responsive to the detection of a change in a transponder's location or status for changing the memberships of said transponder groups.

28. A dynamic group assignment system for mobile vehicles, said system comprising a transponder on each vehicle, said transponder containing means for receiving a polling message from a base station and means for generating and transmitting a response message comprising data indicating the current availability or physical condition of a vehicle, at least three fixed base stations, each containing means for transmitting polling signals to each transponder within the base station's coverage area, and means for receiving response messages from a transponder, and a control center communicatively coupled to said base stations and containing means for periodically determining the status of a transponder, means for periodically determining the location of a transponder, means for determining which transponders have the same status and similar location, means for assigning transponders to groups each group having transponders with the same status or a similar location, and means responsive to a change in status or location of a transponder for changing the membership of said groups.

29. A dynamic group assignment system for mobile vehicles, said system comprising a transponder on each vehicle, said transponder containing means for receiving a polling message from a base station and means for generating and transmitting a response message comprising the current status of a vehicle, said current status including data indicating the current availability or physical condition of a vehicle, at least three fixed base stations, each containing means for transmitting polling messages to each transponder within the base station's coverage area, and means for receiving response messages from each transponder within said coverage area, a control center communicatively coupled to said base stations and containing means for extracting the current status from the response message, means in said control center responsive to the detection of the transmission of a response message for determining the location of a transponder using radius-radius multilateration or hyperbolic multilateration techniques, means in said control center for periodically identifying transponders with the same current status, and means for assigning transponders with the same current status to the same transponder group, means for defining particular geographic areas, means for periodically determining which of the transponder locations are within a particular geographic area, and means for assigning transponders within a particular geographic area to another transponder group, and means responsive to a change in the current status or geographic location of a transponder for changing the membership of said transponder groups.

30. An on-demand service request system for transponders on mobile vehicles, said system comprising a transponder in each vehicle, said transponder containing means for initiating, constructing, and transmitting a service request message including data indicating the type of service required by said transponder, a control center communicatively coupled to said base stations and containing means for determining and allocating the amount of time available for service request messages, means for determining the time period for a transponder to transmit data, and means responsive to the detection of a service request message for scheduling a polling message containing data indicating the time period for the transponder to transmit data, and at least three base stations, each containing means for receiving said service request messages from the transponders and transmitting said service request messages to the control center, means for transmitting a polling message to a transponder, and means for receiving data from the transponders.

31. An on-demand service request system for transponders on mobile vehicles said system comprising means for scheduling radio communications during a series of system cycles, each system cycle including a polling time period for transmitting polling messages and response messages, and a service request time period for transmitting service request messages, and means for adjusting the proportion of the system cycle allocated to said polling time period and said service request time period, at least three fixed base stations, each containing means for transmitting a polling message to all transponders within the base station's coverage area during said polling time period determined by said scheduling means, a control center containing means responsive to the detection of a service request message for constructing a polling message within two system cycles of receipt of said service request message, and a transponder on each vehicle, said transponder containing means for receiving said polling messages from said base stations, means for generating and transmitting a service request message, means for randomly selecting a time slot within said service request time period determined by said scheduling means for transmitting said service request message, means for determining the validity of the service request message received by the base station, and means responsive to the detection of an invalid service request message at said base station for re-transmitting the service request message to said base station.

32. An on-demand service request system for transponders on mobile vehicles, said system comprising means for scheduling radio communications during a series of system cycles, each system cycle containing a variable length service request time period and a variable length polling time period, means for constructing a service request time period comprising a plurality of time slots each of which contains a single service request message, means for constructing a polling time period comprising a plurality of time slots each of which contains either a header packet and response packet, or a message packet, a transponder in each vehicle, said transponder containing means for initiating and transmitting a service request message or response packet, means for receiving header packets, means for constructing a service request message comprising dam indicating the type of service required by a transponder, means for determining the validity of the service request message received at the base station, means responsive to the detection of an invalid service request message at the base station for re-transmitting said service request message, means for constructing a response packet including the current status of a transponder, said current status containing data indicating the physical condition of the vehicle or vehicle availability, means for sending a response packet or message packet during the time slot indicated by the response time number, and means for randomly selecting a time slot to transmit a service request message, a control center communicatively coupled to said base stations and containing means for determining and allocating the amount of time for the polling time period and the service request time period, means for assigning response time slot numbers to transponders, and means responsive to the detection of a service request message for scheduling the transmission of a polling message containing said response time slot number within two system cycles of receipt of said service request message, and at least three base stations, each containing means for receiving service request messages and response packets, and means for transmitting header packets to the transponder.

33. A multipoint message delivery and addressing system for mobile vehicles said system comprising means for constructing a polling message containing addresses, means for assigning addresses to transponders and means for programming transponders with said assigned addresses, at least three fixed base stations, each containing means for transmitting a polling message to all transponders within the base station's coverage area, and means for receiving and detecting a response message from a transponder containing the current status of the vehicle, a transponder on each vehicle, said transponder containing means for receiving polling messages from a base station, means for extracting addresses from said polling messages, means for comparing said extracted addresses with said assigned addresses of said transponders, and means responsive to the detection of a match between an assigned address and an extracted address for generating and transmitting a response message containing the current status of the vehicle, said current status comprising data indicating the availability of the vehicle for use or the physical condition of the vehicle, and a control center containing means responsive to the detection of a response message for computing the location of the transponder that transmitted said response message.

34. A multipoint message delivery and addressing system for mobile vehicles, said system comprising means for scheduling radio communications during a series of system cycles, each system cycle including a polling time period for the transmission of polling messages and response messages, at least three fixed base stations, each containing means for transmitting a polling message to all transponders within the base station's coverage area during the polling time period, said polling message containing a primary address, or a primary and secondary address, means for receiving a response message from a transponder said response message containing the current status of the transponder, and means for programming said transponders with said primary and secondary addresses, a transponder on each vehicle, said transponder containing means for receiving polling messages from a base station and means for generating and transmitting a response message containing the current status of the vehicle, said current status comprising data indicating the availability of the vehicle for use or the physical condition of the vehicle, means for assigning transponders to groups, all transponders in a group having a common secondary address, a control center containing means for identifying transponders with the same current status, and means for assigning transponders with a common current status to transponder group having a common secondary address, means for designating particular geographic areas, means for periodically determining which transponders are within particular geographic areas, and means for assigning transponders located within a particular geographic area to a common transponder group with a common secondary address, means in said control center responsive to the detection of a response message for periodically determining the location of a transponder using radius-radius multilateration or hyperbolic multilateration techniques, and means in each transponder for extracting primary and secondary addresses from a polling message, means for comparing said extracted primary and secondary addresses with said primary and secondary addresses programmed into said transponder, and means responsive to the detection of a match between said extracted primary and secondary addresses and said programmed primary and secondary addresses for transmitting a response message to the base station.

35. A hybrid access, bidirectional message delivery system for transponders on mobile vehicles, said system comprising means for scheduling radio communications during a series of system cycles, each system cycle including a polling time period and a service request time period, each of said periods comprising a plurality of time slots, at least three fixed base stations, each containing means for transmitting radio frequency signals to all transponders within the base station's coverage area at regular intervals, and means for receiving radio frequency signals from said transponders during the polling time period, a control center communicatively coupled to said base stations and containing means for scheduling the transmission of radio frequency signals with transponders during the polling time period, and a transponder on each vehicle, said transponder including means for transmitting radio frequency signals at random times during the service request period.

36. A hybrid access, bidirectional message delivery system for transponders on mobile vehicles, said system comprising means for scheduling radio communications during a series of system cycles, each system cycle including a variable length polling time period and a variable length service request time period, each of said periods comprising a plurality of time slots, at least three fixed base stations, each containing means for transmitting polling messages to all transponders within the base station's coverage area at regular intervals during the polling time period, each polling message containing data instructing a transponder to transmit status information or a data message, a control center communicatively coupled to said base stations and containing means for constructing polling messages for transponders at regular intervals, means for receiving service request messages from transponders during the service request time period, and means for determining the number of time slots allocated for the polling time period and the service request time period, and a transponder on each vehicle, said transponder including means for transmitting service request messages at random times during the service request time period.

37. A hybrid access, bidirectional message delivery system for transponders on mobile vehicles, said system comprising means for scheduling radio communications during a series of system cycles, each system cycle including a variable length polling time period and a variable length service request time period, each of said periods comprising a plurality of time slots, at least three fixed base stations, each containing means for transmitting polling messages to all transponders within the base station's coverage area during the polling time period, each polling message containing data instructing a transponder to transmit status information or a data message, a control center communicatively coupled to said base stations and containing means for constructing a polling message to a transponder, means for receiving a one time slot-length service request message from a transponder during the service request time period, means for counting the number of service request messages received and the number of polling messages transmitted during an arbitrarily selected time interval, means for computing the ratio of service request messages counted versus polling messages counted during said time interval, means for analyzing the throughput of the system based upon the number of time slots allocated to the polling time period and service request time period, means for choosing the number of time slots available for the polling time period and the service request time period so as to maximize said throughput, and means for periodically monitoring said throughput and for periodically adjusting the number of time slots available for the polling time period and service request time period so as to maximize said throughput, a transponder on each vehicle, said transponder containing means for transmitting service request messages during random time slots in the service request period, means on each transponder for manually initiating a service request message transmission and including a manually operable actuator and means responsive to the pushing of said actuator for constructing and transmitting a service request message to the base station, and means on each transponder for automatically initiating a service request message transmission and including sensor and timer mechanisms, means for detecting status changes in said sensor and timer mechanisms, and means responsive to the detection of said status changes in said sensor and timer mechanisms for transmitting a service request message to the base station.

38. A synchronization system for transponders on mobile vehicles, said system comprising means for determining or selecting the present time, at least three fixed base stations, each containing a base station clock, means for synchronizing said base station clock with all other base station clocks, and means for transmitting synchronization messages to all transponders within the base station's coverage area, said synchronization messages containing data indicating the current time, and a transponder on each vehicle, said transponder containing an internal transponder clock, means for receiving a synchronization message, means for extracting the current time from the synchronization message, means responsive to detection of the current time in said synchronization messages for synchronizing said internal transponder clock to said base station clocks.

39. A self-calibration system for an array of base stations, said system comprising at least three fixed base stations, each containing a base station clock, means for synchronizing said base station clock with all other base station clocks, means for transmitting calibration signals, means for transmitting the instant of transmission of said calibration signals to a control center, means for receiving calibration signals sent by other base stations, means for measuring the arrival times of calibration signals sent by other base stations, and means for transmitting said arrival times to a control center, means for determining the actual positions of said base stations, means for calculating the apparent atmospheric propagation velocity and equipment delays within said system, and a control center communicatively coupled to said base stations and containing means for receiving the arrival times from said base stations, means for computing the apparent locations of said base stations, and means for adjusting the apparent atmospheric propagation velocity and equipment delays so that the apparent locations agree with the actual positions.

40. A self-calibration system for an array of base stations, said system comprising an array of at least three base stations and a base station clock in each base station, means for selecting a base station to function as a master base station, means for selecting a system-wide timing interval, and means for transmitting a timing signal from said master base station once during the system-wide timing interval, means in each base station for determining the local arrival time of the timing signal, means for storing the arrival time, means for calculating the time difference between timing signals using said stored arrival times, means for comparing said time difference to the system-wide timing interval, and means for adjusting the base station clock based upon the results of said comparison, means for transmitting calibration signals at known times, means for measuring the arrival times of said calibration signals, and means for transmitting said calibration signal arrival times to a control center, and a control center communicatively coupled to said base stations and containing means for receiving the calibration signal arrival times from said base stations, means for computing the apparent locations of said base stations, means for adjusting the apparent atmospheric propagation velocity and equipment delays so that the apparent locations agree with the actual positions of said base stations.

41. A self-calibration system for an array of base stations, said system comprising an array of at least three base stations and a base station clock in each base station, means for selecting a base station to function as a master base station, means for selecting a system-wide timing interval, and means for transmitting a timing signal from said master base station once during the system-wide timing interval, and means in each base station for determining the local arrival time of the timing signal, means for storing the arrival time, means for calculating the time difference between timing signals using said stored arrival times, means for comparing said time difference to the system-wide timing interval, and means for adjusting the base station clock based upon the results of said comparison.

42. A system for correcting the transmission errors of messages sent between mobile vehicle transponders and fixed base stations, said system comprising an array of at least four fixed base stations, each base station containing means for receiving a message from a transponder and sending the received message to a control center, a transponder on each vehicle containing means for transmitting a message to at least four receiving base stations, and a control center containing means for receiving the message from each base station, assembling the message as received by each of said four receiving base stations into an event ensemble, means for performing multiple-message redundancy cross-checking as between the messages contained in the event ensemble, and means for using the results of said redundancy cross-checking for correcting errors in said message.

43. A method of polling and determining the location of mobile vehicles, comprising the steps of scheduling radio communications during a series of system cycles, each system cycle including time periods for transmitting polling messages and response messages each of said periods comprising a plurality of contiguous time slots, providing at least three fixed base stations, transmitting a polling message from said base stations during a system cycle, said polling message containing data including a transponder identification number, providing a transponder on each vehicle, receiving a polling message at a transponder during the system cycle, and then generating and transmitting a response message to said base stations during the system cycle, said response message containing data indicating the current status of the vehicle, providing a control center communicatively coupled to said base stations, and analyzing the data contained in the polling messages and response messages to determine the location of a transponder.

44. A method of periodically monitoring the status, monitoring the location, and detecting events of mobile vehicles, comprising the steps of providing at least three fixed base stations, each containing means for communicating with each transponder within the base station's coverage area via polling messages, providing a transponder on each vehicle, generating and transmitting a response message from a transponder to said base stations upon receipt of a polling message said response message containing the current status of the vehicle, detecting said response message at a base station and conveying said message to a control center, providing a control center communicatively coupled to said base stations, and responding to the detection of a response message of a transponder by computing the location of the vehicle carrying that transponder, periodically monitoring said current status and said computed location of each vehicle, and detecting changes in the current status of a vehicle or the location of a vehicle, and providing a plurality of user output devices for receiving said detected changes in said current status or location.

45. A method of avoiding simulcast and scheduling messages for mobile vehicles, comprising the steps of providing at least three fixed base stations, each containing means for communicating with each transponder within the base station's coverage area via radio frequency signals, providing a transponder on each vehicle, receiving radio frequency signals at the transponder, generating and transmitting a response message from the transponder to the base station, said response message containing the current availability or physical condition of a vehicle, receiving said response message at the base station, providing a control center communicatively coupled to said base stations, and determining the coverage area of each base station, detecting overlapping coverage areas among base stations, and scheduling radio frequency communications simultaneously or substantially simultaneously using base stations with non-overlapping coverage areas.

46. A method of determining the location of mobile vehicles in wide areas, comprising the steps of transmitting a polling signal to each transponder within the base station's coverage area from each of at least three fixed base stations, and receiving a response message from each transponder within said coverage area, providing a transponder on each vehicle, receiving a polling signal from a base station at each transponder and generating and transmitting a response message containing data indicating the current availability or physical condition of a vehicle, providing a control center communicatively coupled to said base stations, determining the coverage area of each base station at said control center, detecting overlapping coverage areas among base stations, grouping base stations into a plurality of groups, selecting non-adjacent base stations with non-overlapping coverage areas for membership in a group, and sequencing a polling signal through groups of base stations, transmitting polling signals substantially simultaneously from all the base stations in a group, and terminating said sequencing of the polling signal through groups of base stations upon the receipt of a response message from a transponder.

47. A method of dynamically grouping mobile vehicles, comprising the steps of transmitting polling messages to each transponder within the base station's coverage area from each of at least three fixed base stations, and receiving response messages from each transponder within said coverage area, providing a control center communicatively coupled to said base stations, and assigning transponders to transponder groups at said control center, providing a transponder on each vehicle, receiving a polling message from a base station at each transponder and transmitting a response message, periodically determining, at the control center, the status and location of transponders within transponder groups upon the receipt of a response message, and changing the memberships of said transponder groups upon the detection of a change in a transponder's status or location.

48. A method for self-calibrating an array of base stations, comprising the steps of providing an array of at least three base stations and a base station clock in each base station, selecting a base station to function as a master base station, selecting a system-wide timing interval, and transmitting a timing signal from said master base station once during the system-wide timing interval, determining the local arrival time of the timing signal in each base station, storing the arrival time, calculating the time difference between timing signals using said stored arrival times, comparing said time difference to the system-wide timing interval, adjusting the base station clock based upon the results of said comparison, transmitting calibration signals at known times, measuring the arrival times of said calibration signals, and transmitting said calibration signal arrival times to a control center communicatively coupled to said base stations, and receiving the calibration signal arrival times from said base stations at said control center, computing the apparent locations of said base stations, and adjusting the apparent atmospheric propagation velocity and equipment delays so that the apparent locations agree with the actual positions of said base stations.

49. A method for correcting the transmission errors of messages sent between mobile vehicle transponders and an array of at least four fixed base stations, comprising the steps of receiving a message from a transponder at each base station and sending said message to a control center, and assembling the message as received by each of said four receiving base stations into an event ensemble at a control center, performing multiple-message redundancy cross-checking as between the messages contained in the event ensemble, and using the results of said redundancy cross-checking for correcting errors in said message.

* * * * *